US007742768B2

(12) United States Patent
Liu et al.

(10) Patent No.: US 7,742,768 B2
(45) Date of Patent: Jun. 22, 2010

(54) EXTENSION OF A LOCAL AREA PHONE SYSTEM TO A WIDE AREA NETWORK

(76) Inventors: Kim Quo-Taht Liu, 80 Descanso Dr., Apt. 3117, San Jose, CA (US) 95134; Shriram Natarajan, 1243 Daniel Ct., Milpitas, CA (US) 95035; Ragunath Devarasu, 4863 Montague Ave., Fremont, CA (US) 94555; William R. Stensrud, 13491 Summit Cir., Poway, CA (US) 92064

( * ) Notice: Subject to any disclaimer, the term of this patent is extended or adjusted under 35 U.S.C. 154(b) by 511 days.

(21) Appl. No.: 11/368,358

(22) Filed: Mar. 3, 2006

(65) Prior Publication Data

US 2006/0205436 A1    Sep. 14, 2006

Related U.S. Application Data

(63) Continuation-in-part of application No. 10/317,035, filed on Dec. 9, 2002.

(60) Provisional application No. 60/417,671, filed on Oct. 10, 2002.

(51) Int. Cl.
*H04W 40/00* (2009.01)
(52) U.S. Cl. .................. 455/445; 455/466; 455/410; 455/411; 455/412.1; 455/414.1
(58) Field of Classification Search .............. 455/445, 455/466, 410, 411, 412.1, 412.2, 414.1
See application file for complete search history.

(56) References Cited

U.S. PATENT DOCUMENTS

| 5,577,029 | A | 11/1996 | Lu |
| 5,734,699 | A | 3/1998 | Lu |
| 5,761,195 | A | 6/1998 | Lu |
| 5,818,824 | A | 10/1998 | Lu |
| 5,838,774 | A * | 11/1998 | Weisser, Jr. .............. 379/92.02 |
| 5,842,138 | A | 11/1998 | Lu |
| 5,887,256 | A | 3/1999 | Lu |
| 5,953,651 | A | 9/1999 | Lu |
| 5,999,813 | A | 12/1999 | Lu |
| 6,173,177 | B1 | 1/2001 | Lu |
| 6,198,941 | B1 | 3/2001 | Aho |
| 6,212,395 | B1 | 4/2001 | Lu |

(Continued)

FOREIGN PATENT DOCUMENTS

JP        2004-517574        6/2004

(Continued)

OTHER PUBLICATIONS

Office Action for U.S. Appl. No. 10/799,368 mailed Nov. 21, 2005.

(Continued)

*Primary Examiner*—Joseph H Feild
*Assistant Examiner*—Huy D Nguyen
(74) *Attorney, Agent, or Firm*—Schwabe, Williamson & Wyatt, P.C.

(57) ABSTRACT

A soft switch 134 providing wireless PBX voice services to a local area network (WLAN) is used to extend PBX functionality to the cellular domain. A dual mode remote unit is capable of receiving signals both in the cellular system as well as the WLAN. The cellular system is comprised of a data-bearing path and a voice-bearing path. When the dual mode remote unit is within the WLAN, it communicates both voice over IP (VoIP) signaling as well as session initiation protocol (SIP) control signaling over the WLAN. When the remote unit is outside the WLAN, it communicates voice signaling over the voice-bearing path of the cellular network using a standard cellular voice channel. In parallel, it uses the data-bearing path of the cellular network to transmit SIP control signaling.

25 Claims, 29 Drawing Sheets

U.S. PATENT DOCUMENTS

| | | | |
|---|---|---|---|
| 6,272,214 | B1 | 8/2001 | Jonsson |
| 6,353,745 | B1* | 3/2002 | Wehrend et al. ............ 455/466 |
| 6,404,764 | B1 | 6/2002 | Jones |
| 6,505,048 | B1* | 1/2003 | Moles et al. ............. 455/456.1 |
| 6,597,912 | B1 | 7/2003 | Lu |
| 6,680,923 | B1 | 1/2004 | Leon |
| 6,904,029 | B2 | 6/2005 | Fors |
| 6,944,144 | B2 | 9/2005 | Guo |
| 7,003,307 | B1 | 2/2006 | Kupsh |
| 7,010,300 | B1 | 3/2006 | Jones |
| 7,047,036 | B2 | 5/2006 | Shaheen |
| 7,519,075 | B2 | 4/2009 | Tu |
| 6,389,038 | B1 | 11/2009 | Goldberg |
| 2001/0002364 | A1 | 5/2001 | Lahtinen |
| 2002/0085516 | A1 | 7/2002 | Bridgelall |
| 2002/0131395 | A1 | 9/2002 | Wang |
| 2002/0132638 | A1 | 9/2002 | Plahte |
| 2002/0141390 | A1 | 10/2002 | Fangman |
| 2002/0142770 | A1 | 10/2002 | Goldberg et al. |
| 2002/0147008 | A1 | 10/2002 | Kallio |
| 2003/0217174 | A1 | 11/2003 | Dorenbosch |
| 2004/0008645 | A1 | 1/2004 | Janevski |
| 2004/0048612 | A1* | 3/2004 | Virtanen et al. .......... 455/426.1 |
| 2004/0072593 | A1 | 4/2004 | Robbins et al. |
| 2004/0192295 | A1 | 9/2004 | Tsao |
| 2004/0266426 | A1 | 12/2004 | Marsh et al. |
| 2005/0020250 | A1 | 1/2005 | Chaddha |
| 2005/0063359 | A1 | 3/2005 | Jagadeesan |
| 2005/0143053 | A1* | 6/2005 | Virtanen et al. .......... 455/414.1 |
| 2006/0025141 | A1 | 2/2006 | Marsh et al. |

FOREIGN PATENT DOCUMENTS

| | | | |
|---|---|---|---|
| WO | 9852325 | A2 | 11/1998 |
| WO | 0176276 | A3 | 10/2001 |
| WO | 02054820 | A2 | 7/2002 |
| WO | 03061177 | A2 | 7/2003 |

OTHER PUBLICATIONS

Final Office Action for U.S. Appl. No. 10/799,368 mailed Aug. 11, 2006.

International Search Report for PCT/US04/007324 mailed Aug. 30, 2004.

International Search Report for PCT/US03/032375 mailed Aug. 3, 2004.

Enterprise Voice Communications VoiceCon2003, Feb. 17-20, 2003, promotional pamphlet.

Cisco 3200 Series Mobile Access Routers, "Introduction"; http://www.cisco.com/en/US/products/hw/routers/ps272index.html; printed Nov. 13, 2002, 1 page.

Cisco 3200 Series Mobile Access Router Multimedia Web Page: Multimedia (Flash) Web Demo;http://www.cisco.com/warp/public/779/smbiz/flash/3200; printed Nov. 13, 2002, 1 page.

Cisco 3200 Series Mobile Access Router, "Production Implementation Design Guide";http:/www.cisco.com/en.../products_implementation_design_guide09186a00800f9287.html; printed Nov. 13, 2002, 7 pages.

BroadSoft Press Release, "Broadsoft Introduces IP Voice and IP Centrex for PDAs within 802.11 Wireless Networks", http://www.broadsoft.com/news/press_rel/PR-Wifi.html; printed Nov. 6, 2002, 2 of 3 pages.

BroadSoft "Product Information"; http://www.broadsoft.com/products.html; printed Oct. 29, 2002, 1 page.

BroadSoft "IP Centrex", http://www.broadsoft.com/products; undated, 2 pages.

BroadSoft "Softswitch Architecture"; http://www.broadsoft.com/products; undated, 1 page.

Wireless 3.0 Newsletter, "BroadSoft Introduces IP Voice and IP Centrex for PDAs Within 802.11 Wireless Networks", dated Oct. 21, 2002; http://www.wirelessarena.com/artman/publish/article_749.shtml; printed 19/29/02, 2 pages.

RadioFrame Networks, "Products - Get Converged!", undated, 2 pages.

RadioFrame Networks, "The RadioFrame System", undated, 2 pages.

RadioFrame Networks, "The RadioFrame System for GSM", undated, 2 pages.

RadioFrame Networks, "The RadioFrame System for GSM B Series", undated, 2 pages.

Amazon.com buying information: Voice Over IP Fundamentals by Jonathan Davidson, James Peters, Brian Gracely (Contributor) and Jim Peters; http://www.amazon.com/exec/obidos/tg/detail/-/15787016.../002-6677763-5500012?v=glanc:printed Oct. 4, 2002, 8 pages.

Yahoo! Financial News Press Release, "Nortel Networks Introduces New Enterprise Convergence Products"; dated Oct. 29 at 9:16 am ET, 5 pages.

GoBeam Find Me, "How GoBeam FindMe Benefits You"; http://www.gobeam.com/html/service/findme.html, printed Sep. 17, 2002, 4 pages.

Yahoo! News, "In Search of Voice-Over-Internet Cell Phones"; dated Sep. 13 at 1:33 pm;http://www.story.news.yahoo.com; printed Sep. 17, 2002, 4 pages.

Wireless NewsFactor, In Search of Voice-Over-Internet Cell Phones', by Jay Wrolstad, dated Sep. 13, 2002;http://www. newsfactor.com/perl/printer/19392; printed Sep. 17, 2002, 2 pages.

WirelessWeek, "Lucent Demos Wi-Fi/UMTS Roaming, But Share Price Dips", by Kristy Bassuener, dated Sep. 13, 2002; http://www.wirelessweek.com/index.asp?layout=newsat2direct&starting=4&pubdate=09.../0; printed Sep. 19, 2002, 2 pages.

Network Working Group, Internet Draft, "ISUP to SIP Mapping", dated Aug. 19, 2002;http://www.ietf.org/internet-drafts/draft-ietf-sipping-isup-06.txt; printed Sep. 30, 2002, 72 pages.

Sipping Working Group, Internet Draft, "Session Initiation Protocol Basic Call Flow Examples", dated Aug. 2002; http:// www.iett.org/internet-drafts/draft-ietf-sipping-basic-call-flows-00.txt; printed Sep. 30, 2002, 88 pages.

Internet Engineering Task Force, Internet Draft, "SIP Service Examples"; dated Jun. 2002;http://www.ietf.org/internet-drafts/draft-ietf-sipping-service-examples-02.txt; printed Sep. 30, 2002, 149 pages.

Telecom paper, "Motorola, Avaya and Proxim together in cellular, WLAN and IP", dated Jan. 14, 2003, http://www.telecom.paper.nl, 2 pages.

Ascendent Telecommunications, "Customer Solutions", printed Feb. 5, 2003; http://www.ascendenttelecom.com/customer/cust_solu.asp; 4 pages.

Ascendent Telecommunications, "Press Kit", printed Feb. 5, 2003:http://www.ascendenttelecom.com/presskit; 2 pages.

"WirelessConnect Functionality Summary", dated Feb. 6, 2003; http://www.ascendenttelecom.com, 2 pages.

Ascendent Telecommunications, "Company Information", http://www.ascendenttelecom.com/company/comp_info.asp; printed Feb. 27, 2003; 1 page.

Ascendent Telecommunications, "Product Information", http://www.ascendenttelecom.com/products/prod_info.asp; Feb. 27, 2003; 1 page.

Ascendent Telecommunications, "Product Information/AscendentMX"; http://www.ascendenttelecom.com/products/wc3000.asp; printed Feb. 27, 2003, 1 page.

Ascendent Telecommunications, Product Information/AscendentCS; http://www.ascendenttelecom.com/products/wc500.asp; printed Feb. 27, 2003; 1 page.

Ascendent Telecommunications, "Product Information/Benefits";http://www.ascendenttelecom.com/products/benefits.asp; printed Feb. 27, 2003; 2 pages.

Ascendent Telecommunications, "Product Information/Ascendent COG"; http://www.ascendenttelecom.com/products/cog.asp; printed Feb. 27, 2003, 2 pages.

Call Flow Diagram; undated; 1 page.

WirelessConnect Functionality Summary; undated; 1 page.

Network Working Group, Request for Comments, "The PINT Service Protocol", dated Jun. 2000; http://www.ietf.org/rfc/rfc2848.txt?number=2848; printed Feb. 27, 2003, 64 pages.

Handly/Schulzrinne/Schooler/Rosenberg: "SIP: Session Initiation Protocol" RFC 2543BIS-02, Nov. 12, 2000.

Bott et al., Special Edition Using Windows 95 with Internet Explorer 4.0, Feb. 17, 1998, chapter 20, section 7.

Keagy, Integrated Voice and Data Networks, Oct. 20, 2000, chapter 11, section 4.

Rosenberg et al., RFC 3261 - SIP: Session Initiation Protocol, Jun. 2002, pp. 9 and 15.

Keagy, Integration Voice and Data Networks, Oct. 20, 2000, Cisco Press, chapter 11, section 2.

Mark Stemm, H. Katz, Vertical handoffs in wireless overlay networks, Mobile Networks and Applications, 1998, vol. 3, Issue 4, pp. 335-350, ISSN: 1383-469X.

Ohta Ken, et al., "Shimuresu Sabisu Jitsugen notameno Mobairu Maruchi Midoruwea [Mobile Multimedia Middleware for Seamless Service]", IPSG SIG Technical Report, Japan, Information Processing Society of Japan, Sep. 7, 2001, vol. 2001, No. 83, pp. 261-268, 2001-MBL-18, 2001-ITS-6.

Office Action for U.S. Appl. No. 11/140,465 mailed Sep. 4, 2008.

Final Office Action for U.S. Appl. No. 11/140,465 mailed Jun. 9, 2009.

Office Action for U.S. Appl. No. 11/140,465 mailed Oct. 27, 2009.

Japanese Office Action for 2006-507045 mailed Sep. 30, 2009.

* cited by examiner

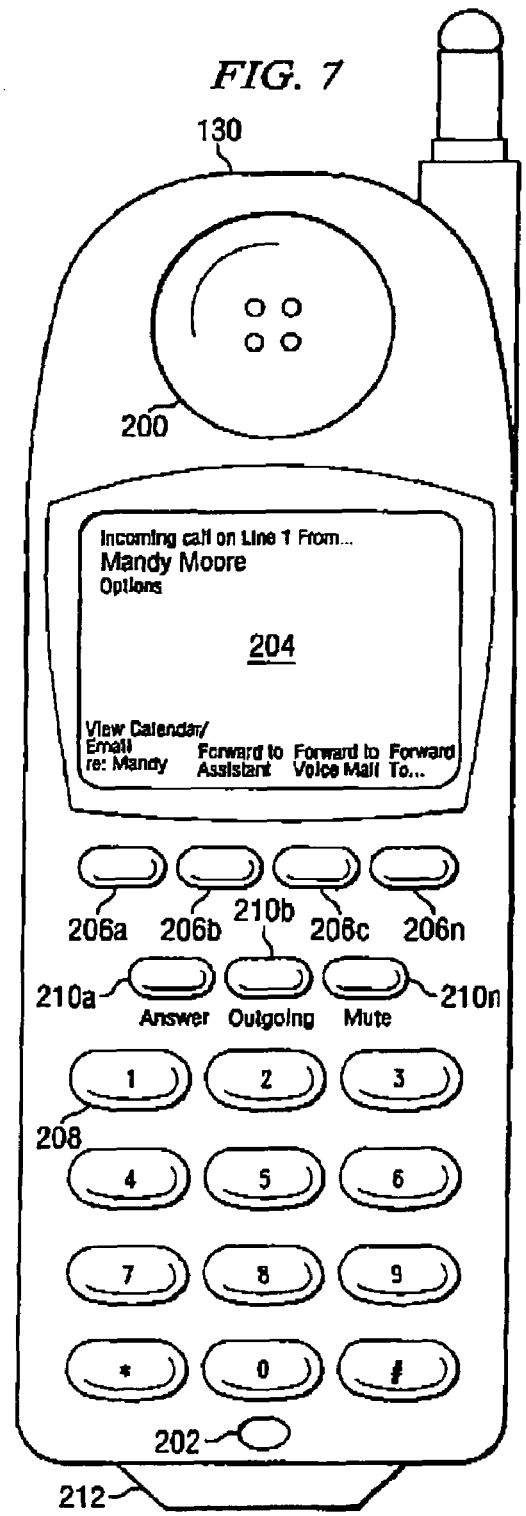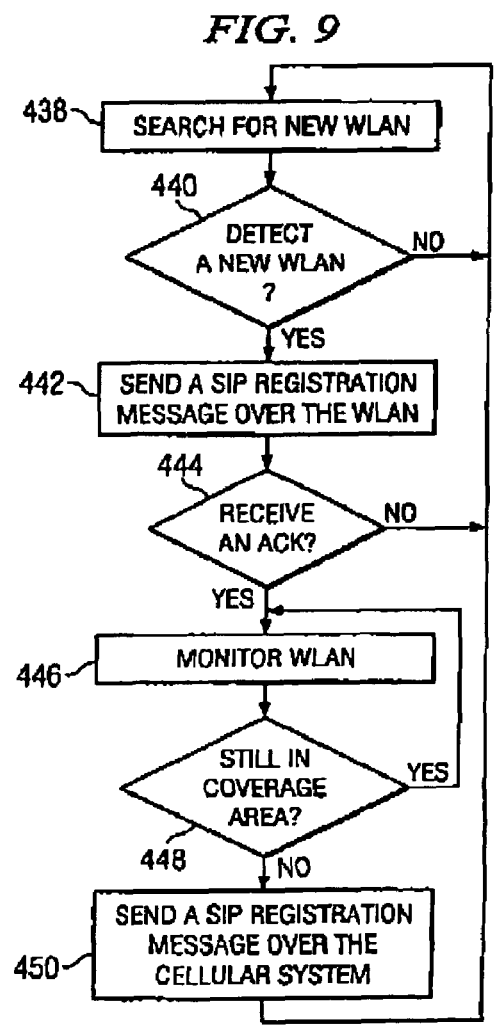

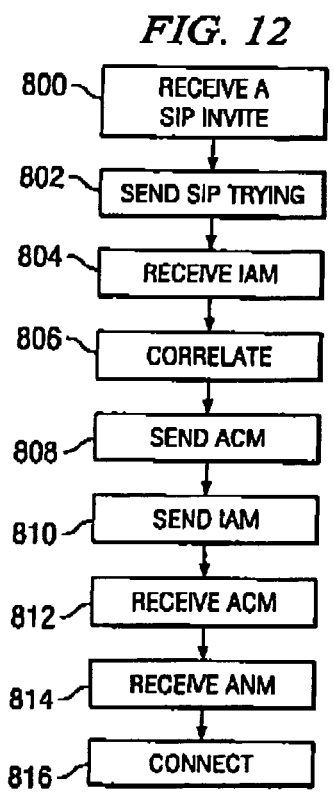
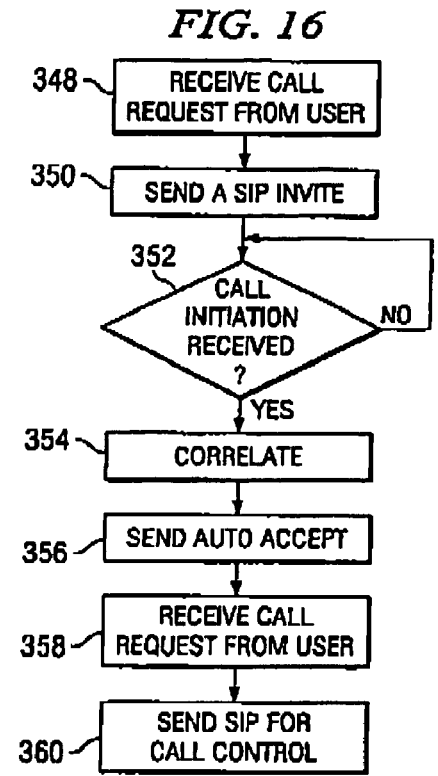
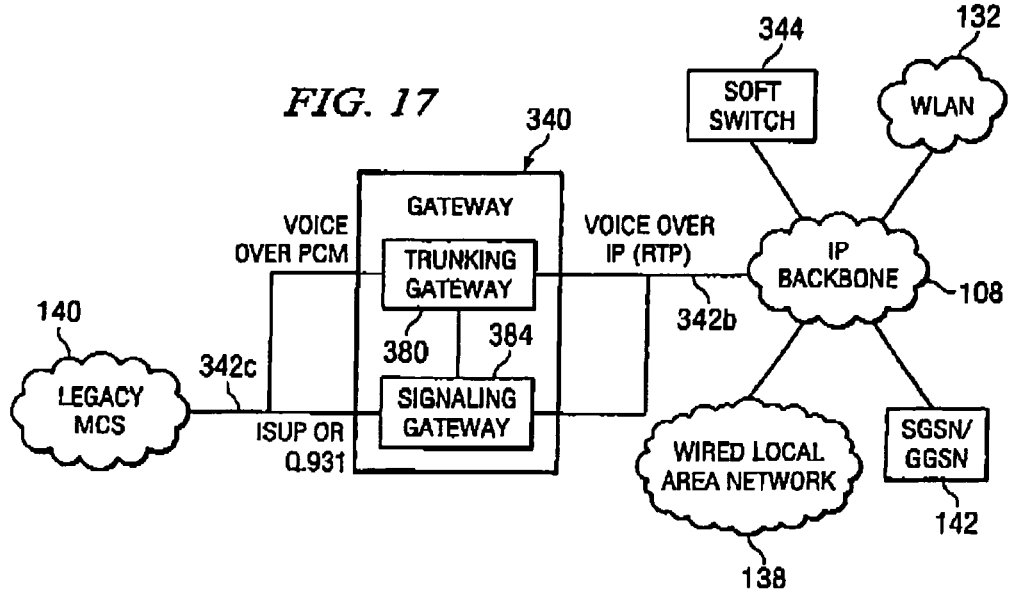

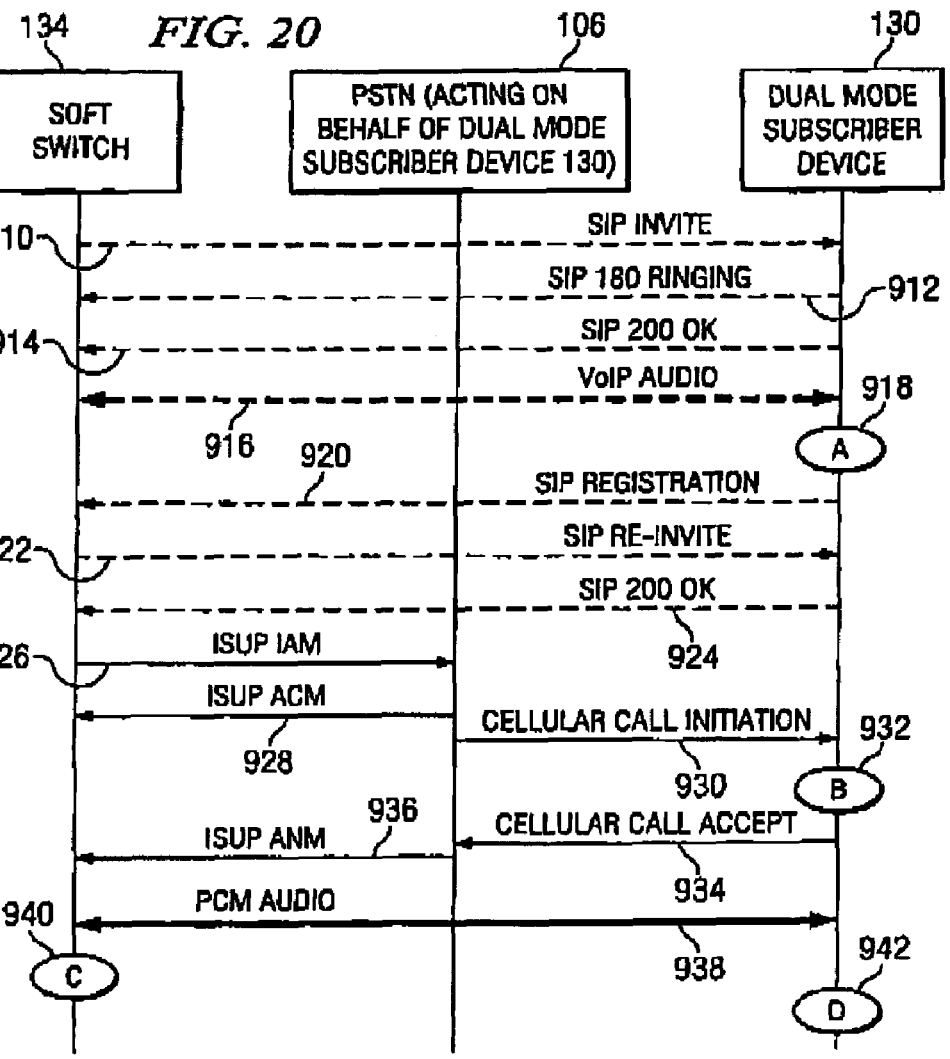
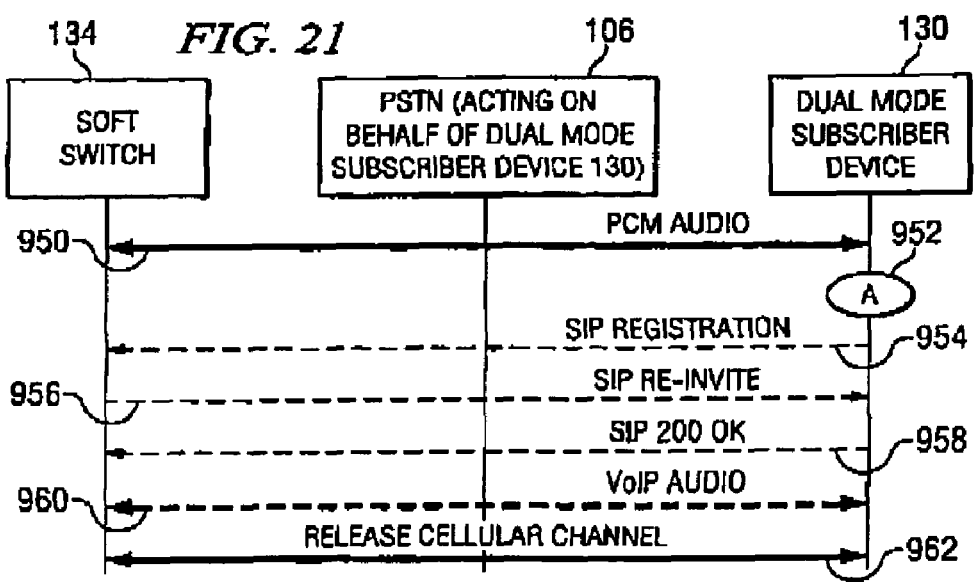

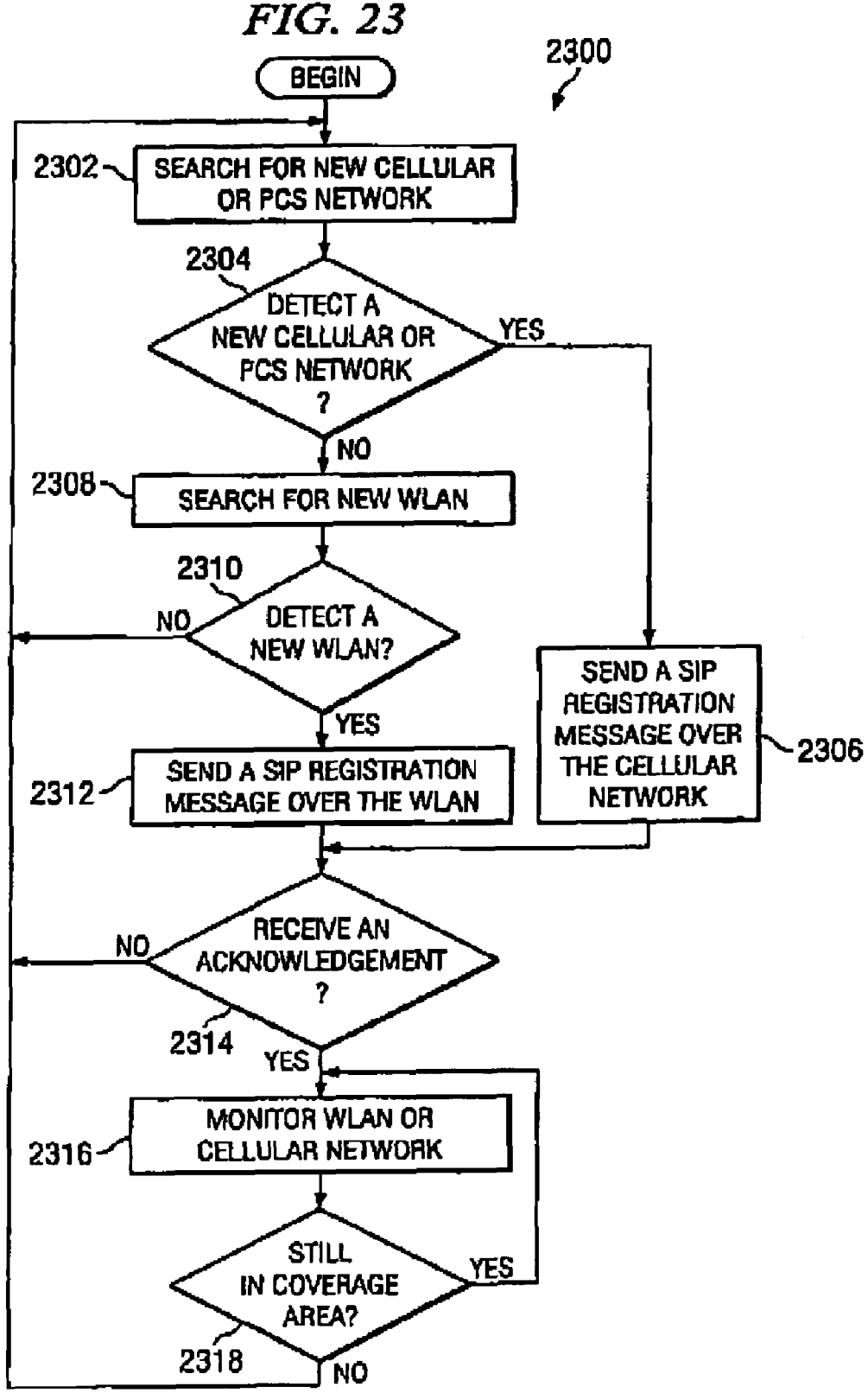

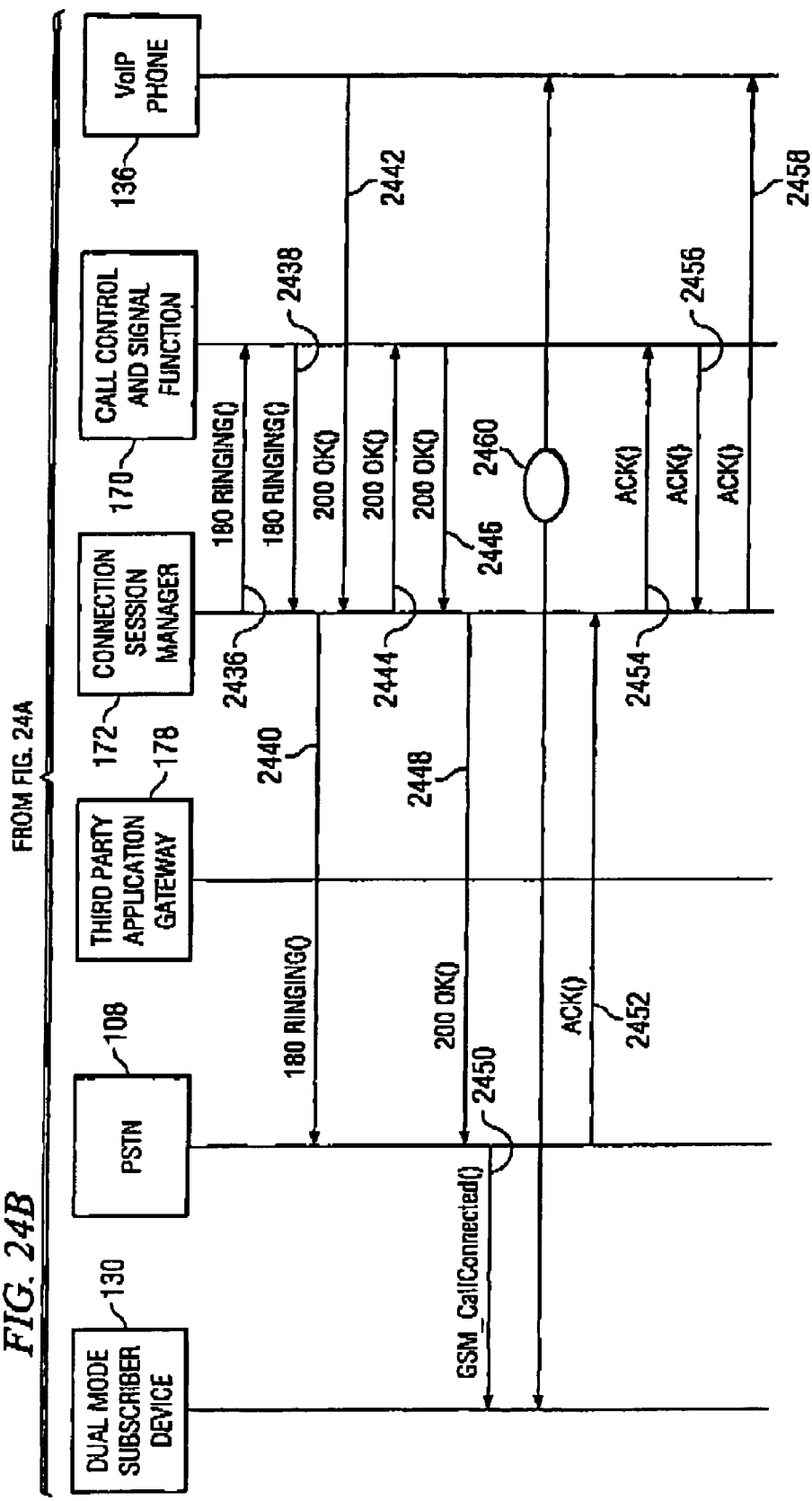

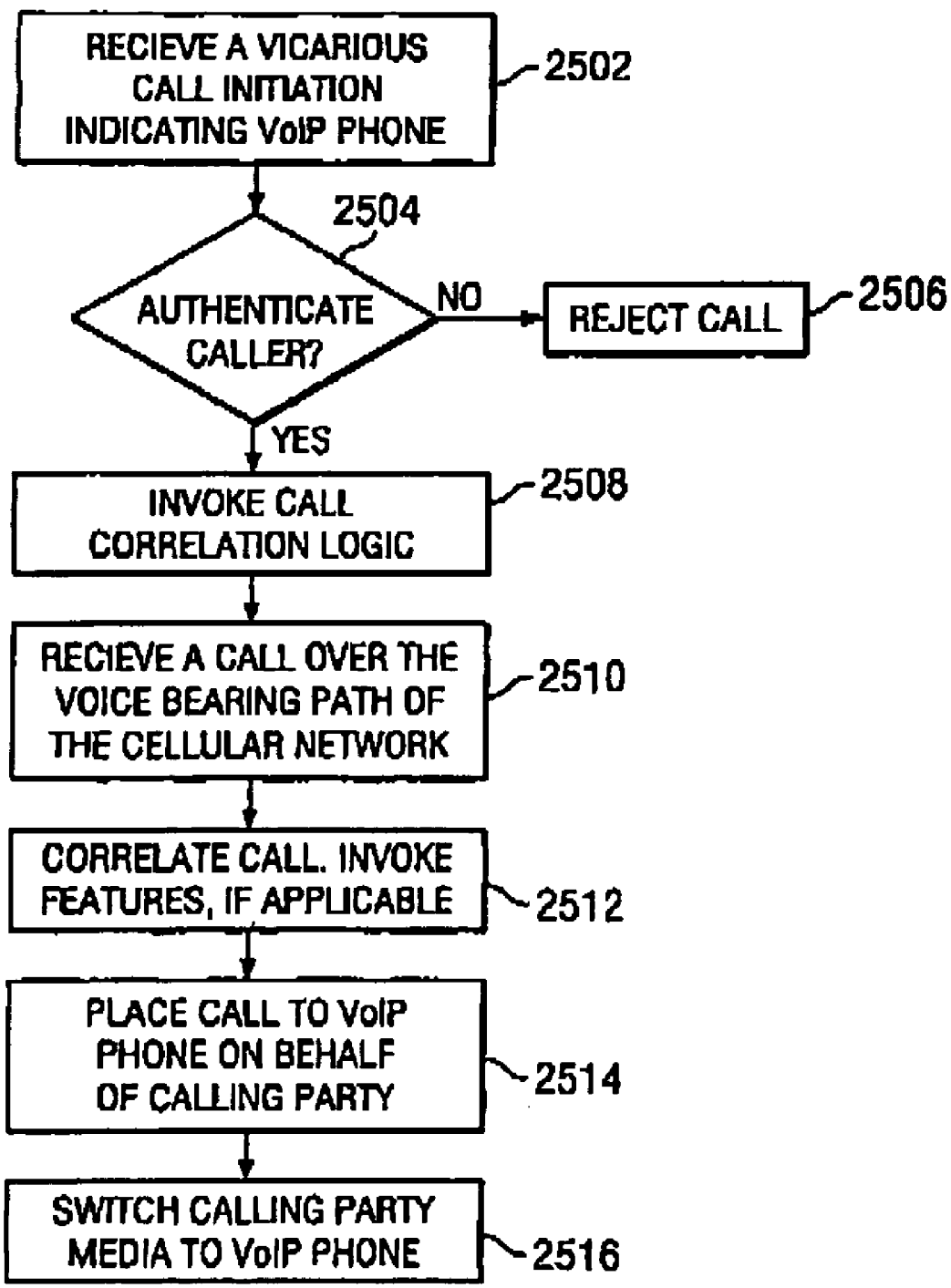

US 7,742,768 B2

EXTENSION OF A LOCAL AREA PHONE SYSTEM TO A WIDE AREA NETWORK

RELATED APPLICATIONS

This application is a continuation-in-part of U.S. patent application Ser. No. 10/317,035, filed Dec. 9, 2002, which claims benefit of U.S. Provisional Application No. 60/417,671, filed Oct. 10, 2002. Furthermore, this application is related to U.S. patent application Ser. No. 10/799,368, filed Mar. 12, 2004, which claims benefit of U.S. Provisional Application No. 60/454,877, filed Mar. 12, 2003 and U.S. patent application Ser. No. 11/140,465 filed May 27, 2005.

BACKGROUND

1. Field of the Invention

Aspects of the invention relate to communication networks and, to mobility-capable wireless voice and data communication networks.

2. Description of the Related Art

The average business professional has become accustomed to the wide range of features available to him on his desk phone. However, when he is out of the office, these features are not available to him, even if he carries a cell phone. Simple call forwarding can be used to re-route calls placed to the desk phone so that they are received instead at a cell phone. But, this simple forwarding mechanism does not provide the user with the features to which he has become accustomed at his desktop.

SUMMARY

The systems and methods of the invention have several features, no single one of which is solely responsible for its attributes. Without limiting the scope of the invention as expressed by the claims, which follow, its more prominent features will now be discussed briefly. After considering this discussion, and particularly after reading the section entitled "Detailed Description" one will understand how the features of the system and methods provide several advantages over traditional communication systems.

One aspect is a soft switch 134 for use in cooperation with a communication system, including a cellular network having a voice-bearing path and a data-bearing path and a wireless local area network. The soft switch 134 comprises a first gateway configured to be coupled to the voice-bearing path of the cellular network and a gateway controller module in communication with the first gateway and configured to provide Private Branch Exchange (PBX) services to the wireless local area network and further configured to switch a voice call over the voice-bearing path of the cellular network using the first gateway. The gateway controller module includes a call control function module configured to be coupled to the wireless local area network and the data-bearing path of the cellular network to create messaging concerning the voice call for transmission over the data-bearing path of the cellular network.

Another aspect is an apparatus for call connection comprising means for sending a first SIP invite message to a remote unit over a data-bearing path of a cellular network indicating a call establishment attempt and means for sending a corresponding initiation message to the remote unit over a voice-bearing path of the cellular network.

Another aspect is a method of call connection for use in a communication system including a cellular network having both a data bearing path and a voice-bearing path for communicating with remote units. The method comprising sending a first SIP invite message to a remote unit over the data-bearing path of the cellular network indicating a call attempt and sending a corresponding initiation message to the remote unit over the voice-bearing path of the cellular network.

Still another aspect is a telephone switch comprising means for receiving a Session Initiation Protocol (SIP) invite message over a data-bearing path of a cellular network, the SIP invite specifying a called party and a calling party, means for receiving a Public Switched Telephone Network (PSTN) call initiation from the calling party over a voice-bearing path of the cellular network, the call initiation specifying a surrogate called party, and means for switching a call leg corresponding to the calling party to a call leg corresponding to the called party to establish a voice call.

Yet another aspect is a method of switching a telephone call comprising receiving a SIP invite message initially transmitted over a data-bearing path of a cellular network by a calling party, the SIP invite message specifying a called party and the calling party, receiving a PSTN call initiation from the calling party over a voice-bearing path of the cellular network, the call initiation specifying a surrogate called party, and switching a call leg corresponding to the calling party to a call leg corresponding to the called party to establish a voice call.

A further aspect is a method of establishing a telephone connection comprising sending a PSTN call initiation message from a cellular subscriber device specifying a surrogate called number and sending an invite message from the cellular subscriber device over a data-bearing path of the cellular network specifying an actual called number.

Another aspect is an apparatus for establishing a telephone connection that comprises means for sending a PSTN call initiation message specifying a surrogate called number and means for sending an invite message over a data-bearing path of a cellular network specifying an actual called party.

Yet another aspect is an apparatus for establishing a telephone connection comprising means for receiving a call initiation message designating a remote unit by an identifier, means for sending a PSTN call initiation message to the remote unit designated by a cellular telephone number different from the identifier, and means for sending an SIP invite message over a data-bearing path of a cellular network to the remote unit.

Still another aspect is a method of establishing a telephone connection comprising receiving a call initiation message designating a remote unit by an identifier, sending a call initiation message specifying the remote unit designated by a cellular telephone number different from the identifier, and sending an SIP invite message over a data-bearing path of a cellular network to the remote unit.

Still yet another aspect is a method of placing a call comprising sending a call initiation message specifying a telephone number associated with a soft switch 134 as a called party; wherein the call initiation message is sent over a voice-bearing path of a cellular network and sending an SIP invite message over a data-bearing path of the cellular network to the soft switch 134, the SIP invite message specifying an actual called party.

Another aspect is a device for placing a call comprising means for sending a call initiation message specifying a telephone number associated with a soft switch 134 as a called party; wherein the call initiation message is sent over a voice-bearing path of a cellular network and means for sending an SIP invite message over a data-bearing path of the cellular network to the soft switch 134, the SIP invitation message specifying an actual called party.

Still another aspect is a communication system comprising a soft switch 134 configured to communicate SIP signaling over a data-bearing path of a cellular system and configured to communicate PSTN signaling in IP format to a media gateway associated with the cellular system.

Another aspect is a communication system comprising a telephone switch that communicates SIP signaling over a data-bearing path of a cellular system and having an output for communicating PSTN signaling in IP format over an IP network and a media gateway coupled to the IP network and configured to receive the PSTN signaling in IP format and translate the PSTN signaling in IP format into standard PSTN signaling.

Still another aspect is an apparatus such as a remote unit or a telephone switch comprising means for receiving a SIP invite message over a data-bearing path of a cellular network, the SIP invite message specifying a called party and a calling party, means for receiving a call initiation message over a voice-bearing path of the cellular network, and means for correlating the SIP invite message with the call initiation message.

Yet another aspect is an apparatus such as a remote unit or a telephone switch comprising means for receiving a SIP invite message over a data-bearing path of a cellular network, the SIP invite message specifying a called party and a calling party and means for sending a call initiation message over a voice-bearing path of the cellular network in response thereto.

A further aspect is a method of call processing comprising receiving a SIP invite message over a data-bearing path of a cellular network, the SIP invite specifying a called party and a calling party, receiving a call initiation message over a voice-bearing path of the cellular network, and correlating the SIP invite message with the call initiation message.

Another aspect is a method of call processing comprising receiving a SIP invite message over a data-bearing path of a cellular network, the SIP invite specifying a called party and a calling party, sending a first responsive call initiation message over a voice-bearing path of the cellular network to the calling party, and sending a second responsive call initiation message to the calling party.

Still another aspect is a method of call processing comprising receiving a SIP invite message over a data-bearing path of a cellular network, the SIP invite specifying a calling party, automatically sending a responsive call initiation message over a voice-bearing path of the cellular network, commanding a user interface to provide an alert to a user, and awaiting an indication of user acceptance.

Another aspect is a method of switching a telephone call comprising receiving a SIP invite message over a data-bearing path of a cellular network, the SIP invite specifying a called party and a calling party, initiating a first leg of a voice call to the called party, initiating a second leg of the voice call to the calling party, and switching the first leg to the second leg to establish the voice call.

An aspect is an apparatus for switching a telephone call comprising means for receiving a SIP invite message over a data-bearing path of a cellular network, the SIP invite specifying a called party and a calling party, means for initiating a first leg of a voice call to the called party, means for initiating a second leg of the voice call to the calling party, and means for switching the first leg to the second leg to establish the voice call.

Yet another aspect is a remote unit comprising a cellular front end configured to receive information over a data-bearing path and a voice-bearing path of a cellular network, an SIP processor module coupled to the cellular front end and configured to process SIP messaging received over the data-bearing path, and a controller for correlating the SIP messaging received over the data-bearing path with a voice call received over the voice-bearing path.

Still another aspect is a method of registration comprising detecting a departure from the coverage area of a wireless local area network and sending a registration message over a data-bearing path of a cellular network in response to the departure.

Yet another aspect is a soft switch 134 comprising an internet protocol port, a PSTN port, a trunking gateway coupled to the internet port and the PSTN port and configured to translate between voice over IP packets and legacy voice format signaling, and a signaling gateway coupled to the internet port and the PSTN port and configured to translate between PSTN control signaling in IP format and traditional PSTN control signaling.

A further aspect is a method of call initiation from a cellular subscriber device comprising receiving an indication of a user's intention to place a call, initiating a cellular call to a predetermined surrogate number, and subsequently, receiving an indication of a phone number from the user.

A still further aspect is a method of call initiation from a cellular subscriber device comprising receiving an indication of a user's intention to place a call, sending an IP message over a data bearing path of a cellular network, the IP message signaling a receiving switch to initiate a call to the cellular subscriber device, and subsequently, receiving an indication of a phone number.

BRIEF DESCRIPTION OF THE DRAWINGS

Throughout these figures, like reference numbers are used to designate like elements.

FIG. 7 is a drawing of a dual mode subscriber device 130 embodiment.

FIG. 9 is a flowchart of a process embodiment by which the dual mode subscriber device 130 registers its location.

FIG. 12 is a flowchart of the operation of the soft switch 134 embodiment for a remote unit initiated call.

FIG. 16 is a flowchart of the operation of the subscriber device operation in a system embodiment employing a responsive soft switch 134 initiation strategy.

FIG. 17 is a block diagram of the media gateway embodiment.

FIG. 20 is a call flow diagram illustrating a handoff embodiment between the WLAN to the cellular network.

FIG. 21 is a call flow diagram illustrating handoff embodiment from the cellular network to the WLAN.

FIG. 23 is a flowchart illustrating an alternate handoff process embodiment between the cellular network and the WLAN.

FIG. 25 is a flowchart illustrating one embodiment of the operation of the soft switch 134 processing a call initiation from a remote unit operating in the cellular system.

DETAILED DESCRIPTION

In a typical office environment, each user is provided with a high functionality desktop phone. These phones provide the user a myriad of features including, for example, the ability to use abbreviated dialing for internal numbers, to transfer a call to another internal number, external number or voice mail, to invoke do-not-disturb features, to program roll-over of unanswered calls, to retrieve voice mail with a single touch, to establish conference calls and the like. Although these features are easily accessed from the desktop phone, they are not available when the user is out of reach of his desktop phone such as when he is on travel, out to lunch or even just a few steps from his office door.

Several wireless systems have been developed to carry local area Internet Protocol (IP) services, such as voice over IP (VoIP.) For example, the standard 802.11b promulgated by the IEEE is a common standard that defines many aspects of networks that provide in-building wireless IP-based coverage. A single 802.11b access point provides a coverage area of about 100 meters in diameter. By networking these access points together in a grid, seamless coverage can be provided over a localized area to create a wireless local area network (WLAN.)

Symbol Technologies of Holtsville, N.Y., USA, Spectralink of Boulder, Colo., USA and several other companies have developed wireless handsets that can be used to carry wireless voice traffic over such systems. For example, Symbol Technologies has developed the NetVision Phone. The NetVision Phone provides VoIP communications over 802.11b LAN installations using the ITU standard H.323. The NetVision Phone converts analog voice into compressed digital packets that are sent via the TCP/IP protocol over standard data networks.

Figure 1:
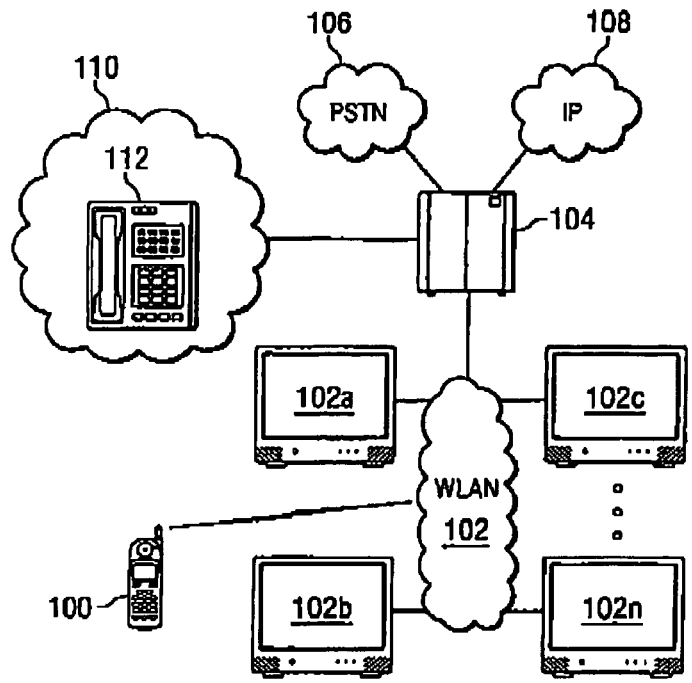
FIG. 1 is a network diagram showing a network embodiment incorporating wireless voice over IP capabilities.

FIG. 1 shows a network incorporating wireless voice over IP capabilities. A VoIP wireless phone 100 communicates encoded IP packets to one of the access points 102A-102N. The access points 102A-102N provide the physical footprint of a WLAN 102 and pass the IP packets to and from a private branch exchange (PBX) telephone switch 104. If the PBX switch 104 is an IP-based device, it will directly accept the IP packets. If the PBX switch 104 is a legacy machine, a VoIP gateway (not shown) can be used to interface the access points 102A -102N to the PBX switch 104. The PBX switch 104 provides call control and routing functions. The PBX switch 104 can route calls either to a public switched telephone network (PSTN) 106 or over an IP backbone 108. Typically such systems also include a wired local area network 110 that provides service to wired desktop phones such as a desk phone 112. The wired local area network 110 may be IP-based, a legacy system or a combinations of these.

If the PBX switch 104 is a part of an IP based phone system, the PBX 104 may use control signals, such as session initiation protocol (SIP), to provide call control processing. SIP defines the protocol mechanism necessary to provide call establishment, call forwarding, caller and called number delivery (often used to provide caller ID), remote unit capability negotiation, caller and called party authentication, caller and called device authentication, call transfer, conference calling and other calling features. However, other signaling mechanisms can also be used such as Skinny Station Protocol, which is Cisco's proprietary implementation of the H.323 IP telephony model. Using such a system, the wireless phone 100 can provide some of the same features available in the desktop phone 112 as the user wanders throughout the coverage area of the WLAN 102. However, once the user exits the coverage area of the WLAN 102, his wireless phone 100 is no longer capable of receiving calls at all. If the user has a cell phone, he can program the PBX switch 104 to forward incoming calls to his cell phone. However, simple forwarding does not provide the desktop features to which the user has grown accustomed. In addition, the user is required to carry two different devices.

Figure 2:
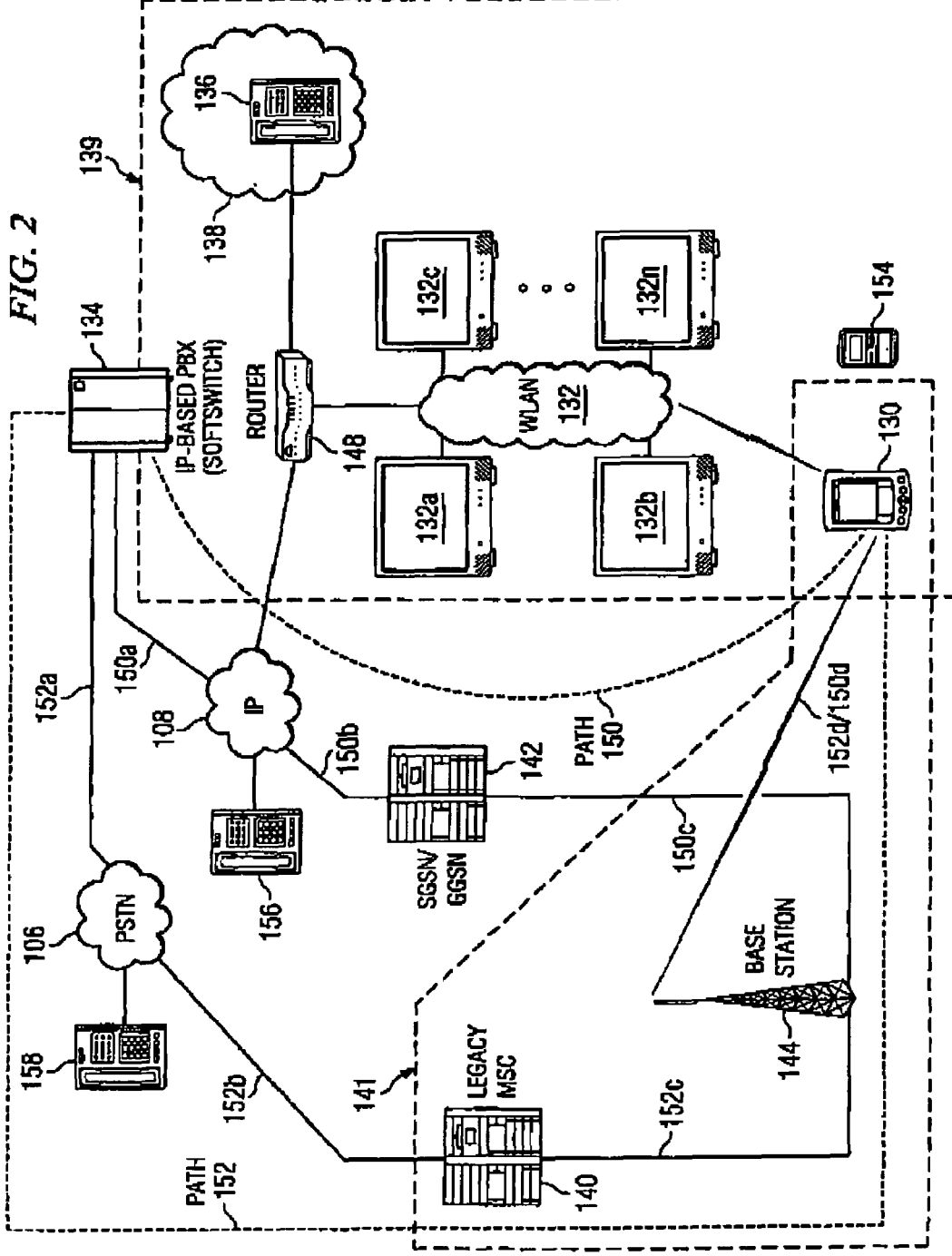
FIG. 2 is a network diagram showing a network embodiment with SIP features in a cellular system.

FIG. 2 is a network diagram depicting a collection of related and interconnected networks including the PSTN 106 and the IP backbone 108. A local network 139 can include a WLAN 132 with wireless access points 132A-132N. The WLAN 132 can be an IP based system. In the example that follows, the WLAN 132 is an 802.11b compatible system. However, in other embodiments, other IP-based wireless systems can be used. For example, other suitable wireless local area network standards include 802.11g, 802.11a, HomeRF, Bluetooth, and HiperLAN. In addition, new IP-based systems are likely to be brought to market in the future, which can also be used.

A router 148 is coupled to the WLAN 132, to the IP backbone 108 and to a local area network (LAN) 138 that is not wireless. For example, the LAN 138 can include desk phones such as desk phone 136 on its network and can be a traditional wired IP based PBX network.

An IP based PBX soft switch 134 is coupled to the local network 139 via the IP backbone 108 to the router 148. The soft switch 134 is also coupled to the PSTN 106. The soft switch 134 can provide VoIP services to the WLAN 132 and to the wired local area network 138, including, of example, the IP desk phone 136. The soft switch 134 also can provide PBX services to user devices such as the desk phone 136.

One or more wide area networks are represented by cellular network 141 in FIG. 2. The wide area network is referred to as a cellular network and, more specifically, can be a Global System for Mobile Communications (GSM) system that incorporates General Packet Radio Service (GPRS). However, other wide area networks can be used. For example, CDMA cellular networks with IP data communication capability (such as, for example, CDMA 1XRTT), I-Mode IP-based service from DoCoMo of Japan as well as voice service over their Personal HandyPhone System and Nextel's voice and data services over a Motorola IDEN system can be used. In addition, other existing and later developed wide area wireless networks that allow for transmitting control signals and voice information to end user devices can also be used.

The cellular network 141 includes one or more legacy mobile switching centers (MSC) 140, which control the cellular, network 141 and provide a connection to the PSTN 108. One or more base stations are represented by base station 144 that transmits and receives the wireless cellular communication signals to user devices. The IP backbone 108 is coupled to the cellular network 141 by a gateway GPRS support node (GGSN) and in turn to a serving GPRS support node (SGSN) which are represented as a combined SGSN/GGSN 142 in FIG. 2. One feature of the system shown in FIG. 2 is that, in one embodiment, it can operate without demanding any changes to the cellular infrastructure. Thus, the MSC 140 and the SGSN/GGSN 142 operate in the standard manner well known in the art. As such, in addition to other functions, the SGSN/GGSN 142 serves as a gateway between a group of cellular base stations 144 and the IP backbone 108.

A remote unit is shown in FIG. 2 as a dual mode subscriber device 130. The subscriber device 130 is enabled to communicate over the WLAN 132 and the wide area cellular network 141. When the dual mode subscriber device 130 is within the coverage area of the WLAN 132, the dual mode subscriber device 130 communicates VoIP packets to and from the WLAN 132. The dual mode subscriber device 130 is described in more detail below in connection with FIGS. 7 and 8.

In one embodiment, each dual mode subscriber device 130 is associated with a specific desk phone 136. Each dual mode subscriber device 130 can be associated with a specific user. In one embodiment, a user enters the settings associated with the operation of the dual mode subscriber device 130 through the dual mode subscriber device 130 or the desk phone 136 or a computer. In one embodiment, the desk phone 136 is a SIP phone controlled through a web browser. Using the computer-based controls, the user can designate a series of entries in his contact list as falling in one of several categories. Additionally, the user can enter and/or select rules for the processing or handling of calls based upon, for example, the originating caller, the time and/or day of the call, whether the user is currently utilizing the desk phone or the subscriber device and whether the user is within the WLAN or a cellular network. The soft switch 134 can access the contact list and use the categories and rules for call processing. For example, the soft switch 134 can use the contact list and categories to determine whether to route a call to the dual mode subscriber device 130, such as based on time of day, caller identity, the location of the dual mode remote unit, the location of the user and the like. The desk phone 136 can include a docking station for the dual mode subscriber device 130, battery charging sockets and the like. In addition, the desk phone 136 can incorporate access point functionality so that it is also a portion of the WLAN 132. In one mode of operation, the soft switch 134 rings the desk phone 136 for all incoming calls regardless of whether it rings the dual mode subscriber device 130.

When the dual mode subscriber device 130 is within the coverage area of the WLAN 132, incoming calls can be routed to and from the dual mode subscriber device 130 over the WLAN 132. For example, the soft switch 134 can switch an incoming VoIP call from a VoIP phone 156 to the dual mode subscriber device 130. In addition, the soft switch 134 is also coupled to the PSTN 106 and acts as a VoIP gateway to switch a legacy PSTN voice format call (typically pulse code modulated (PCM)), such as from a legacy phone 158 to the IP-based dual mode subscriber device 130.

When the dual mode subscriber device 130 leaves the coverage area of the WLAN 132, the dual mode subscriber device 130 begins to communicate under the control of the soft switch 134 using a wide area cellular network such as a GPRS enabled GSM system. The connection between the soft switch 134 and the dual mode subscriber device 130 through the cellular network can be formed by two types of bi-directional paths. The path 150A-D is a standard cellular data path. The path 152A-D is a standard cellular voice path. Both of these paths 150 and 152 are made up a series of legs.

Intuitively, one might suppose that voice-bearing IP packets (VoIP bearer transport) could be transmitted over the standard cellular data-bearing path (such as the path 150). However, the standard cellular data path does not provide the quality of service necessary to carry voice-bearing IP packets whereas the legacy cellular voice path (such as path 152) has been explicitly optimized for efficient transmission of voice. For example, the capacity, latency and jitter characteristics of the data-bearing path do not lend themselves to transmission of voice-bearing IP packets with the quality expected by the end user. In addition, the transmission of VoIP data over the data-bearing path of the cellular network is not as efficient as the highly optimized voice-bearing path and, thus, does not make efficient use of the precious wireless link resources.

The soft switch 134 is coupled to the IP backbone 108 by the leg 150A. In turn, the IP backbone 108 is coupled to a gateway GPRS support node and in turn to a serving GPRS support node (SGSN/GGSN) 142 by the leg 150B. One feature of the system shown in FIG. 2 is that, in one embodiment, it can operate without demanding any changes to the cellular infrastructure. Thus, the SGSN/GGSN 142 operates in the standard manner well known in the art. As such, in addition to other functions, the SGSN/GGSN 142 serves as a gateway between a group of cellular base stations 144 and the IP backbone 108. The base stations 144 can be distributed throughout a large cellular footprint. The SGSN/GGSN 142 is coupled to the base station 144 by the leg 150C. The base stations 144 are wirelessly coupled to the cellular remote units including dual mode subscriber device 130 by the leg 150D and, in one aspect, are used to communicate data information in IP packets. Thus, the bi-directional path 150 is a standard cellular data path from an IP entity to a remote unit. The bi-directional path 150 connects the soft switch 134 to the IP backbone 108 by the leg 150A to the SGSN/GGSN 142 by the leg 150B to the base station 144 by the leg 150C and to the dual mode subscriber device 130 by the leg 150D.

The user may also carry other cellular enabled data devices. For example, the user may carry a Palm Pilot type device, a BlackBerry type device, a PocketPC type device, pager or the like. In FIG. 2, a data device 154 is also capable of sending and receiving SIP messaging such as over the data-bearing path of the cellular system.

The soft switch 134 is also coupled to the PSTN 106 by the leg 152A. In turn, PSTN 106 is coupled to a legacy mobile switching center (MSC) 140 by the leg 152B. As noted above, one feature of the system shown in FIG. 2 is that, in one embodiment, it can operate without demanding any changes to the cellular infrastructure including the legacy MSC 140. Thus, the legacy MSC 140 operates in the standard manner well known in the art. As such, in addition to other functions, the legacy MSC 140 serves as a voice gateway between the group of base stations 144 and PSTN 106. The legacy MSC 140 is coupled to the base station 144 by the leg 152C. The base station 144 communicates wireless voice information with the dual mode subscriber device 130 over the leg 152D. (Although on FIG. 2, the leg 150D and the leg 152D are illustrated by a common "lightning bolt" icon, the paths themselves can be different in terms of coding, access techniques, data formats and the like.)

In the embodiment shown in FIG. 2, the soft switch 134 can be implemented in a centrex model whereby a substantial portion of the equipment executing the soft switch 134 function is located off the premise in which service is provided. Centrex models are commonly used in both IP-based and legacy voice systems to provide customers with PBX features. In the IP centrex model, for calls between two VoIP parties, voice-bearing IP packets are routed on an efficient path between the two parties. Thus, often the voice-bearing traffic stream is not routed through the soft switch 134. The signaling packets related to voice calls within the WLAN 132 and wired local area network 138 (such as the SIP packets) can be routed through the off-site soft switch 134 via the on-premise router 148 according to well-known mechanisms. In some implementations, the soft switch 134 is distributed and equipment is located in more than one location according to well-known techniques.

In other embodiments, the soft switch 134 function is hosted at a collocation facility or installed at a telephone central office or integrated more closely with the cellular infrastructure. In yet other embodiments, the soft switch 134 is located on-site at the premise of the coverage area of WLAN. In yet further embodiments, the soft switch 134 functions may be more cellular carrier-focused and implemented, for example, under a carrier-hosted model.

Figure 3:
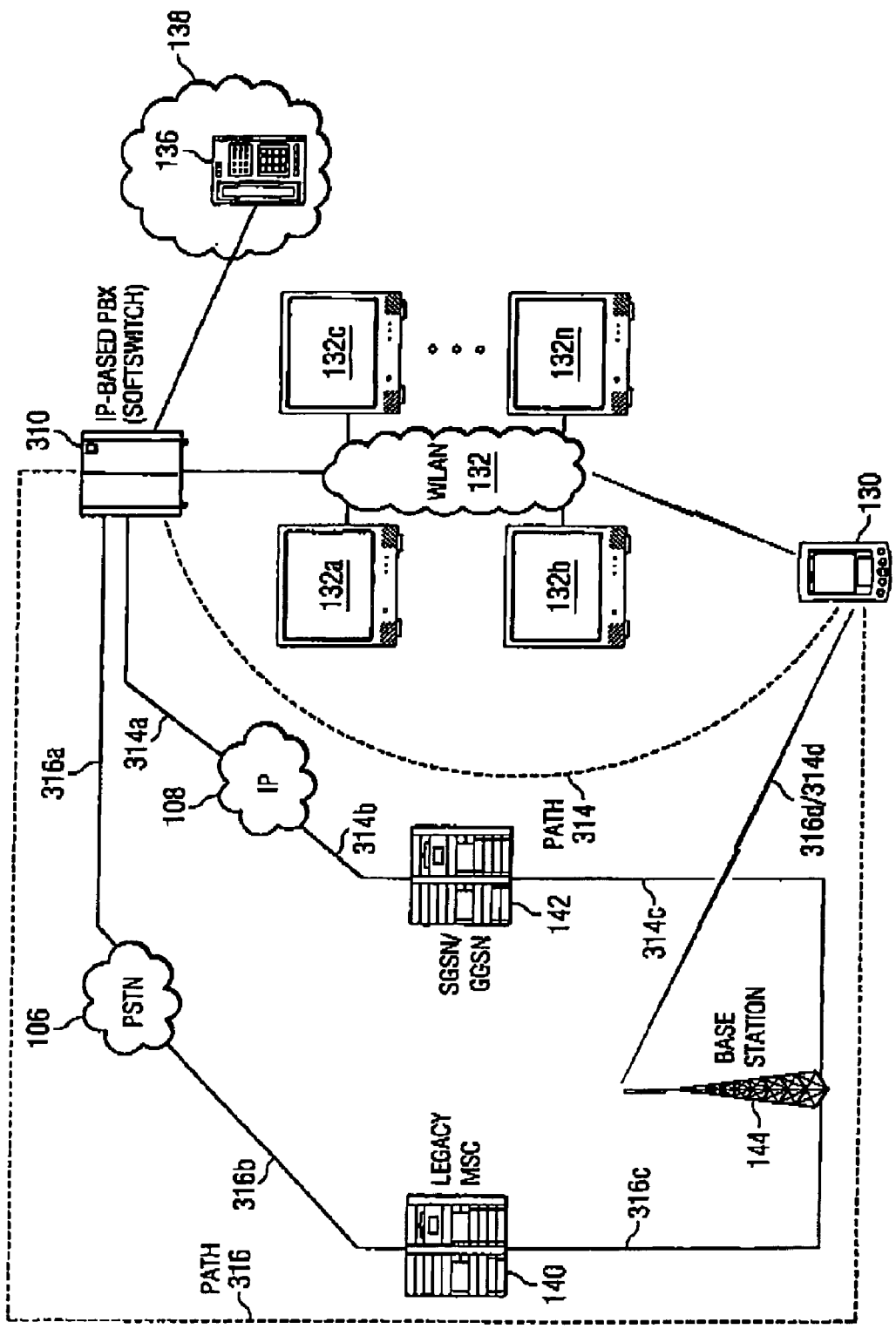
FIG. 3 is a network diagram showing a network embodiment wherein the soft switch 134 is located at the premise of the wireless local area network.

FIG. 3 shows a network operating in an on-site model where the on-site soft switch 134 310 is located on the premise of the WLAN 132 and the wired local area network 138. According to FIG. 3, a bi-directional path 314A-D is a standard cellular data path from an IP entity to a remote unit: from the soft switch 134 310 to the IP backbone 108 by a leg 314A to the SGSN/GGSN 142 by a leg 314B to the base station 144 by a leg 314C and to the dual mode subscriber device 130 by a leg 314D. A bi-directional path 316A-D is a standard cellular voice path from a PSTN entity to a remote unit: from the soft switch 134 310 to the PSTN 106 by a leg 316A to the legacy MSC 140 by a leg 316B to the base station 144 by a leg 316C and to the dual mode subscriber device 130 by a leg 316D.

Figure 4:
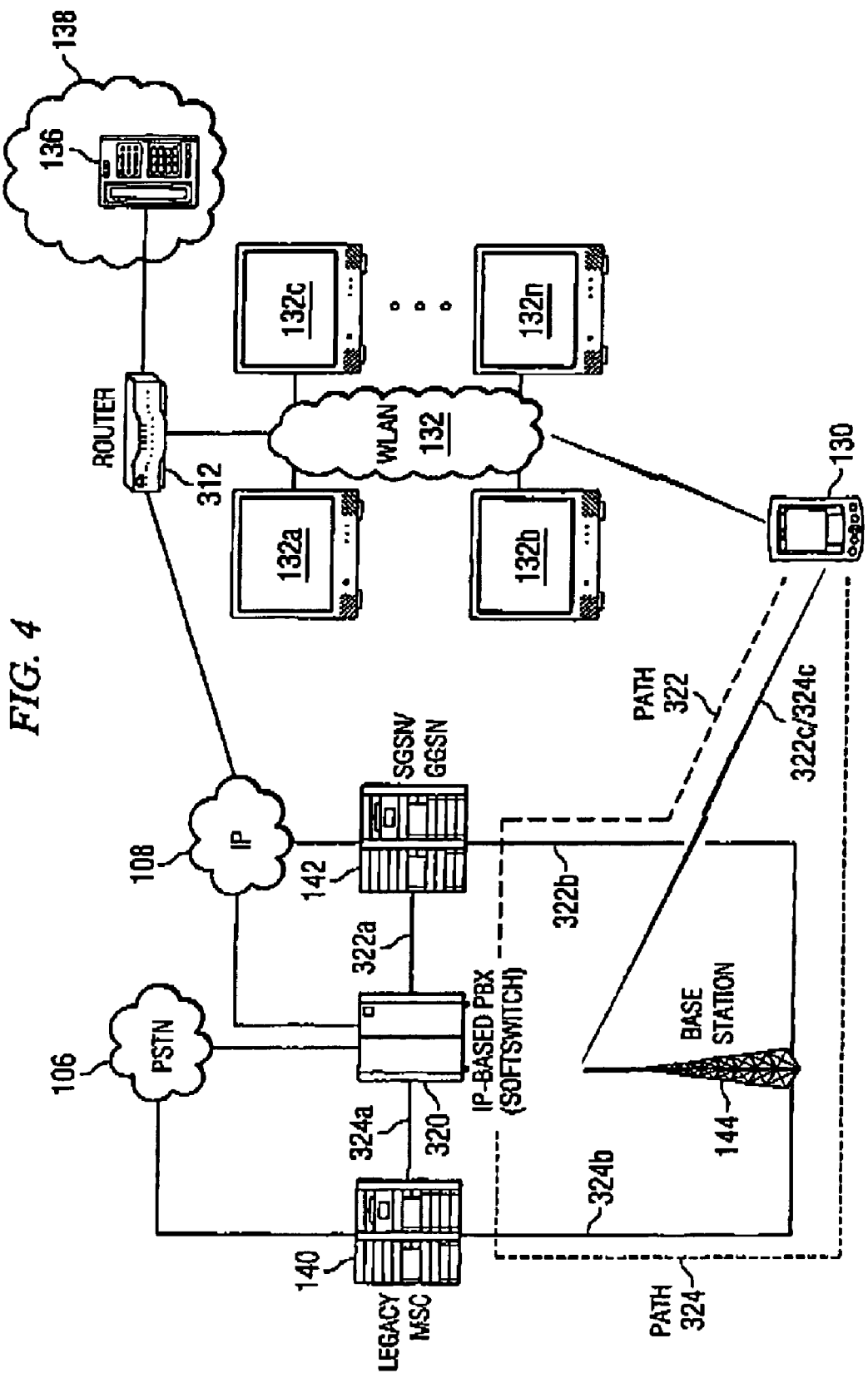
FIG. 4 is a network diagram showing a network embodiment wherein the soft switch 134 is associated with the cellular network equipment.

FIG. 4 shows a network operating in a carrier-hosted model. In FIG. 4, the carrier-hosted soft switch 134 320 is directly coupled to the SGSN/GGSN 142 by a leg 322A and the legacy MSC 140 by a leg 324A. In this case, a bi-directional path 322 is a standard cellular data path from an IP entity to a remote unit: from the soft switch 134 320 to the SGSN/GGSN 142 by a leg 322A to the base station 144 by a leg 322B and to the dual mode subscriber device 130 by a leg 322C. A bi-directional path 324 is a standard cellular voice path from a PSTN entity to a remote unit: from the soft switch 134 320 to the legacy MSC 140 by the leg 324A to the base station 144 by a leg 322B and to the dual mode subscriber device 130 by a leg 324C. In one embodiment, the soft switch 134 320 is coupled to the SGSN/GGSN 142 over a standard IP connection port in the same manner as IP backbone 108 is coupled to the SGSN/GGSN 142. In one embodiment, the soft switch 134 320 is coupled to the legacy MSC 140 over a standard PSTN connection port.

Figure 18:
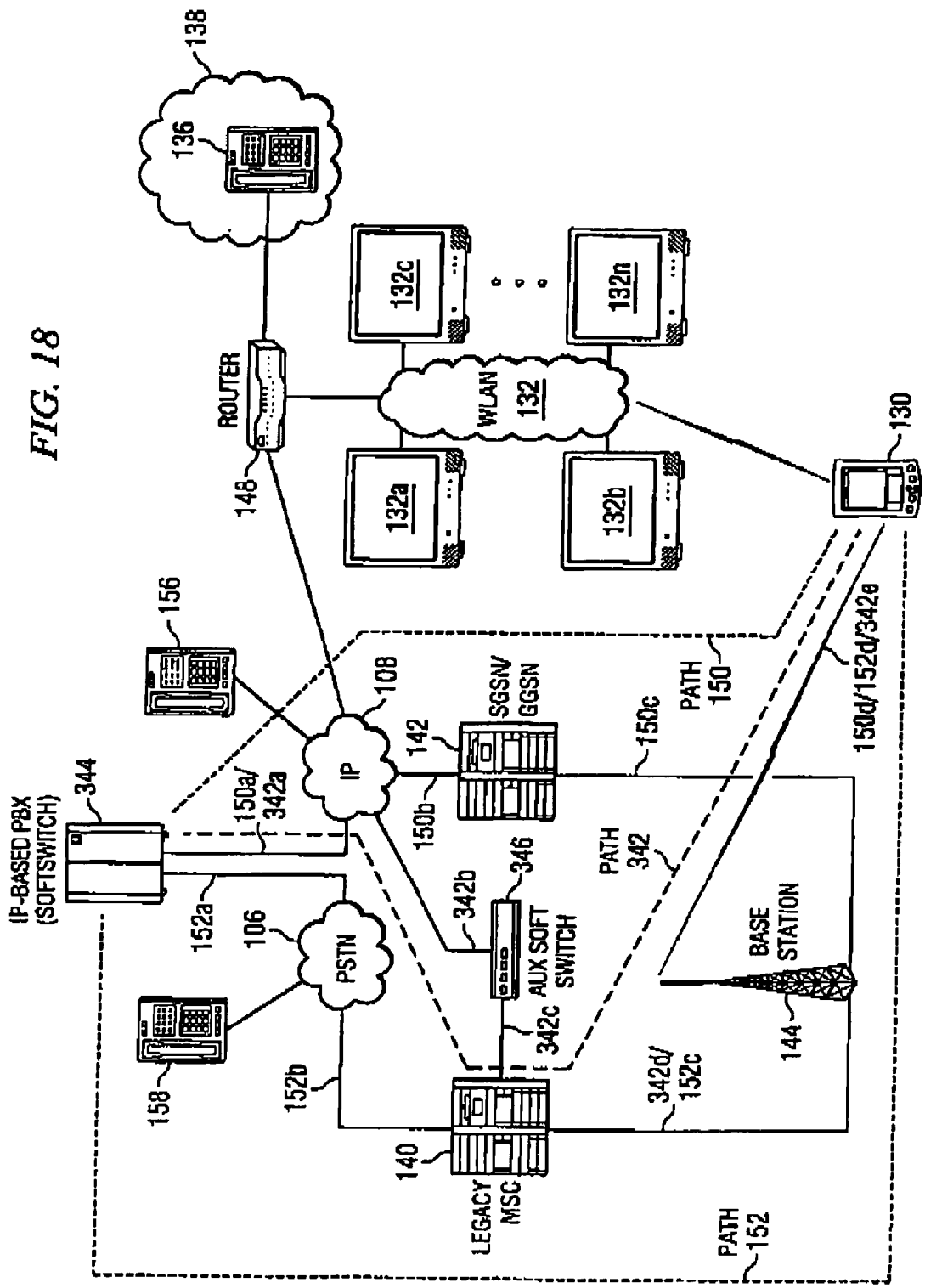
FIG. 18 is a network diagram showing a network embodiment that incorporates an auxiliary soft switch 134.

Although the following information refers specifically to FIG. 2, the analogous operations can be directly applied to FIGS. 3 and 4 as well as FIGS. 6 and 18 introduced below. Referring again to FIG. 2, when an incoming call initiation request is received at the soft switch 134 for the dual mode subscriber device 130 from the PSTN 106, the IP backbone 108 or an internal network, the soft switch 134 switches the call to the dual mode subscriber device 130. When the dual mode subscriber device 130 is located within the coverage area of WLAN 132, the soft switch 134 routes the call over the WLAN 132 to the dual mode subscriber device 130. As noted above, the call is comprised of a voice-bearing traffic stream and SIP signaling messages, both of which are routed over the WLAN 132 according to well-known techniques.

When the dual mode subscriber device 130 is located within the coverage area of the base station 144 and outside the coverage area of the WLAN 132, the soft switch 134 switches the call to the dual mode subscriber device 130 over the bi-directional paths 150 and 152. The voice-bearing traffic stream is switched over the path 152. The SIP signaling messages are routed over the path 150. This SIP signaling over the path 152 is one of the elements that enables heightened functionality when the remote unit is located outside of the coverage area of the WLAN.

Briefly, assume that an incoming call is received for the dual mode subscriber device 130 at the soft switch 134. As explained in more detail below, the soft switch 134 determines whether to switch the call over the WLAN 132, wired local area network 138, cellular system or a combination of these (as the call may be switched simultaneously through the various systems.) If it determines that the call should be switched to the dual mode subscriber device 130 within the cellular system, the soft switch 134 creates a SIP signaling message that alerts the dual mode subscriber device 130. This alert may include information about the incoming call or caller based on information received at the soft switch 134, information in the user-stored settings or both. The soft switch 134 also begins a standard call initiation process to establish a voice call over the cellular network by the path 152. The dual mode subscriber device 130 correlates the SIP signaling message with call initiation request received over the voice-bearing path and, typically, presents this information to the user.

Figure 5:
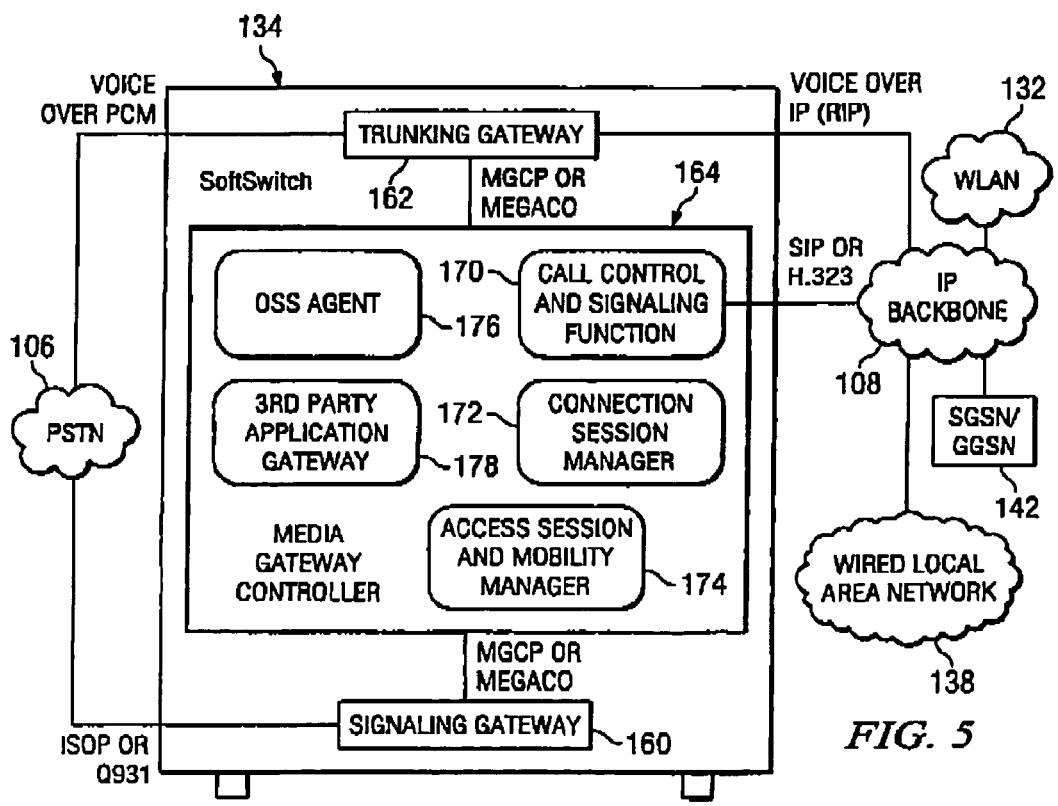
FIG. 5 is a block diagram of a soft switch 134 embodiment.

FIG. 5 is a functional block diagram of the soft switch 134. The soft switch 134 can be deployed as an off-site, IP-based PBX. The soft switch 134 can also be deployed as a gateway-assisted soft switch 134 344 (introduced below), a carrier-hosted soft switch 134 320 and an on-site soft switch 134 310. The chief difference among the soft switch 134 architectures is typically the configuration of the external connections.

In FIG. 5, the various aspects of the soft switch 134 are referred to as modules and/or functions. The terms "module" and "function," as used herein, mean, but are not limited to, a software or hardware component which performs certain tasks. A module may advantageously be configured to reside on addressable storage medium and configured to execute on one or more processors. A module may be fully or partially implemented with a general-purpose integrated circuit (IC), field programmable gate array (FPGA) or application specific integrated circuit (ASIC.) Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented on many different platforms, including computers, computer servers, data communications infrastructure equipment such as application-enabled switches or routers, or telecommunications infrastructure equipment, such as public or private telephone switches or private branch exchanges (PBX). In any of these cases, implementation may be achieved either by writing applications that are native to the chosen platform, or by interfacing the platform to one or more external application engines.

Within the soft switch 134, the trunking gateway module 162 physically terminates calls and provides other physical layer services associated with transmitting and receiving voice-bearing traffic streams over the PSTN 106 as well as the IP backbone 108. For example, the trunking gateway 162 terminates voice calls from the PSTN 106, compresses and packetizes the voice data, and delivers compressed voice packets to the IP backbone 108. Likewise, the trunking gateway 162 performs the reverse functions for voice-bearing traffic streams received from the IP backbone 108. The trunking gateway 162 operates under the control of a media gateway controller module 164.

The signaling gateway module 160 provides interworking of signaling between the switched circuit PSTN 106 and packet switched IP backbone 108. The signaling gateway 160 also assists the media gateway controller 164 with the call control functionality or service processing capabilities of traditional PSTN switches. The signaling gateway also 160 operates under the control of the media gateway controller 164.

In one embodiment, the signaling gateway 160 and the trunking gateway 162 are implemented as a single entity and are implemented by common digital signal processing functionality. In other embodiments, they are more separate from one another.

The media gateway controller module 164 handles the registration and management of resources at the soft switch 134. The media gateway controller 164 provides PBX services to the WLAN 132 and the wired local area network 138. The media gateway controller 164 also provides control over and includes additional modules which are shown in FIG. 5 as entities 170-178. Within the media gateway controller 164, the call control and signaling function 170 module 170 maintains the call state and creates and processes the SIP messages that can be directly received and output by the media gateway controller 164 to and from the IP backbone 108. The connection session manager module 172 maintains the state of PSTN signaling including management of each physical trunk terminated at the trunking gateway 162 and the correlation between the PCM-based traffic streams and the IP-based traffic streams. Connection session manager 172 acts as basic features platform application. The access session and mobility manager module 174 tracks user and subscriber device locations. The operation support system (OSS) agent module 176 provides a control and monitoring interface for use by the soft switch 134 administrator. For example, the OSS agent 176 interfaces with billing systems, subscriber provisioning systems and the like. The third party application gateway 178 module 178 interfaces with applications such as content delivery services, voicemail services, and user information databases (such as the contact list information and corresponding categories as discussed above) that are typically hosted outside this domain.

The signaling gateway 160, trunking gateway 162 and media gateway controller 164 are coupled together within the soft switch 134. In one embodiment, these three components communicate with one another using SIP, SIGTRAN, media gateway control protocol (MGCP), Megaco or a combination of these. SIGTRAN (SIGnalling TRANsport) is part of the Next Generation of Networks (NGN) based on the Internet protocol. It is designed for transporting signaling traffic such as ISDN, SS7 and V5 over an IP network. SIGTRAN is also used for VoIP applications. MEGACO standardizes the interface between a call control entity such as a media gateway controller and the media processing entity such as a media gateway in the decomposed H.323 gateway architecture proposed by ETSI TIPHON and adopted by IETF. MGCP, developed by Telcordia and Level 3 Communications, is one of a several control and signaling standards to compete with the older H.322 standard for the conversion of signal carried on telephone circuits (PSTN) to data packets carried over the Internet or other packet networks.

Typically, the PSTN 106 is coupled to the trunking gateway 162 over traditional voice over PCM connections. The PSTN 106 is typically coupled to the signaling gateway 160 using a common-channel signaling protocol such as ISUP or Q.931. The ISDN User Part (ISUP) defines the protocol and procedures used to set-up, manage, and release trunk circuits that carry voice and data calls over the PSTN. Q.931/32 is a layer in the OSI/ISO Reference Model and has been designed for control signaling. It is used to establish maintain and release connections between the user and the PSTN network.

The trunking gateway 162 communicates with the IP backbone 108 using VoIP protocols such as VoIP (RTP). RTP (the RealTime Transport Protocol) is the standard proposed by IETF for real time transfer of media. RTCP (RealTime Transport Control Protocol) provides statistical information of media communication. The media gateway controller 164 communicates with the IP backbone 108 using SIP or H.323.

H.323 is an International Telecommunications Union (ITU) approved recommendation that defines how audio and video data may be communicated across packet-based networks, such as the Internet.

Figure 6:
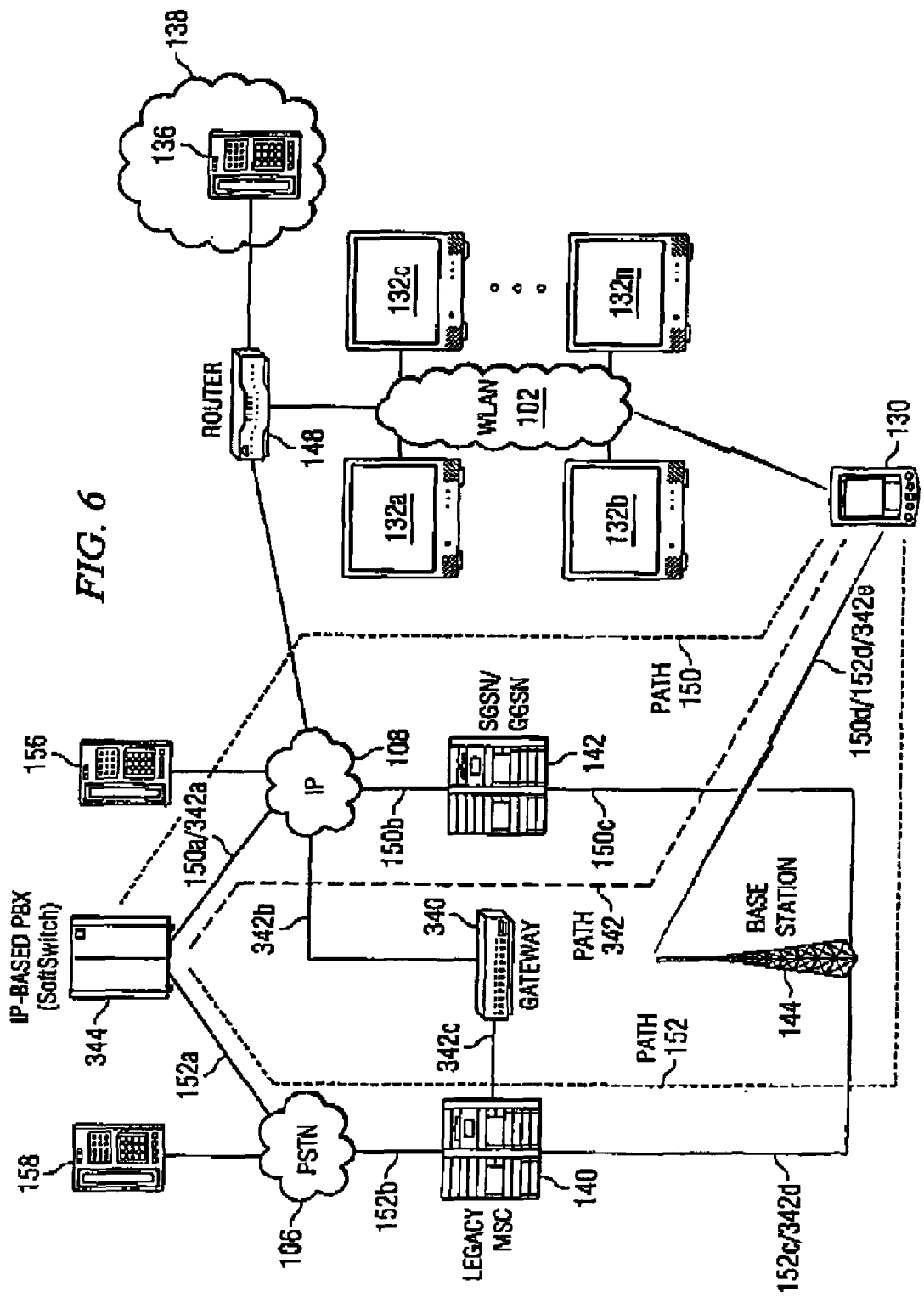
FIG. 6 is a network diagram showing a network embodiment, which incorporates a media gateway between the soft switch 134 and the mobile switching center.

FIG. 6 is a network diagram of a network, which incorporates a media gateway between a soft switch 134 and a mobile switching center. In FIG. 6, a media gateway 340 acts as a gateway between the soft switch 134 344 and the legacy MSC 140 to provide enhanced functionality. The media gateway 340 introduces a new path 342A-E. The soft switch 134 344 is coupled to the IP backbone 108 by a leg 342A, which in turn is coupled to the media gateway 340 by a leg 342B, which is coupled to the legacy MSC 140 by a leg 342C, which is coupled to the base station 144 by a leg 342D, which in turn is coupled to the dual mode subscriber device 130 by a leg 342E. The legs 342D and 152C as well as the legs 342E and 152D are common to both the paths 152 and 342 and perform like functions in each path.

FIG. 17 is a block diagram of the media gateway 340. As with FIG. 5, the various aspects of the media gateway are referred to as modules, with same meaning intended for that term. The trunking gateway module 380 performs the analogous functions of the trunking gateway module 162 of FIG. 5 such as translating between VoIP packets and legacy voice format signaling. The signaling gateway module 384 performs the analogous functions of the signaling gateway 160. In addition, the signaling gateway 384 translates the PSTN control signaling in IP format received from the media gateway 340 into standard PSTN signaling for output to the legacy MSC 140. In one embodiment, the signaling gateway 384 is also configured to transmit an artificial caller ID identifier on the PSTN port in response to instructions received over IP port from the soft switch 134 344. Both the trunking gateway 380 and the signaling gateway 384 are coupled to the legacy MSC 140 over the leg 342C shown in FIG. 6. Likewise, both the trunking gateway 380 and the signaling gateway 384 are coupled to the IP backbone 108 over the leg 342B shown in FIG. 6.

When the soft switch 134 344 switches a call to the dual mode subscriber device 130 when it is within the coverage area of the cellular system, if the far end device is coupled to the PSTN 106, the soft switch 134 344 converts the legacy voice-bearing signals to VoIP packets and forwards them to the media gateway 340 over the legs 342A and 342B (see FIG. 6). The media gateway 340, (specifically, in the embodiment shown in FIG. 17, the trunking gateway module 380), converts VoIP packets into legacy signals and provides them to the legacy MSC 140 over the leg 342C. In addition, the soft switch 134 344 can also send the standard PSTN call control signaling to the media gateway 340 in IP format over the legs 342A and 342B. The media gateway 340 (specifically, in the embodiment shown in FIG. 17, the signaling gateway module 384), can convert them to standard PSTN signaling and provide them to the legacy MSC 140 over the leg 342C.

If the far end device is a VoIP phone, the soft switch 134 344 sends control signaling in IP format to the media gateway 340 along the legs 342A and 342B. The far end device can also route control signaling directly to and from the media gateway 340 over the IP backbone 108 using the standard IP routing mechanisms. The VoIP packets can be routed directly to the media gateway 340 for conversion into legacy voice-bearing signals. For example, voice-bearing VoIP packets can be routed from the desk phone 136 through the on-premise router 148 and the over the leg 342B to the media gateway 340. The media gateway 340 is typically coupled to the legacy MSC 140 over a standard PSTN connection port.

The advantage of the network shown in FIG. 6 and the carrier-hosted network shown in FIG. 4 is that the direct connection to the legacy MSC 140 over, respectively, the leg 342C and the leg 324A allows greater flexibility by avoidance of the PSTN 106. The legacy MSC 140 can be configured to regard the signals on the legs 342C and 324A as PSTN signaling. The carrier soft switch 134 320 and the media gateway 340 can be configured to produce customized signaling in place of the standard PSTN signaling such as inserting data into the call stream, inserting artificial caller ID information and the like. An example of such a customization is given below.

FIG. 7 is a representative drawing of an example of the dual mode subscriber device 130. In the embodiment shown, the dual mode subscriber device 130 also incorporates other functions such as email and calendaring and the like. The dual mode subscriber device 130 has a speaker 200 and a microphone 202. The dual mode subscriber device 130 also has a display 204. Several soft keys 206A-206N are associated with the display 204. A scroll wheel with select 212 can also be used to scroll through the various menus and select options. In addition, the dual mode subscriber device 130 has a keypad 208 and defined function keys 210A-210N. This figure is highly representative and many other configurations and form factors for subscriber devices are well known in the art.

Figure 8:
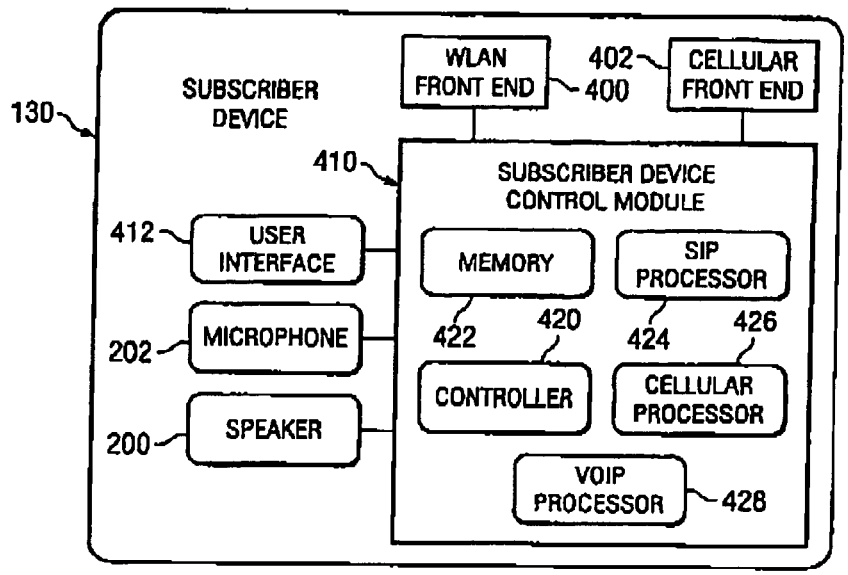
FIG. 8 is a block diagram of a dual mode subscriber device 130 embodiment.

FIG. 8 is a functional block diagram of the dual mode subscriber device 130. The dual mode subscriber device 130 has a WLAN front-end module 400 that receives and transmits wireless link signals over the WLAN 132. The WLAN front end 400 provides up and down conversion of signals as well as base band and media access control (MAC) layer functionality. For example, the WLAN front end 400 can be implemented using commercially available WiFi integrated circuits and software such as the PRISM3 chip set available from Intersil Inc., Irvine, Calif., USA. The WLAN front end 400 is coupled to and controlled by the subscriber device control module 410. The WLAN front-end 400 outputs the information received over the WLAN to the subscriber device control module 410 and also receives information for transmission over the WLAN from the subscriber device control module 410.

The cellular front-end module 402 provides the functionality of a cellular subscriber device or cell phone for transmitting and receiving over a cellular telephone network. The cellular front end module 402 also receives information from the subscriber device control module 410 and sends that information over the data-bearing and voice-bearing channels to the base station 144. Lucent Technologies of Murray Hill, N.J., USA sells GSM reference design packages, which are based around Lucent's digital signal processor (DSP) technology that includes all the software tools, training and support needed for manufacturers to develop their first or subsequent families of GSM handsets and can be used to make the cellular front end module 402. Likewise, QUALCOMM, Inc. of San Diego, Calif., USA provides similar designs, chips and information for CDMA based cellular networks and can also be used to make the cellular front end. The cellular front end module 402 receives wireless link signals on both the data-bearing and voice-bearing channels from the base station 144 (see FIGS. 2, 3, 4 and 6) and extracts the information contained therein and passes it on to the subscriber device control module 410.

The subscriber device control module 410 provides control functions for the dual mode subscriber device 130. The subscriber device control module 410 provides input to and accepts output from a user interface 412 (such as the display 204, soft keys 206A-206N, keypad 208 etc. of FIG. 7), the microphone 202 and the speaker 200.

The subscriber device control module 410 also provides voice and data communication control. A controller module 420 provides control over the various subscriber device entities including those elements of the subscriber device control module 410 shown in FIG. 8. It can also execute application software and the like used by the dual mode subscriber device 130. A memory module 422 stores information for use by the controller 420 as well as the other subscriber device control module 410 elements.

The subscriber device control module 410 includes a SIP processor module 424 for creating and receiving SIP messaging, both over the WLAN front end 400 and the cellular front end 402. Thus, the SIP processor module 424 is coupled to both the WLAN front end 400 and the cellular front end 402.

The subscriber device control module 410 also includes a VoIP processor module 428 for creating and receiving VoIP packets. For example, the VoIP processor 428 provides audio signals to the speaker 200 and receives audio signals from the microphone 202 when the dual mode subscriber device 130 is communicating over the WLAN front end 400 such as when the dual mode subscriber device 130 is located within the coverage area of the WLAN 132. Thus, the VoIP processor 428 is coupled to the speaker 200, microphone 202 and WLAN front end 400 as well as other elements. VoIP processors are well known in the art.

The subscriber device control module 410 includes a cellular processor module 426 for creating and receiving cellular information, such as the audio information received from and transmitted over the voice-bearing path of the cellular network. The cellular processor 426 is coupled to the cellular front end 402 as well as the speaker 200 and the microphone 202. In one embodiment, the cellular processor 426 couples the SIP processor 424 to the cellular front end 402.

As noted above, the access session and mobility manager 174 within the soft switch 134 tracks the location of the dual mode subscriber device 130. Several mechanisms can be used to implement such tracking. The soft switch 134 310 can "ping" (send a message requesting a response) the subscriber device via the WLAN 132 and assume that the dual mode subscriber device 130 is absent if no response is received. The dual mode subscriber device 130 may detect that it can no longer receive signals from the WLAN 132 and, in response, send a SIP based message over the path 150 (see FIG. 6) registering its departure from the coverage area of the WLAN 132. Likewise, when the dual mode subscriber device 130 enters the coverage area of the WLAN 132 once again, it may send a SIP based message over the WLAN 132 registering its re-entry. In addition, the user may signal the return of the dual mode subscriber device 130 manually through the desk phone 136 such as by pressing keys or by docking the dual mode subscriber device 130 which causes either the desk phone or the subscription device to transmit a message to the soft switch 134.

FIG. 9 illustrates the method or process, which is implemented by the dual mode subscriber device 130 to register its location. In block 438, the dual mode subscriber device 130 uses standard WLAN searching techniques to determine whether it has entered the coverage area of a new WLAN. If so, in block 440 the dual mode subscriber device 130 detects a new WLAN and flow continues to block 442. In block 442, the dual mode subscriber device 130 sends a SIP registration message over the WLAN. If it successfully reaches a soft switch 134 willing to provide service, the dual mode subscriber device 130 receives an acknowledgement in block 444 and flow continues to block 446. If no new WLAN is detected or no acknowledgment is received, the dual mode subscriber device 130 continues to scan for new WLANs in block 438. While registered in the WLAN, in block 446 the subscriber device continues to monitor whether WLAN service is available. If the dual mode subscriber device 130 detects that it has left the coverage area of the WLAN in block 448, the dual mode subscriber device 130 sends a registration message over the cellular system in block 450, such as by using a SIP message, HTTP, HTTPs message or the like. The dual mode subscriber device 130 once again begins to monitor for a new WLAN in block 438.

In conjunction with the subscriber device operation described with respect to FIG. 9, the soft switch 134 performs the complementary functions. In response to the SIP registration message sent in block 442, the soft switch 134 registers the subscriber device's presence in memory. It also creates and sends the acknowledgement received by the subscriber device in block 444. Likewise, the soft switch 134 receives the SIP messaging sent by the subscriber device in block 450 and registers the subscriber device. In one embodiment, the soft switch 134 polls the subscriber device to determine current location.

In one embodiment the system is implemented without robbing the subscriber device of its cellular identity. For example, assume the cellular carrier assigns a cellular telephone number to the subscriber device. Further, assume that the soft switch 134 has assigned a different PBX telephone number to the subscriber device. Thus the subscriber device is associated with a cellular number as well as a PBX number. The cellular number can still be used to contact the subscriber device directly even when it is under the control of the soft switch 134. In one embodiment, if the soft switch 134 does not have valid location data for the subscriber device, it can simply forward incoming calls to the subscriber device over the standard cellular system using its cellular telephone number. In such a case, the subscriber device may send a SIP signaling message to the soft switch 134 such as to have available some calling features that would otherwise be unavailable for a standard cellular call. For example, assume a first caller places a call to the dual mode subscriber device 130 using the cellular number. When the dual mode subscriber device 130 receives the call, it can use caller ID to identify the caller. It can send SIP messaging back to the soft switch 134 to identify the caller.

Figure 10:
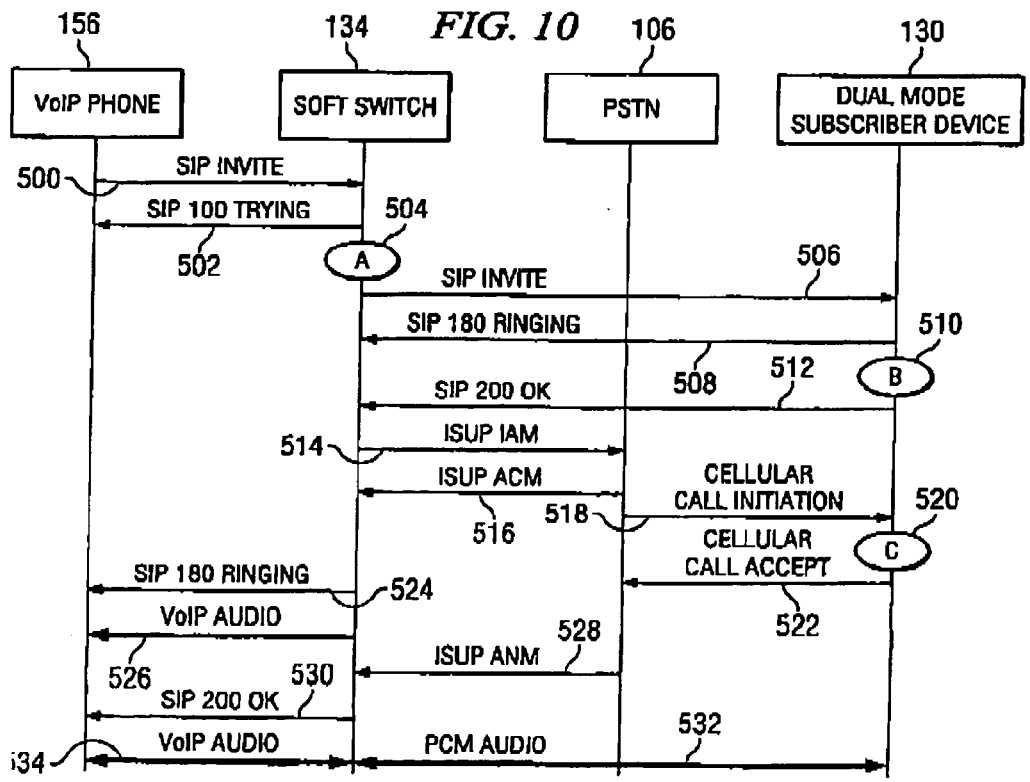
FIG. 10 is a call flow diagram illustrating an exemplary call flow embodiment where an IP device initiates a call to a dual mode subscriber device 130.

FIG. 10 illustrates an exemplary call flow when an IP phone initiates a call to a dual mode subscriber device 130 that is currently located outside the WLAN in a system in which SIP is employed. The call flow or processing will be described with reference also being made to the embodiment of a soft switch 134 depicted in FIG. 5 and the example network shown in FIG. 2. The specific order of the described methods can be varied depending on system requirements and taking into account the effect on the call flow.

In block 500, a calling IP phone, such as the VoIP phone 156 or desk phone 136 (see FIG. 2), sends a standard SIP invite message, such as SIP INVITE, specifying the dual mode subscriber device 130 by its PBX telephone number, SIP URL (Uniform Resource Locator) or IP address. In block 502, the soft switch 134 receives the invite and responds with a SIP trying message such as SIP 100 TRYING, indicating to the initiating device that the soft switch 134 is trying to set up the call. In block 504, the soft switch 134 reviews the call processing information associated with the dual mode subscriber device 130 such as the user defined settings as well as registration information. The soft switch 134 contacts the dual mode subscriber device 130 in the cellular network based upon the expected location of the subscriber device 130, based upon, for example, the process described in connection with FIG. 9.

Referring back to FIG. 5, in one embodiment the SIP invite message (block 500) is received at the media gateway controller 164 within the soft switch 134. Within the media gateway controller 164, the call control and signaling function 170 processes the SIP invite message and commands the transmission of the SIP trying message (block 502). The third party application gateway 178 accesses information about the user's settings used in block 504. The access session and mobility manager 174 provides information regarding the location of the dual mode subscriber device 130 used in block 504.

In block 506, the soft switch 134 sends a standard SIP invite message to the dual mode subscriber device 130 over the data-bearing path of the cellular network, such as the path 150 through the IP backbone 108, thereby bypassing the PSTN 106. The soft switch 134 identifies the dual mode subscriber device 130 in the SIP invite message using standard IP methods such as by its IP data address. In block 508, the dual mode subscriber device 130 responds by sending to the soft switch 134 a SIP ringing indication such as SIP 180 RINGING. In block 510, the dual mode subscriber device 130 accepts the call. Alternatively, this response is automatic and the call is accepted by the dual mode subscriber device. 130 at some other point in the call flow such as at block 520. In either case, the dual mode subscriber device 130 responds by sending a call accept message (such as SIP 200 OK) to the soft switch 134 in block 512. Referring again to FIG. 5, the SIP processing within the soft switch 134, described in blocks 506, 508 and 512 as well as blocks 524 and 530 introduced below, can be carried out by the call control and signaling function 170 module 170.

In block 514, the soft switch 134 initiates a call with the PSTN 106 using one of a variety of standard PSTN signaling protocols. In one embodiment, the soft switch 134 uses the ISUP and, therefore, sends an ISUP initial address message (IAM) to the PSTN 106, such as over the leg 152A. ISUP IAM reserves an idle trunk circuit from the originating switch to the destination switch and identifies the dual mode subscriber device 130 such as by its cellular telephone number. In block 516, the PSTN 106 responds with an address complete message (ACM). The ACM indicates that all address signals have been received and that call set-up is progressing. In response to block 514, the PSTN 106 sends a cellular call initiation message in block 518 according to well-known practices. The PSTN signaling in blocks 514, 516 and 528 can be controlled by the call control and signaling function 170 and the connection session manager module 172 within the media gateway controller 164 and implemented by the signaling gateway 160.

In block 520, the dual mode subscriber device 130 automatically accepts the call if it has already been accepted in block 510. In block 520, the dual mode subscriber device 130 also correlates the incoming cellular voice call with the previously received SIP invitation. The dual mode subscriber device 130 responds with a cellular call accept in block 522. These PSTN blocks can occur before, after or in parallel with the SIP blocks just described.

Meanwhile, the soft switch 134 responds to the VoIP phone 156 with a SIP ringing indication (SIP 180 RINGING) in block 524 and, and in a logical sense, establishes a unidirectional VoIP voice-bearing path from the soft switch 134 to the VoIP phone 156 in block 526. Using VoIP, no actual circuit switched channel is established or reserved but, instead, voice-bearing packets begin to stream from one party to another. In this case, packets carrying a ring indicator are streamed from the trunking gateway 162 to the VoIP phone 156.

In block 528, the PSTN 106 responds to the cellular call accept with an ISUP answer (ANM). The ANM indicates that the called party has answered the call. It can be used to trigger billing, measurement of call duration and the like. In response, in block 530, the soft switch 134 sends a SIP OK message to the VoIP phone 156. In block 532, a telephone channel is allocated and a bi-directional audio path from the trunking gateway 162 within the soft switch 134 through the PSTN 106 to the dual mode subscriber device 130 is established, such as using the path 152. A bi-directional VoIP voice-bearing path from the trunking gateway 162 within the soft switch 134 to the VoIP phone 156 is established in block 534 and the soft switch 134 connects it to the established PCM audio path, thus completing a voice link from the VoIP phone 156 to the dual mode subscriber device 130.

Alternatively, the cellular voice channel is established by a call origination from the dual mode subscriber device 130 rather than the soft switch 134. For example, referring again to FIG. 10, the SIP invite message (such as the one sent in block 506) or another SIP message designates that an incoming call has arrived at the soft switch 134. In response to the message, the dual mode subscriber device 130 initiates a call to the soft switch 134 using a surrogate number such as a number designated in the message or a predetermined number. Rather than initiate a call in block 514, the soft switch 134 awaits the incoming call from the dual mode subscriber device 130. In one embodiment, the soft switch 134 uses the called surrogate number to correlate the incoming call from the dual mode subscriber device 130 with the pending call establishment. The soft switch 134 then switches the incoming cellular call to connect to the established VoIP audio path and the call flow continues in the manner shown in FIG. 10. This responsive subscriber origination strategy can be used in conjunction with several of the call flows that follow.

Figure 11:
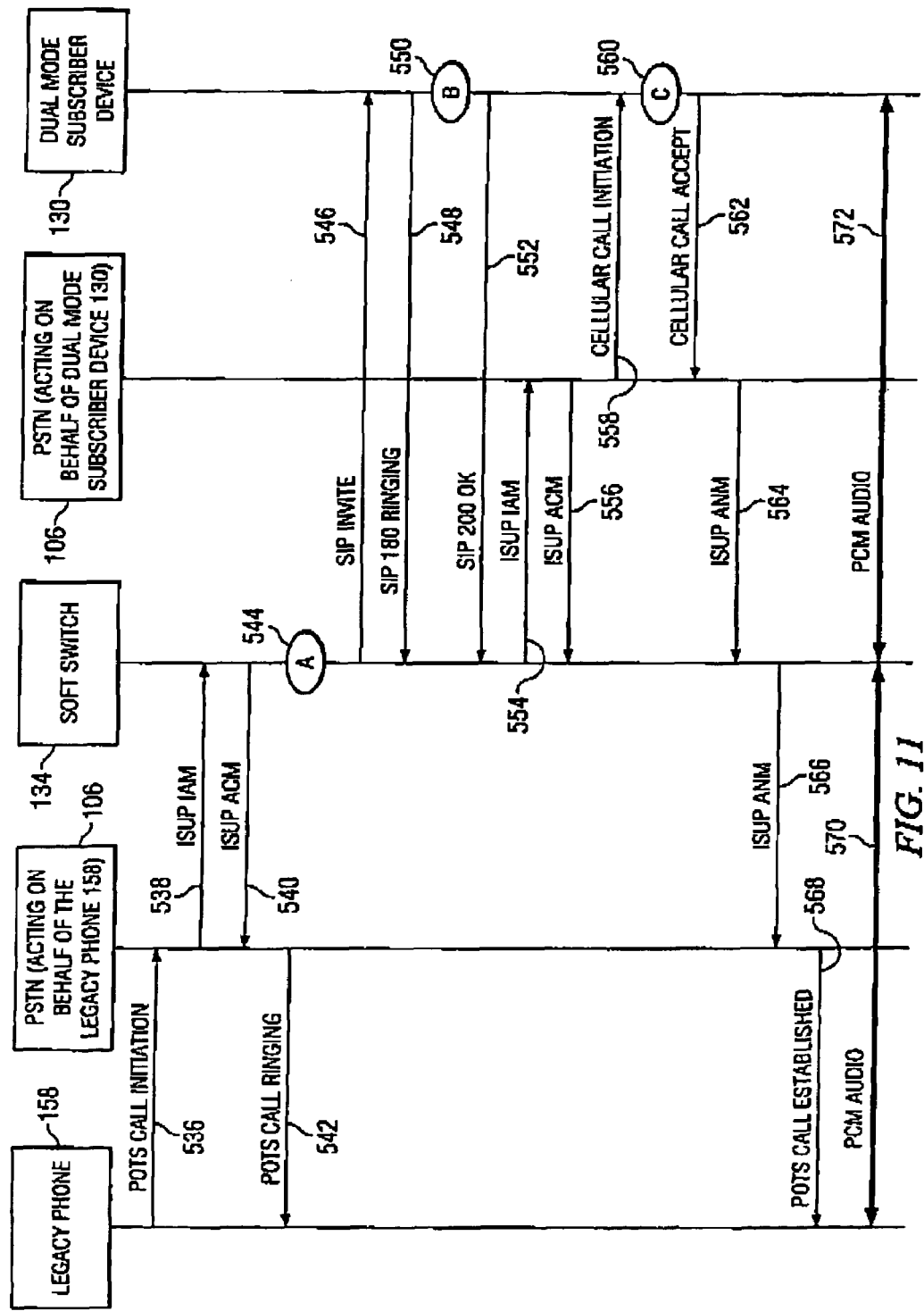
FIG. 11 is a call flow diagram illustrating an exemplary call flow when a PSTN device embodiment initiates a call to a dual mode subscriber device 130.

FIG. 11 illustrates an exemplary call flow when a PSTN phone initiates a call to a dual mode subscriber device 130 that is currently located outside the WLAN. This call flow is also described with reference to FIGS. 5 and 2. The specific order of the described blocks can be varied depending on system requirements and taking into account the effect on the call flow.

In block 536, a calling phone, such as the legacy phone 158, sends a plain old telephone system (POTS) call initiation message to the PSTN 106 designating the PBX telephone number of the dual mode subscriber device 130. In block 538, the PSTN 106 (acting on behalf of the legacy phone 158) sends an ISUP IAM to the soft switch 134 specifying the dual mode subscriber device 130 by its PBX telephone number. In block 540, the soft switch 134 responds with an ISUP ACM. In block 542, the PSTN 106 sends a POTS call ringing message to the legacy phone 158.

In block 544, the soft switch 134 reviews the call processing information associated with the dual mode subscriber device 130 such as the user defined settings as well as registration information. In this case, the soft switch 134 determines to contact the dual mode subscriber device 130 in the cellular network. In block 546, the soft switch 134 sends a SIP invite message to the dual mode subscriber device 130 over the data-bearing path of the cellular network, such as the path 150. In block 548, the dual mode subscriber device 130 responds by sending a SIP ringing indication. In block 550, the dual mode subscriber device 130 accepts the call. Alternatively, this response is automatic and the call is accepted by the dual mode subscriber device 130 later such as at block 560. In either case, the dual mode subscriber device 130 responds by sending a SIP OK message back to the soft switch 134 in block 552.

Referring back to the block diagram of the subscriber device of FIG. 8, the incoming SIP invite message of block 546 is received at the dual mode subscriber device 130 through the cellular front end 402. The cellular front end 402 passes the information received over the wireless link to the SIP processor 424, which parses the message. In one embodiment, the SIP processor 424 sends an indication to the controller 420 that, in turn, commands the notification of the user. For example, the controller 420 may command a ring tone, a custom microphone message (such as "Marie is calling"), a display message, a series of soft key options and the like using the user interface 412 and the microphone 202. The controller 420 also commands the SIP processor 424 to create the SIP ringing indication for transmission over the wireless link by the cellular front end 402 in block 548. In one embodiment, if the user accepts the call, the controller 420 commands the SIP processor 424 to create a corresponding response message for transmission over the wireless link by the cellular front end 402 in block 552. In one embodiment, the user can be notified later such as after both the cellular and SIP call information have been received.

Referring again to FIG. 11, in block 554, the soft switch 134 also sends an ISUP IAM to the PSTN 106 specifying the dual mode subscriber device 130 by its cellular telephone number. In block 556, the PSTN 106, acting on behalf of the dual mode subscriber device 130, responds with an ACM. In response to the block 554, the PSTN 106 sends a cellular call initiation in block 558. In block 560, the dual mode subscriber device 130 automatically accepts the call if it has already been accepted in block 550. Also in block 560, the dual mode subscriber device 130 correlates the incoming cellular voice call with the previously received SIP invitation. The dual mode subscriber device 130 responds with a cellular call accept in block 562. In block 564, the PSTN 106 responds to the cellular call accept with an ISUP ANM. These PSTN blocks can occur before, after or in parallel with the SIP blocks just described. Also, the responsive subscriber origination strategy discussed above could be used to establish the call connection.

Referring back to again FIG. 8, the incoming cellular call initiation of block 558 is received at the dual mode subscriber device 130 through the cellular front end 402. The cellular front end 402 passes the information received over the wireless link to the cellular processor 426, which parses the message. The cellular processor 426 sends a message to the controller 420. The controller 420 correlates the incoming cellular call with the SIP processing information such as using caller ID information and the like. If the user accepts the call, the controller 420 commands the cellular processor 426 to create a corresponding response message for transmission over the wireless link by the cellular front end 402 such as sent in block 562.

Referring again to FIG. 11, in block 566, the soft switch 134 sends an ISUP ANM message PSTN 106. In block 568, the PSTN 106 sends a POTS call established message to the legacy phone 158. In block 570, a PCM audio path from the legacy phone 158 to the soft switch 134 is established. In block 572, a circuit switched voice channel is allocated and a PCM audio path is established through the PSTN 106 to the dual mode subscriber device 130, such as using path 152, and the soft switch 134 connects it to the PCM audio path established in block 570. Thus, a voice bearing traffic channel from the legacy phone 158 to the dual mode subscriber device 130 is completed.

Referring again to FIG. 8, the voice-bearing traffic channel information is received and transmitted at the dual mode subscriber device 130 using the cellular front end 402, the cellular processor 426 and the microphone 202 and speaker 200.

Figure 24A:
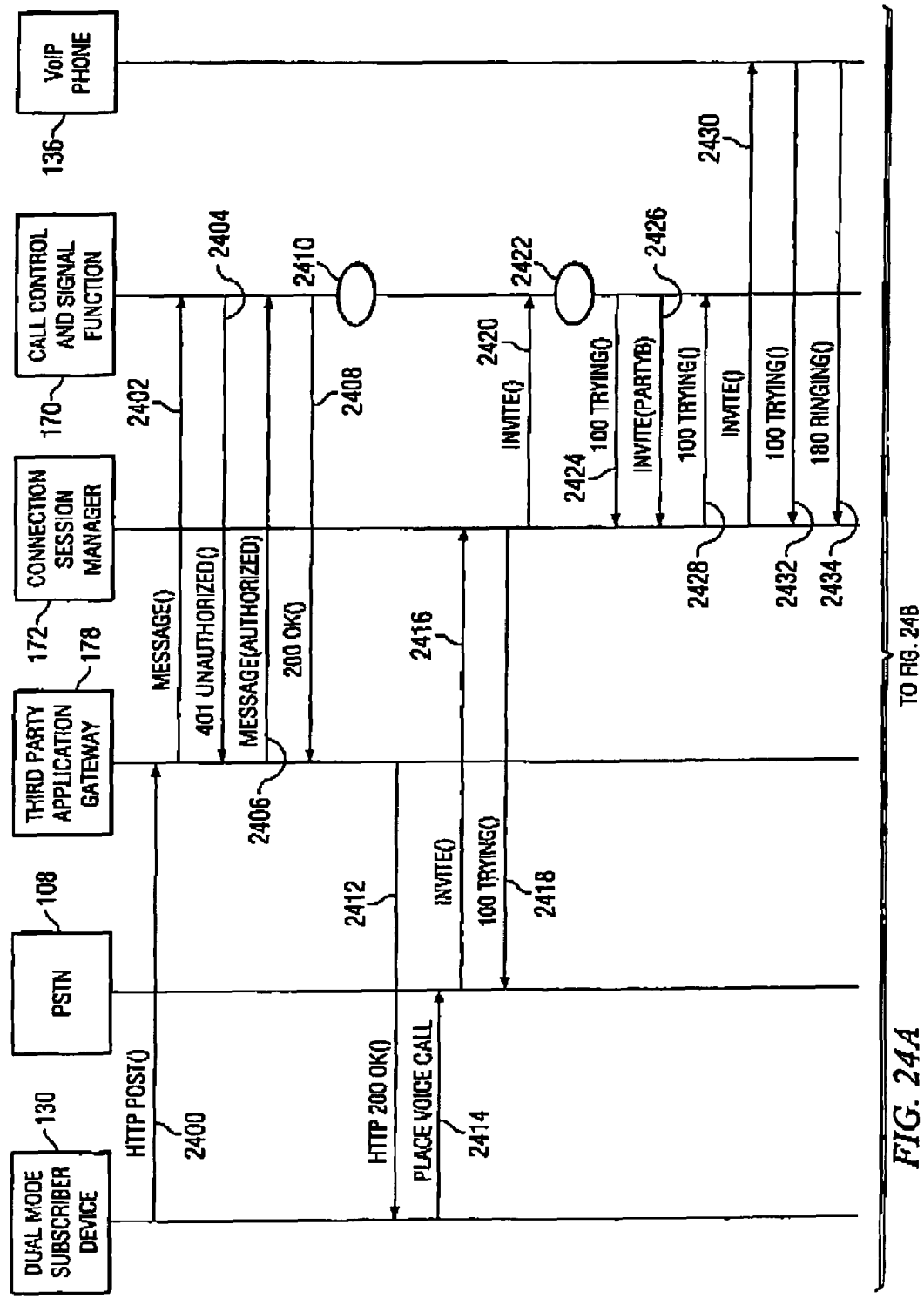
FIG. 24 is a call flow diagram illustrating one embodiment of call initiation from a remote unit operating in the cellular system.

The call flow for subscriber device initiated calls is similar to the call flows discussed in FIGS. 10 and 11 for calls received by the dual mode subscriber device 130. When the dual mode subscriber device 130 is the call initiator, the dual mode subscriber device 130 creates a standard cellular call initiation message. The message specifies a surrogate telephone number rather than the actual called party. The dual mode subscriber device 130 creates a SIP message that specifies the actual called party such as a PSTN device or VoIP device, either outside or within the same PBX as the subscriber device. The soft switch 134 correlates the two messages and establishes the appropriate voice paths in an analogous manner to the reverse process shown above. FIG. 24, detailed below, illustrates these principles of call initiation.

Whether the dual mode subscriber device 130 is the called or the calling party, a voice-bearing cellular path and a parallel SIP signaling cellular path are established with the dual mode subscriber device 130. The parallel SIP signaling path allows the user of the dual mode subscriber device 130 to access the SIP features such as those available to him on a standard office desk phone.

As just noted, standard calls placed by the dual mode subscriber device 130 when it is within the cellular footprint and outside the WLAN designate a surrogate number associated with the soft switch 134 rather than the actual called party. Therefore, as soon as the user indicates that he is going to place a call, such as by dialing the first digit of any phone number, the dual mode subscriber device 130 can begin the process of initiating the voice-bearing traffic stream over the path 152 using the surrogate number. In addition, if the system employs a responsive soft switch 134 initiation strategy (described below with reference to FIG. 16) as soon as the user indicates that he is going to place a call, the dual mode subscriber device 130 can send a message over the data-bearing path 150 to alert the soft switch 134 to initiate a call to the dual mode subscriber device 130. In this way, the delay associated with establishment of a cellular voice call are masked and the response of the system is much faster as perceived by the human user.

FIG. 12 is a flowchart of the process or methods implemented by the soft switch 134 for a subscriber device initiated call. The process will be described with reference also to FIGS. 5 and 2. From the FIG. 12, one of skill in the art can readily understand the corresponding remote unit actions. The specific order of the described blocks can be varied depending on system requirements and taking into account the effect on the call flow.

In block 800, the soft switch 134 receives the SIP invite generated and sent by the dual mode subscriber device 130, such as over the path 150. The SIP signaling is processed by the media gateway controller 164 and more specifically the call control and signaling function 170. The SIP invite message generated by the dual mode subscriber device 130 designates a called party which, in this case, we shall assume is a PSTN device designated by a PSTN telephone number. The call control and signaling function 170 within the soft switch 134 generates a responsive SIP trying message and sends it to the dual mode subscriber device 130 in block 802.

In block 804, the signal gateway 160 receives an IAM message from the PSTN 106. The IAM message from the PSTN was generated in response to a call initiation message to the PSTN 106 from the dual mode subscriber device 130 over the legacy cellular network. The IAM message (and the call initiation message) designates a surrogate called party number rather than the actual called party number with whom the user intends to communicate. (The actual called party number is designated in the SIP messaging received in block 800.) In one embodiment, the surrogate called party number is a dummy telephone number associated with the soft switch 134 reserved for incoming calls initiated by dual mode subscriber device 130s thus alerting the soft switch 134 that a corresponding SIP message has been sent to designate the actual called party. In another embodiment, the surrogate number is associated with the soft switch 134 and is specific to the subscriber device. In one embodiment, the surrogate called party number is the initiating subscriber device PBX assigned number. In one embodiment, SIP signaling from the dual mode subscriber device 130 specifies the surrogate number to facilitate correlation. In block 806, the soft switch 134 correlates the SIP message received in block 800 with the PSTN signaling received in block 804 such as by reference to the surrogate called party number so that it can connect the dual mode subscriber device 130 over the establishing cellular voice-bearing traffic path to the entity designated in the SIP invite. Typically, the media gateway controller 164 performs the correlation of the SIP message with the cellular voice call.

In block 808, the signaling gateway 160, under the control of the connection session manager 172, sends an ACM message to the PSTN 106 in response to the IAM received in block 804. The same entities also create and send an IAM to the PSTN 106 in block 810, attempting to establish a call to the party designated in the SIP invite. In blocks 812 and 814, ACM and ANM messages are received by the soft switch 134 on behalf of the called device. In block 816, the soft switch 134 (specifically the trunking gateway 162) connects bi-directional audio paths so that the called party is connected to the dual mode subscriber device 130 in a similar manner as shown in blocks 534 and 532 of FIG. 10 and block 570 and 572 of FIG. 11. Even after the call is established, the user has at his disposal a wide range of features available to him, such as those available at his desk phone, through use of the SIP signaling over the data-bearing path of the cellular system.

Figure 13A:
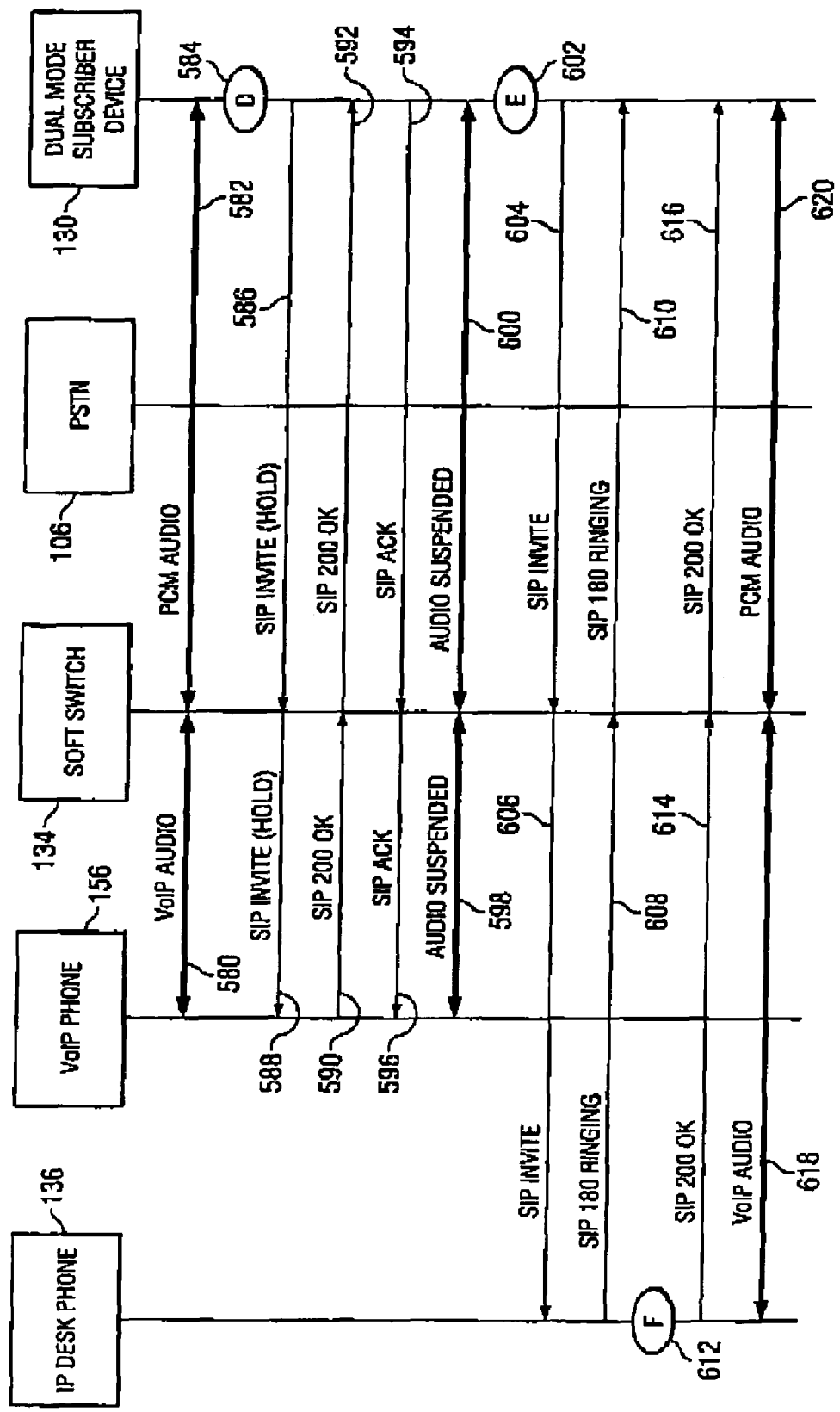
FIGS. 13A and 13B are call flow diagrams illustrating an exemplary embodiment using SIP signaling to control a call once a call is in progress.
Figure 13B:
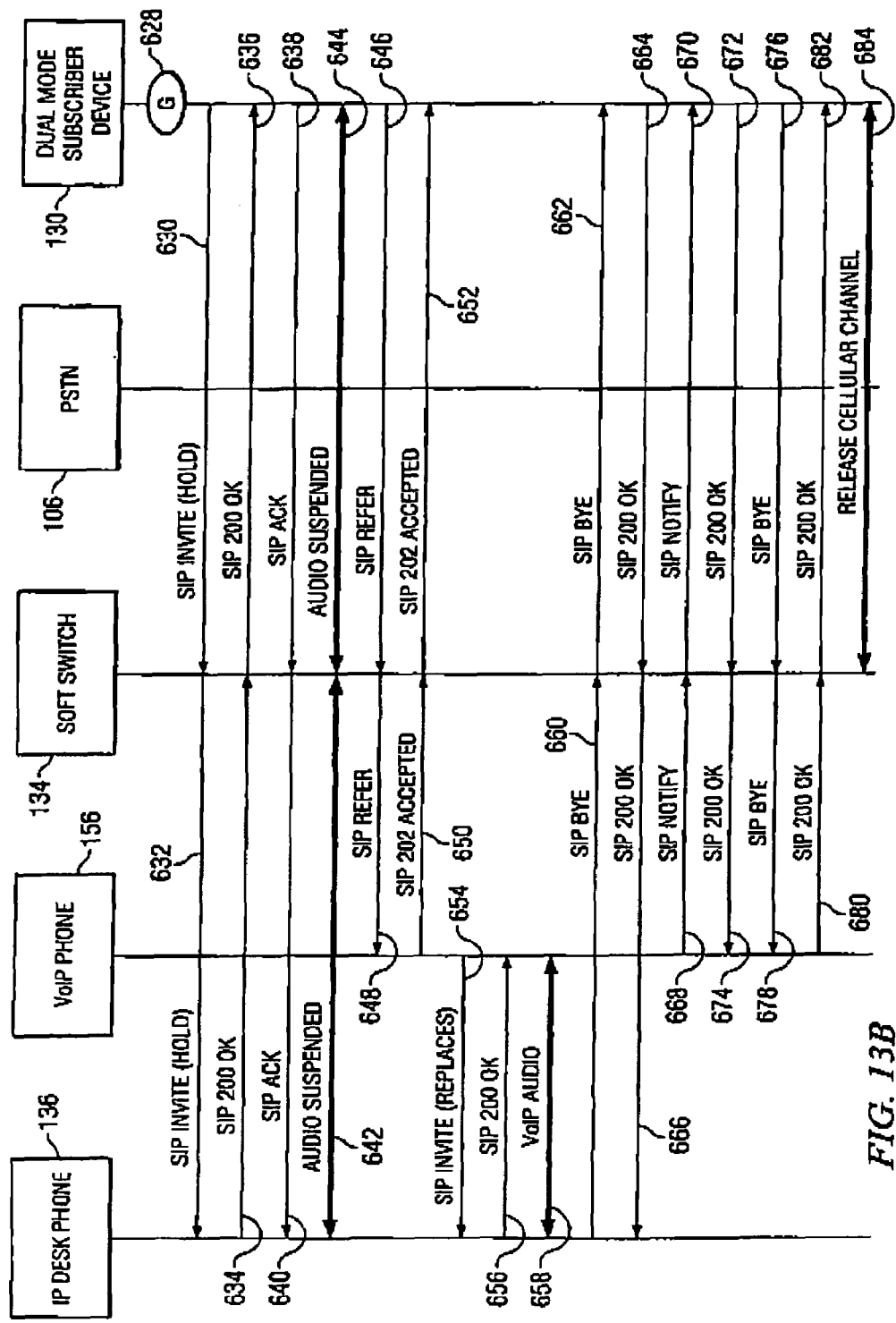

FIGS. 13A and 13B are call flow diagrams exemplifying the use of SIP signaling to control a call once a call is in progress. Although the specific example discussed in connection with those figures is an attended transfer, the figures more generally illustrate the use of the parallel SIP channel for call control. The use of SIP signaling for other call flow functions (such as conference calling, intercom features, push-to-talk operation and the like) and for other types of far end devices will be readily apparent to those of skill in the art after review of FIGS. 13A and 13B. The specific order of the described blocks can be varied depending on system requirements and taking into account the effect on the call flow. In connection with FIGS. 13A and 13B, assume the user is currently away from his office and located within the cellular coverage area but outside the WLAN coverage area. He has received a call from an original calling party who dialed the executive's PBX telephone number, the same number that rings the desktop phone in his office. When flow begins, the executive is currently conducting a voice call with the original calling party via the subscriber device 130. He now wishes to speak briefly with his assistant, Marie, and, subsequently, to transfer the original calling party to Marie so that she can schedule a future meeting. He first puts the original calling party on hold and dials Marie, the second called party, such as by using her three-digit PBX extension. He chats with Marie and then transfers the original calling party to Marie.

FIGS. 13A and 13B assume that original calling party is a general VoIP phone and that the second called party is a VoIP phone that is associated with the same PBX as the dual mode subscriber device 130. As the flow begins, a call is established between the VoIP phone 156 (the original calling party) and the dual mode subscriber device 130 (see FIG. 2). A leg of the call between the VoIP phone 156 and the soft switch 134 has been established by block 580, such as by using the method discussed with reference to FIG. 10. A leg of the call between the soft switch 134 and the dual mode subscriber device 130, through the PSTN 106 has been established by block 582. In block 584, the dual mode subscriber device 130 receives a command from the user to put the current call on hold. In block 586, the dual mode subscriber device 130 sends a SIP hold message, such as SIP INVITE (HOLD), to the soft switch 134. In turn, in block 588, the soft switch 134 sends a SIP hold message to the VoIP phone 156. The VoIP phone 156 responds in block 590 with a SIP OK message, and, in turn, the soft switch 134 responds likewise to the dual mode subscriber device 130 in block 592. The dual mode subscriber device 130 sends a SIP acknowledgement message in block 594 and the soft switch 134 in turn sends a SIP acknowledgement message to the VoIP phone 156. Audio is suspended at blocks 598 and 600, between the VoIP phone 156 and the soft switch 134 and between the soft switch 134 and the dual mode subscriber device 130, respectively. At this point voice-bearing transmissions between the soft switch 134 and the dual mode subscriber device 130 are suspended. The legacy voice channel between the soft switch 134 and the dual mode subscriber device 130 remains allocated and, in one embodiment, is not torn down. For example, the voice channel established over the path 152 remains allocated even though no voice-bearing traffic is passed. In some cases, a comforting beep, on-hold recording or the like may be transmitted over the link while the audio is suspended.

In block 602, if it has not already done so, the dual mode subscriber device 130 receives an identifier for the second called party (Marie in our example above), as indicated by the user of the dual mode subscriber device 130. In block 604, the dual mode subscriber device 130 sends a SIP invite message specifying the second called party such as the desk phone 136. In block 606, the soft switch 134 sends a corresponding SIP invitation message to the to the desk phone 136. In block 608, the desk phone 136 responds with a SIP ringing message and, in turn, the soft switch 134 responds with a SIP ringing message in block 610. In block 612, the desk phone 136 accepts the call and sends an indication to the soft switch 134 in block 614. In block 616, the soft switch 134 send a SIP OK message to the dual mode subscriber device 130. In block 618, a standard VoIP voice-bearing path is established between the soft switch 134 and the desk phone 136. In block 620, the previously allocated cellular channel is re-used to establish the audio path with the second called party (in this example, the desk phone 136). In this way, the delay associated with allocating and establishing a cellular voice channel is avoided. The suspension and reestablishment of the audio traffic occurs without the intervention of the cellular system. Alternatively, a second cellular voice channel can be established.

Our traveling executive can now chat with his assistant over the established voice path while the first call remains on-hold. When he is done, flow will continue in FIG. 13B.

FIG. 13B continues the call flow of FIG. 13A. In block 628, the user terminates his call with the second called party. If he has not already done so with his initial command, he signals a transfer of the original calling party to the second called party, for example, via soft key 206 (see FIG. 7). In block 630, the dual mode subscriber device 130 sends a SIP message to place the call with desk phone 136 on hold such as a SIP INVITE (HOLD). In block 632, the soft switch 134 sends a like message to the desk phone 136. The desk phone 136 sends a SIP message to acknowledge receipt such as a SIP 200 OK in block 634. In block 636, the soft switch 134 sends a like message to the dual mode subscriber device 130. In block 638, the dual mode subscriber device 130 sends a SIP acknowledgement such as a SIP ACK to the soft switch 134. In block 640, the soft switch 134 sends a like message to the desk phone 136. Audio transmissions are suspended over the cellular voice-bearing traffic path as well as the VoIP voice-bearing traffic path in blocks 644 and 642 respectively.

In block 646, the dual mode subscriber device 130 sends a SIP message identifying the transfer of the original calling party to the second called party such as a SIP REFER. In block 648, the soft switch 134 sends a like message to the VoIP phone 156. In block 650, the VoIP phone 156 accepts the referral and sends a SIP acceptance message such as SIP 202 ACCEPTED. In block 652, the soft switch 134 sends a like message to the dual mode subscriber device 130. In block 654 the VoIP phone 156 sends a SIP invitation message such as a SIP INVITE (REPLACES) to the desk phone 136. The desk phone 136 accepts the call and sends an indication to the VoIP phone 156 in block 656. And, in block 658, a VoIP audio path between the desk phone 136 and the VoIP phone 156 is established by the soft switch 134.

If the original calling party, the second called party or both are traditional legacy phones, a similar PSTN based call flow replaces the SIP processing just described as will be readily apparent to one of skill in the art with reference to the call flows shown in FIGS. 13A and 13B.

In block 660, the desk phone 136 sends a SIP call release message such as a SIP BYE to the soft switch 134. In block 662, the soft switch 134 sends a like message to the dual mode subscriber device 130. The dual mode subscriber device 130 responds with SIP OK message in block 664. In block 666, the soft switch 134 sends a like message to the desk phone 136. In block 668, the VoIP phone 156 sends a SIP message indicating the successful transfer of the call such as with a SIP NOTIFY. In block 670, the soft switch 134 sends a like message to the dual mode subscriber device 130. The dual mode subscriber device 130 responds with SIP OK message in block 672. In block 674, the soft switch 134 sends a like message to the VoIP phone 156. In block 676, the dual mode subscriber device 130 sends a SIP call release message such as a SIP BYE. In block 678, the soft switch 134 sends a like message to the desk phone 136. In block 680, the VoIP phone 156 sends a SIP call release message such as a SIP BYE to the soft switch 134. In block 682, the soft switch 134 sends a like message to the dual mode subscriber device 130. The dual mode subscriber device 130 is released from the call and the allocated cellular channel is released in block 684. If the dual mode subscriber device 130 wished to place another call, the soft switch 134 could maintain the allocated cellular channel for use by the dual mode subscriber device 130 to place a call to a third party or to connect a calling third party thereto.

The soft switch 134 can send SIP signaling related to a single call to multiple devices. For example, a user may configure his system such that when a call is directed to his dual mode subscriber device 130 while he is out of the office, his assistant receives a message on her device identifying the calling party and indicating a general location for the dual mode subscriber device 130. For example, referring again to FIG. 10, in block 504, the soft switch 134 reviews the call processing information associated with the dual mode subscriber device 130 such as his user defined settings as well as registration information. In response to these settings, the soft switch 134 sends SIP messaging to a designated second device in a similar manner as block 506. Based on the information, the second device can accept the call in place of the originally intended recipient.

Applying this ability to a factual scenario, let's return again to our traveling executive who has completed his call to Marie and entered an important meeting. The soft switch 134 receives a call initiation from the executive's home telephone over the PSTN. The soft switch 134 checks the call processing information associated with the dual mode subscriber device 130 such as his user defined settings as well as registration information. The user has instructed the system to route a message to Marie whenever a call from his home number is received during regular business hours and he is outside of the coverage area of the WLAN. Marie, who may be in the break room with her wireless device, receives a message on her device over the WLAN. The message reads "Incoming call for Bob Executive from Bob's house. Bob is out of the office. Would you like to intercept this call?" Marie, aware of the important meeting, signals affirmatively and the call is routed to her. A message is sent to Mr. Executive's device and a corresponding message is displayed for Mr. Executive such as "A call was received at 3:09 pm from Bob's house. This call was answered by Marie."

As a second example, assume that the user of dual mode subscriber device 130 also carries the data device 154. SIP signaling associated with the call can also be sent to data device 154. The data device 154 can send SIP signaling back to the soft switch 134 and, thus, execute the same type of functions as the dual mode subscriber device 130.

For example, assume a user is holding the data device 154 that provides scheduling and email functions and is participating in a call using the dual mode subscriber device 130. If an incoming call is received for the dual mode subscriber device 130, the soft switch 134 sends SIP signaling messaging to the data device 154 indicating the incoming call. The data device 154 can notify the user of the incoming call and offer the user options. For example, a display might read "You are receiving an incoming call from Martin Stuart. Would you like to accept this call and place your current call on hold?" A series of soft keys could allow the user to accept the second call, place the first call on-hold, transfer either the first or second call to voice-mail or another extension and the like. The user can signal his intentions directly on the data device 154 such that he controls his dual mode subscriber device 130 with his data device 154. Also, the data device 154 can find emails exchanged with the second calling party or display upcoming or past appointments with the second calling party. In this way, a second device can be used to provide call control for the dual mode subscriber device 130. Alternatively, these same functions can be implemented in the subscriber device 130.

Other new call features include the ability to barge into a call. For example, assume that a call comes into the user as illustrated in the blocks 540-548 of FIG. 11. However, rather than immediately accept the call, the user would like to send the caller to voice mail and to monitor the message as it is left. The user signals this direction to the dual mode subscriber device 130. The SIP messaging from the dual mode subscriber device 130 to the soft switch 134 signals this intent. The flow continues forward to establish the PCM cellular audio path as well as the PCM landline path similar to those shown in blocks 554-570 of FIG. 11. The soft switch 134 routs the audio path, such as the one created in block 570, to the voice mail application. The soft switch 134, in parallel, routes the voice-bearing traffic stream from the calling party to the dual mode subscriber device 130 such as over the path 152 established in block 572. The audio is output by the subscriber device 130 so that the user can listen to the message as it is being left. If at any time the user of the dual mode subscriber device 130 chooses to barge into the call, the dual mode subscriber device 130 sends a SIP signaling message to the soft switch 134. In response, the soft switch 134 also routes the voice-bearing data stream from the dual mode subscriber device 130 to the calling party and a bi-directional call is established. In this case, the soft switch 134 might also signal the voice mail system to cease recording.

Figure 14:
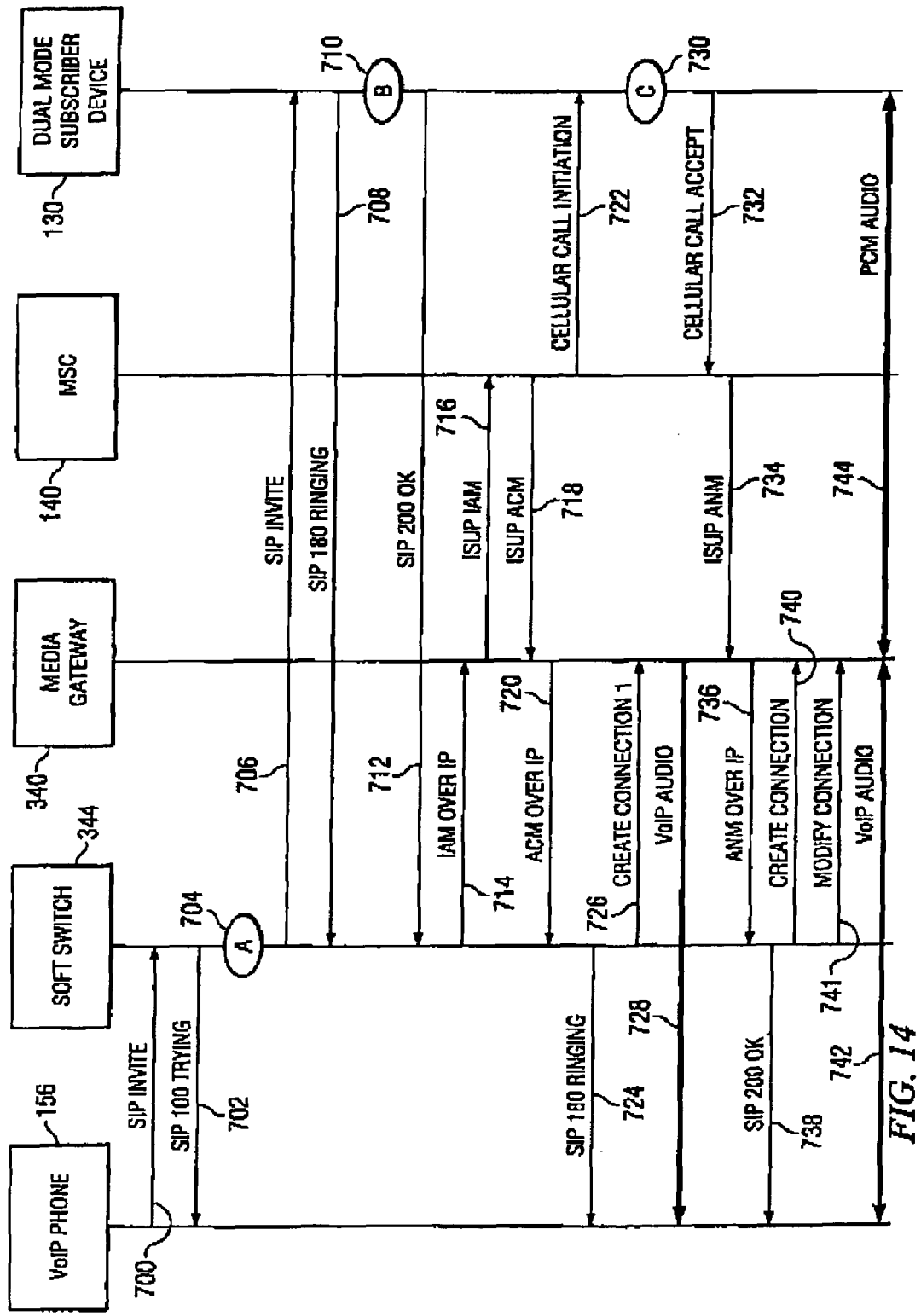
FIG. 14 is a call flow diagram illustrating exemplary call flow embodiment when an IP device initiates a call in a system that employs a media gateway.

FIG. 14 illustrates an exemplary call flow when an IP phone, such as VoIP phone 156, initiates a call to a dual mode subscriber device 130 that is currently located outside the WLAN in a system that employs a media gateway between the soft switch 134 and the legacy MSC such as shown in FIG. 6. The specific order of the described blocks can be varied depending on system requirements and taking into account the effect on the call flow.

In block 700, the VoIP phone 156 sends a SIP invitation message specifying the PBX telephone number or other identifier such as the SIP URL or IP address of the dual mode subscriber device 130. The soft switch 134 344 receives the invite and responds with a SIP trying message in block 702. In block 704, the soft switch 134 344 reviews the call processing information associated with the dual mode subscriber device 130 such as the user-defined settings as well as registration information. The soft switch 134 344 determines to contact the dual mode subscriber device 130 in the cellular network. In block 706, the soft switch 134 344 sends a SIP invitation message to the dual mode subscriber device 130 over the data-bearing path of the cellular network, such as the path 150 of FIG. 6. The soft switch 134 344 identifies the dual mode subscriber device 130 using standard IP addressing techniques. In block 708, the subscriber device responds by sending a SIP ringing indication message. In block 710, the dual mode subscriber device 130 accepts the call. Alternatively, this response is automatic and the call is accepted by the dual mode subscriber device 130 at some other point in the call flow such as at block 730. In either case, the dual mode subscriber device 130 responds by sending a SIP OK message to the soft switch 134 344 in block 712.

To command the media gateway 340 to initiate the voice-bearing traffic channel, the soft switch 134 344 creates an IP message for transmission over the IP network to the media gateway 340, such as over the legs 342A and 342B. The message indicates an initiation of a call over the cellular network to the dual mode subscriber device 130 designated by its cellular telephone number. As such, in block 714, the soft switch 134 344 sends an IAM message or like call initiation message in IP format over the IP backbone 108 to the media gateway 340 designating the dual mode subscriber device 130 by its cellular telephone number.

In block 716, the media gateway 340 receives the IP formatted message and, in response, signals a call establishment attempt to the legacy MSC 140, such as over the leg 342C, using one of a variety of standard PSTN signaling protocols. In this case, the media gateway 340 sends an ISUP IAM. In block 718, the legacy MSC 140 responds with an ACM. The message is received by the media gateway 340 and, in block 720, the media gateway 340 creates a corresponding IP formatted message and sends it to the soft switch 134 344 over the IP backbone 108.

In response to block 716, the legacy MSC 140 initiates a cellular call in block 722 according to well-known practices. In block 730, the dual mode subscriber device 130 automatically accepts the call if it has already been accepted in block 710. Also in block 730, the dual mode subscriber device 130 correlates the incoming cellular voice call with the previously received SIP invitation. The dual mode subscriber device 130 responds with a cellular call accept in block 732. In turn, the legacy MSC 140 responds with an ANM to the media gateway 340 in block 734. The media gateway 340 responds to the soft switch 134 344 with an IP message with the ANM message information in block 736. These PSTN blocks can occur before, after or in parallel with the SIP blocks just described.

Meanwhile, the soft switch 134 344 responds to the VoIP phone 156 with a SIP ringing indication message in block 724. The soft switch 134 344 sends a first create connection message to the media gateway 340 in block 726. The first create connection message instructs the media gateway 340 to allocate resources to the VoIP audio path to be used in block 728 and later in block 742. The MGCP is used in this example although other protocols could be used such as Megaco or other media gateway control protocols. In a logical sense, the media gateway 340 establishes a unidirectional VoIP voice-bearing path from the media gateway 340 to the VoIP phone 156 in block 728 and voice-bearing packets begin to stream from the media gateway 340 to the VoIP phone 156.

In response to the IP ANM message sent in block 736, the soft switch 134 344 sends a SIP OK message to the VoIP phone 156 in block 738. The soft switch 134 344 sends a second create connection message to the media gateway 340 in block 740. The second create connection message instructs the media gateway 340 to allocate resources to the PCM audio path to be used to establish a voice connection. In block 744, a telephone channel is allocated and a bi-directional audio path from the media gateway 340 through the PSTN 106 to the dual mode subscriber device 130 is established, such as using the legs 342C, 342D and 342E. In block 741, the soft switch 134 344 sends a modify connection message to the media gateway 340 instructing it to connect together the two previously created endpoints and to perform media conversion as necessary, for example converting between IP encoded and PCM encoded voice signaling. In block 742, a bi-directional VoIP voice-bearing path from the media gateway 340 to the VoIP phone 156 has been established, thus completing a voice link from the VoIP phone 156 to the dual mode subscriber device 130. Note that the VoIP path from the media gateway 340 to the VoIP phone 156 can carry packets on an efficient path and these packets need not enter the soft switch 134 344.

Figure 15:
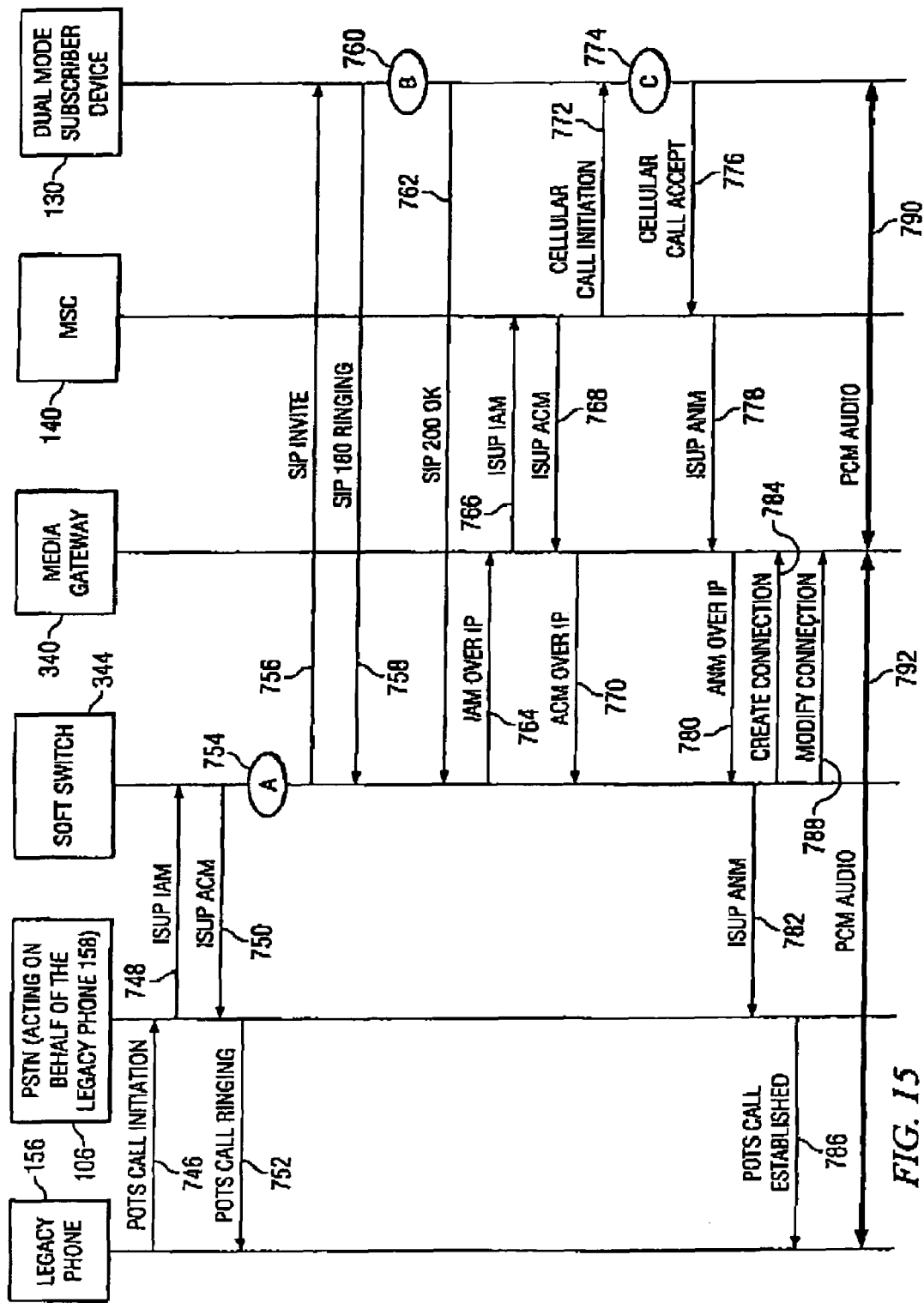
FIG. 15 is a call flow diagram illustrating exemplary call flow embodiment when a PSTN device initiates a call in a system that employs a media gateway.

FIG. 15 illustrates an exemplary call flow when a legacy phone initiates a call to a dual mode subscriber device 130 that is currently located outside the WLAN in a system that employs a media gateway between the soft switch 134 and the legacy MSC such as shown in FIG. 6. The specific order of the described blocks can be varied depending on system requirements and taking into account the effect on the call flow.

In block 746, a PSTN device, such as the legacy phone 158, sends a POTS call initiation to the PSTN 106 designating the PBX telephone number of the dual mode subscriber device 130. In block 748, the PSTN 106 (acting on behalf of the legacy phone 158) sends an ISUP IAM (or other call initiation message depending on the protocol in use) specifying the dual mode subscriber device 130 by its PBX telephone number. In block 750, the soft switch 134 344 responds with an ISUP ACM. In block 752, the PSTN 106 sends a POTS call ringing indication to the legacy phone 158.

In block 754, the soft switch 134 344 reviews the call processing information associated with the dual mode subscriber device 130 such as his user-defined settings as well as registration information. The soft switch 134 344 determines to contact the dual mode subscriber device 130 in the cellular network. In block 756, the soft switch 134 344 sends a SIP invitation message to the dual mode subscriber device 130 over the data-bearing path of the cellular network, such as the path 150 of FIG. 6. In block 758, the subscriber device responds by sending a SIP ringing indication message such as SIP 180 RINGING. In block 760, the dual mode subscriber device 130 accepts the call. Alternatively, this response is automatic and the call is accepted by the dual mode subscriber device 130 at some other point in the call flow. In either case, the dual mode subscriber device 130 responds by sending an OK message (such as SIP 200 OK) to the soft switch 134 344 in block 762.

To command the media gateway 340 to initiate the voice-bearing traffic channel, the soft switch 134 344 creates an IP message for transmission over the IP network to the media gateway 340, such as over the legs 342A and 342B. The message indicates an initiation of a call over the cellular network to the dual mode subscriber device 130 designated by its cellular telephone number. As such, in block 764, the soft switch 134 344 sends an IAM message in IP format over the IP backbone 108 to the media gateway 340 designating the dual mode subscriber device 130 by its cellular telephone number.

In block 766, the media gateway 340 translates the IP message and signals a call establishment attempt to the legacy MSC 140 using standard PSTN signaling, such as over the leg 342C. In block 768, the legacy MSC 140 responds with an ISUP ACM. The message is received by the media gateway 340 and, in block 770, the media gateway 340 sends a corresponding ACM over IP message to the soft switch 134 344.

In response to the block 766, the legacy MSC 140 initiates a cellular call in block 772 according to well-known practices. In block 774, the dual mode subscriber device 130 automatically accepts the call if it has already been accepted previously in the call flow. Also in block 774, the dual mode subscriber device 130 correlates the incoming cellular voice call with the SIP invitation. The dual mode subscriber device 130 responds with a cellular call accept in block 776. In turn, the legacy MSC 140 responds with an ISUP ANM to the media gateway 340 in block 778. The media gateway 340 responds to the soft switch 134 344 with an IP message with the ANM message information in block 780. In response, the soft switch 134 344 sends an ISUP ANM to the PSTN 106 in block 782. These PSTN blocks can occur before, after or in parallel with the SIP blocks just described.

The soft switch 134 344 sends a create connection message to the media gateway 340 in block 784 instructing it to allocate resources for each PCM call leg endpoint. In response to block 782, the PSTN 106 indicates that the POTS call leg has been established in block 786. In block 788, the soft switch 134 344 sends a modify connection command instructing the media gateway 340 to connect together the two previously allocated PCM voice path endpoints. In block 790, a telephone channel is allocated and a bi-directional audio path from the media gateway 340 through the PSTN 106 to the dual mode subscriber device 130 is established, such as using the legs 342C, 342D and 342E. In block 792, a bi-directional audio path from the media gateway 340 to the legacy phone 158 is established, thus completing a voice link from the legacy phone 158 to the dual mode subscriber device 130.

As noted above, when the dual mode subscriber device 130 receives a SIP signaling message over the path 150 indicating an incoming voice call over the path 152, it correlates the message information with an incoming voice call as described with respect to blocks 520, 560, 730 and 774 above. Several mechanisms can be used to facilitate this correlation. In one embodiment, the soft switch 134 is assigned a set of outgoing numbers according to standard PSTN mechanisms. When a call is established from the soft switch 134 through the path 152, one number from the bank of assigned outgoing numbers is assigned to the call and is transmitted over the path 152 according to standard caller ID techniques. The dual mode subscriber device 130 recognizes the number as one originating from the soft switch 134 and, thus, correlates this call with the most recently received or the next received SIP signaling message. In one embodiment, the subscriber device receives information regarding the block of numbers from a SIP signaling message that is transmitted at the time the call is received. In other embodiments, numbers are transferred to the dual mode subscriber device 130 at some earlier time and stored within the dual mode subscriber device 130.

Depending on the design of the system, this approach may lend itself to misidentification of calls. For example, if two calls are routed from the soft switch 134 in quick succession, the identification of the calls might be transposed at the dual mode subscriber device 130.

In one embodiment, the soft switch 134 addresses this transposition error by inserting a delay in transmission of one of the two calls. For example, after forwarding a call to the subscriber device, the soft switch 134 will delay the transmission of any subsequent call if necessary so that no two calls are forwarded to the subscriber device within a selected guard band.

In another embodiment, in the carrier-hosted model shown in FIG. 4 or the carrier gateway model shown in FIG. 6, the caller ID (typically carried as tones inserted between the first and second ring tones) can be replaced by a specific identifier. The specific identifier can be used by the subscriber device to precisely correlate the call initiation request with the corresponding SIP signaling message. The architectures of FIGS. 4 and 6 specifically lend themselves to the approach in that they avoid transmission over the PSTN and, thus, allow more flexibility in the manipulation of custom operation.

For example, typically caller ID information is transmitted between the PSTN and legacy MSC using a field in an ISUP message. Because the ISUP message originates from the media gateway 340 or the carrier soft switch 134 320, a proprietary caller ID identifier can be inserted. The dual mode subscriber device 130 correlates this artificial caller ID identifier with an identifier in the SIP signaling message sent to the dual mode subscriber device 130. In this way, the correlation between the legacy cellular voice leg and the SIP messaging that initiated the session can be more precisely identified.

As noted above, a responsive subscriber initiation approach can be used whereby the subscriber device is notified via the data path that an incoming call for it has been received at the soft switch 134 and, in response, the subscriber device initiates call back to the soft switch 134. In such a case, the correlation process is largely delegated to the soft switch 134. In a similar fashion, using a responsive soft switch 134 initiation strategy (described below with respect to FIG. 16), the correlation process is largely delegated to the subscriber device.

FIG. 16 is a flowchart of the blocks or process implemented by the subscriber device 130 in a system using a responsive soft switch 134 initiation strategy. In a responsive soft switch 134 initiation strategy, when a call is initiated over the cellular network from the dual mode subscriber device 130, it sends a call initiation message over the data-bearing path of the cellular network. In response, the soft switch 134 initiates a call to the called party as well as to the dual mode subscriber device 130. The soft switch 134 then switches the two legs together to complete the voice call using a similar call flow strategy to the ones shown above.

Referring again to FIG. 16, flow begins in block 348 when a call initiation request is received from the user. For example, referring back to FIG. 8, a user can enter a telephone number in the keypad using the user interface 412. In block 350, in response to the request, the controller 420 commands the SIP processor 424 to create a call initiation message that is sent over the data-bearing path of the cellular network. For example, the SIP processor 424 creates a SIP invite message specifying the called party as well as the dual mode subscriber device 130 identity. The cellular processor 426 sends this message over the data-bearing path of the cellular network, using the cellular front end 402.

When the soft switch 134 receives the SIP invite message, it initiates a call to the dual mode subscriber device 130 such as by sending a PSTN call initiation message to the PSTN indicating the dual mode subscriber device 130 as the called VoIP phone 136y its cellular telephone number. Alternatively, the soft switch 134 can send an IP encoded message to a media gateway such as the media gateway 340. The soft switch 134 also initiates a call to the actual called party and switches these two call legs together to complete the voice call. Meanwhile the dual mode subscriber device 130 awaits the cellular call initiation message in block 352.

When the cellular call initiation is received over the cellular front end 402, the cellular processor 426 alerts the controller 420. In block 354, the controller 420 correlates the incoming call with the previously sent invitation. In one embodiment, the soft switch 134 identifies the dual mode subscriber device 130 as the calling party. For example, the soft switch 134 uses caller ID to specify the originating number as the PBX telephone number assigned to the dual mode subscriber device 130 and the controller 420 uses this identity to facilitate the correlation process. If the correlation is successful, the controller 420 commands the cellular processor 426 to automatically accept the call. The controller 420 need not command the user interface 412 to alert the user, as he is the call initiator. In fact, in most cases, the user is unaware that a responsive soft switch 134 initiation strategy has been used. At this point, the soft switch 134 continues the call flow until a voice call is established between the dual mode subscriber device 130 and the called party.

As noted above, once the voice call has been established, the dual mode subscriber device 130 can control the voice call with SIP signaling sent to the soft switch 134. For example, in block 358, the controller 420 receives a request from the user interface 412 to add another caller to the existing call so that a conference call is established. In block 360, the controller 420 commands the SIP processor 424 to create a SIP message and forward it to the cellular front end 402 for transmission to the soft switch 134.

As noted above, intercom services can be provided. Returning again to our traveling executive, let us now assume that he is accustomed to Marie screening his calls for him while he is in the office and has configured the system to ring Marie's phone first whenever an incoming call is made to his PBX telephone number regardless of his location. Once Marie has spoken with the calling party, she often wants to contact Bob Executive. She can press an intercom button on her handset (or otherwise signals her intention to the soft switch 134 using a wired or wireless device). The soft switch 134 initiates a normal cellular call to the dual mode subscriber device 130 (assuming a responsive subscriber initiation strategy is not being used). The soft switch 134 also sends a parallel SIP message which indicates the incoming call is from Marie and that the dual mode subscriber device 130 should automatically accept the call. In this way, the intercom feature is invoked. When the dual mode subscriber device 130 auto-answers and the voice-bearing channel is established, Marie can orally alert Bob as to the incoming call. Bob can orally signal his intention to accept or reject the transfer. Alternative, Bob can signal his intention manually. Marie can effectuate the transfer using the established voice-bearing channel.

Although FIG. 2 shows an example system implementation that includes a single WLAN, the system can easily include multiple wired and wireless LANs. For example, a business may have two different campuses, each with its own WLAN, or a user might have a wired or wireless LAN installed at home. A soft switch 134, whether located at one of the two sites or in a centrex model or carrier-focused model, can provide call routing in the same manner as discussed above as the subscriber device leaves the coverage area of the first WLAN and subsequently enters the coverage area of the second WLAN. In the same manner, the carrier-focused model lends itself to accept users from disparate networks. For example, if a carrier is offering WLAN services to company A at location A and WLAN services to company B at location B, a subscriber device associated with company A which is located within the coverage area of the WLAN at location B may be offered services over the WLAN.

When a dual mode subscriber device 130 is in the cellular coverage area, if an IP bearing cellular data path (such as the path 150 in FIG. 2) is not available, SIP message may be sent over the voice-bearing paths (such as the path 152 of FIG. 2) using short message services (SMS) which are transmitted over the legacy cellular voice-bearing paths (such as the path 152 of FIG. 2.) In addition, in-band dual-tone multi-frequency (DTMF) signaling or computer modem tones can be used to carry the SIP signaling over the voice-bearing path through the cellular network.

In alternate embodiments, other communication methods (instead of SIP) may be employed to communicate data over a data-baring path. These data-baring paths include, but are not limited to: embodiments that use a communicate over the HyperText Transfer Protocol, Internet Protocol Security Protocol, Virtual Private Network, custom protocol, or other protocol know in the art.

In one embodiment, the messaging sent over the data-bearing path of the cellular network uses HyperText Transfer Protocol (HTTP.) The HTTP protocol is commonly used to move hypertext files across the Internet or other computer networks. A typical web page is comprised of a set of hypertext files, which are individually transferred. The HTTP protocol requires an HTTP client program on one end, in this case within the dual mode subscriber device 130, and an HTTP server program on the other end. HTTP is the most commonly used protocol in the World Wide Web (WWW).

In one embodiment, an HTTP Post message is sent from the dual mode subscriber device 130 over the path 150 (see FIG. 2). An HTTP post message allows dual mode subscriber device 130 to push data to a soft switch 134 that is coupled to an HTML server. In this case, the HTTP message specifies the called party using an identifier, such as a telephone number or other customer/device identifier.

In another embodiment, a secure socket layer (some times referred to as HTTP over SSL or "HTTPs") is used. The SSL protocol is a web protocol developed by Netscape and built into most browsers that encrypts and decrypts user page requests as well as the pages that are returned by the Web server. HTTPs uses the SSL as a sublayer under its regular HTTP application layering.

A secure link may be established between the dual mode subscriber device 130 and entity associated with the soft switch 134, such as the third party application gateway 178.

For example, in one embodiment, the third party application gateway 178 may act as a gateway to convert signaling received from the dual mode subscriber device 130 into the signaling format used by the connection session manager 172 and call control and signaling function 170. In one embodiment, the third party application gateway 178 acts as a HTTP/SIP gateway and converts an HTTP POST message into the appropriate SIP message.

In an alternate embodiment, a virtual private network (VPN) may be established. A VPN is a network in which some of the parts are connected using the public Internet, but the data sent across the Internet is encrypted, so the entire network is "virtually" private. The use of a virtual private network allows for authentication of parties, such as dual mode subscriber device 130 and other objects communicating with the soft switch 134. A virtual private network may be employed in conjunction with or as an alternative to HTTPs. In such an embodiment, the third party application gateway 178 acts as a HTTPs/SIP gateway and converts proprietary HTTPs signals to SIP messages.

In yet another embodiment, Internet Protocol Security Protocol (IPSec) may be used to secure and authenticate messages between dual mode subscriber device 130 and soft switch 134 via call control and signaling function 170. In IPSec embodiments, third party application gateway 178 acts as a IPSec/SIP gateway and carries SIP messages over the IPSec transport layer.

IPSec refers to two protocols for the Internet Protocol Layer layer: IP Authentication Header (AH) and the Encapsulating Security Protocol (ESP). These protocols may be applied alone or in combination with each other. In some embodiments, dual mode subscriber device 130 may also employ Internet Key Exchange (IKE), a negotiation protocol that allows IPsec users to agree on security services, i.e., authentication and encryption methods, the keys to use, and how long the keys are valid before new keys are automatically exchanged. IKE is a dual phase protocol. Phase 1 authenticates each peer and creates a secure encrypted link for doing phase 2. In Phase 2, the dual mode subscriber device 130 negotiations security services for the IPsec-compliant VPN channel. After phase 2 is completed, the link from phase 1 is torn down and data traffic abides by security services set forth in the phase 2 negotiation, e.g., ESP tunneling with triple-DES encryption. The methods used in IKE protect against denial of service and man-in-the-middle attacks and ensures non-repudiation, perfect forward secrecy, and key security (via periodic refreshing of keys).

In one embodiment, a cellular carrier may choose to decode for SIP messages at any point along the IP bearing cellular data paths (such as path 150 of FIG. 2), for example at the SGSN or GGSN nodes. Once identified, these messages can be prioritized or delayed as desired.

Alternatively, the remote unit is not configured to operate in a WLAN. The SIP features can be extended over the cellular system as shown above without incorporation of a WLAN or even a wired local area network.

A number of commercial attempts have been made to build micro-cellular base stations that provide a more limited coverage area in comparison with traditional base stations. Often these micro cellular base stations have been marketed as indoor solutions. The systems and methods described herein could be integrated into such a micro-cellular system to provide SIP features to a micro-cellular system.

Several commercial attempts have been made to configure an 802.11 network look like an extension of the cellular network. These architectures designate the cellular network as the core and treat each WLAN as just another base station. These architectures typically designate the MSC as the centralized intelligence for an entire region. Because most MSCs and SGSNs are designed to handle a limited number of base stations typically numbered about one hundred, the architecture does not scale to accommodate the thousands of WLAN sites that need to be accommodated in a practical system. These architectures rob the 802.11 infrastructure of SIP capabilities and instead configure them to look like low functionality legacy cellular infrastructure. These architectures often require the connection the WLAN to the core using clumsy last mile transports such as fiber, DSL, cable or fixed wireless. In contrast, according to the architectures given above, the cellular system acts as a last mile for the VoIP network and provides SIP capabilities.

Many alternate embodiments will be readily apparent to one of skill in the art. For example, FIG. 18 is a network diagram showing a network that incorporates an auxiliary soft switch 134. In order to understand the functioning of FIG. 18, let us contrast it with FIG. 6. In FIG. 6, the soft switch 134 344 directly controls the media gateway 340 as shown in the call flows of FIGS. 14 and 15. According to FIG. 18, an auxiliary soft switch 134 346 couples the soft switch 134 344 to the legacy MSC 140. The auxiliary soft switch 134 346 includes a media gateway controller, similar to the media gateway controller 164 shown in FIG. 5. Thus the soft switch 134 344 can simply use standard VoIP signaling and transport to initiate the cellular voice bearer call with the auxiliary soft switch 134 346. The auxiliary soft switch 134 346 is self-sufficient to act as an IP-to-PSTN voice gateway to convert the IP signaling and transport to the legacy PSTN protocols required to communicate with the legacy MSC 140 on path 342C. One potential advantage of this embodiment is reduced legacy cellular voice channel call setup time which is achieved by avoiding the extra media gateway control messaging that would otherwise occur between the soft switch 134 344 and media gateway 340. Another advantage is reduced load on the soft switch 134 344 by avoidance of the same extra messaging. Yet another advantage is reduced resource usage in the soft switch 134 344 as it is not required to maintain the call states and resource states of connections handled by the auxiliary soft switch 134 346. A still further advantage is that selection of the equipment and software specifically used to implement the auxiliary soft switch 134 346 is independent of the selection of equipment and software used to implement the soft switch 134 344. Because the auxiliary soft switch 134 346 interoperates solely with the soft switch 134 344 and the legacy MSC 140, more mature and more vendor neutral standardized VoIP and PSTN protocols can be used in the auxiliary soft switch 134 346.

Figure 19:
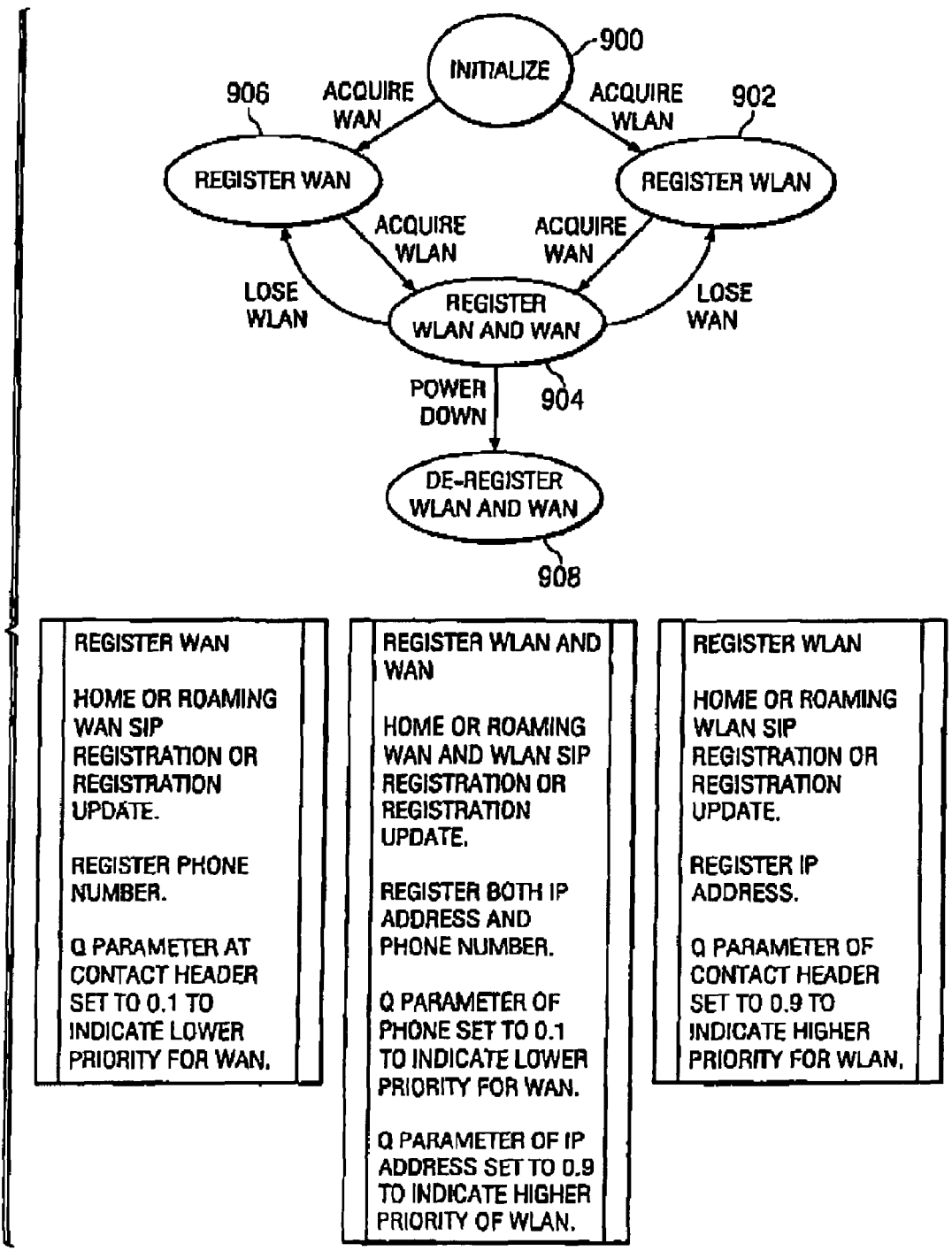
FIG. 19 is a state diagram for idle handoff of a dual mode subscriber device 130 embodiment.

FIG. 19 is a state diagram illustrating dual mode subscriber device 130 operation with respect to idle handoff. Idle handoff is the mechanism by which a primary control channel and one mode of operation of the dual mode subscriber device 130 is determined when the dual mode subscriber device 130 is in the idle mode (e.g. when no active call is in progress.) FIG. 19 is a complement to FIG. 9 which is a flowchart illustrating the registration process.

When a dual mode subscriber device 130 such as dual mode subscriber device 130 is turned on, it comes into an initialization state 900. In one embodiment, the dual mode subscriber device 130 seeks first to acquire a signal from the WLAN, operation over the WLAN being one mode of operation. If the dual mode subscriber device 130 acquires a WLAN signal, the dual mode subscriber device 130 transitions to state 902 and registers with the soft switch 134 over the WLAN 132 using, for example, a SIP registration or registration update message. In one embodiment, the registration is based on an IP address associated with the dual mode subscriber device 130. The soft switch 134 can be either the home station associated with the dual mode subscriber device 130 or a host soft switch 134 supporting roaming. If the soft switch 134 is a host soft switch 134, it may in turn forward or create a registration message for transmission to the home soft switch 134 of the subscriber device. The home soft switch 134 may then respond to the host soft switch 134 with a message indicating a simple registration confirmation, or in another embodiment, with additional information regarding the capabilities and authorized features corresponding to the subscriber device.

As noted above, in one embodiment, operation over the WLAN is favored over operation in the cellular network. In this case, the registration specifies a high Q parameter contact header such as 0.9. The Q parameter is an optional mechanism by which priority is established in a standard SIP system. The soft switch 134 may store some other value or parameters to indicate priority. In alternate embodiments, cellular networks may be favored over the WLAN.

The dual mode subscriber device 130 remains in state 902 until it acquires a wide area network such as cellular network 141 or is powered down or loses connection to the WLAN or is docked or requested to deregister. As shown in FIG. 19, if the dual mode subscriber device 130 detects the cellular network 141, the dual mode subscriber device 130 transitions to state 904 and registers with the soft switch 134 over the cellular network 141 over the data bearing path using, for example, a SIP registration or registration update message. Alternatively, the registration can be sent over the WLAN. The dual mode subscriber device 130 may register by specifying either its cellular phone number or its IP address or other identifier. If operation over the WLAN is favored, the Q parameter of operation over the cellular system is set below the Q parameter of operation of the WLAN. For example, the Q parameter of operation over the cellular network is set at 0.1. Typically, this registration is in addition to any registration the dual mode subscriber device 130 makes directly with the cellular network in accordance with normal cellular operation. The registration to the cellular network infrastructure may take place via an overhead channel associated with the voice-bearing path, or via a disassociated control channel. If the dual mode subscriber device 130 moves outside the coverage area of the cellular system, it transitions to state 902. It may deregister with the soft switch 134 and the cellular network infrastructure. Such a scenario is likely to occur if the user enters a large building in which WLAN service is provided but cellular service is unable to penetrate.

If the dual mode subscriber device 130 moves outside the coverage area of the WLAN, it transitions from state 904 to state 906. In this case, it may deregister the WLAN registration over the data-bearing path of the cellular network or it may deregister over the WLAN as it exits. From the initialization state 900, if the dual mode subscriber device 130 first acquires the cellular network, it transitions to state 906. Although a single connection from state 904 to state 908 is shown on FIG. 19, upon power down from any of states 902, 904 or 906, the dual mode subscriber device 130 enters state 908 and deregisters both the cellular registration and WLAN registration. These deregistration processes may be executed either over the data-bearing path of the cellular network, the WLAN or combination of these. Once registered, the dual mode subscriber device 130 may intermittently renew both its cellular network and WLAN registration to keep them fresh in the soft switch 134.

A dual mode subscriber may move from within the coverage area of the WLAN to outside the coverage area of the WLAN during an active call. In order to avoid dropping the call, a handoff mechanism can be incorporated into the system. In one embodiment of the system, handoff from the WLAN to the cellular network is provided, however, handoff from the cellular network to the WLAN system is not provided for. In another embodiment, handoff between the WLAN and the cellular network is provided in each direction.

FIG. 20 is a call flow diagram showing handoff from the WLAN to the cellular system. Such a handoff could be used as a user exits his home campus covered by a WLAN. In FIG. 20, for drawing efficiency, the far-end connection is not shown because, in one embodiment, no change is made to operation with respect to the far-end user.

In FIG. 20, a voice connection is established with the dual mode subscriber device 130 over the WLAN 132. In FIG. 20, dashed arrows denote signaling transmitted over the WLAN. Solid arrows indicated signaling sent over the cellular network.

Via blocks 910-916 of FIG. 20, a call is placed to the dual mode subscriber device 130, although the handoff mechanism applies equally if the dual mode subscriber device 130 had established the call. In block 910, the soft switch 134 sends, for example, a SIP invite message to the dual mode subscriber device 130 over the WLAN 132. In block 912, the dual mode subscriber device 130 responds by sending a SIP ringing indication. The dual mode subscriber device 130 accepts the call and responds by sending a SIP OK message back to the soft switch 134 in block 914. In block 916, a bi-directional VoIP audio channel is established between the dual mode subscriber device 130 and the soft switch 134 over the WLAN 132.

In block 918, the dual mode subscriber device 130 determines that a handoff to the cellular system is warranted. This determination can be made in one of several ways. In one embodiment, the dual mode subscriber device 130 monitors a WLAN signal strength parameter such as an automatic gain control (AGC) value or receive signal strength indication (RSSI). In another embodiment, the dual mode subscriber device 130 may monitor a packet error rate, signal to noise ratio or other link quality indication. In yet another embodiment, the dual mode subscriber device 130 may monitor the maximum allowable data rate, current data transfer rate or other link-operation parameter. In yet a further embodiment, the dual mode subscriber device 130 uses several of these parameters to determine an appropriate handoff trigger.

In one embodiment, the dual mode subscriber device 130 uses an averaged, filtered, smoothed or integrated version of the RSSI signal in order to trigger handoff. When an IP system is carrying voice, instantaneous performance is not critical because a voice channel can easily tolerate some errors while still providing acceptable voice quality. Thus, an instantaneous drop in RSSI value does not always indicate that a handoff is necessary. In some systems, operation over the WLAN 132 is preferred to operation over the cellular network 141 and, thus, unnecessary handoff to the cellular network 141 is advantageously avoided.

Also, when designing a handoff mechanism, the avoidance of "ping-ponging" is a factor. Ping-ponging is the scenario in which the dual mode subscriber device 130 performs a rapid and successive series of handoffs. Integration, low-pass filtering, averaging or the like of the RSSI signal, or other handoff trigger, may provide a more favorable handoff indication in some implementations.

Alternatively, the soft switch 134 determines the appropriate handoff trigger. For example, the soft switch 134 can monitor performance parameters either directly or by collecting information from the access points. In this case, the soft switch 134 initiates the cellular connection on its own instigation and sends, for example, a SIP re-invite or registration request message to notify the dual mode subscriber device 130 of the handoff.

In yet another alternative embodiment, the WLAN access points monitor handoff triggers and originate handoff request indications to the associated soft switch 134. The access point can monitor the same types of parameters as the subscriber device including signal strength, link quality or link operation parameters.

Communication through a particular access point (or particular sector of an access point) can be used to trigger handoff. For example, the coverage area of a particular access point can be positioned at an exit point of the campus such as over a doorway, in a reception area, or in a parking garage. When communication is transferred to one of these exit-area access points, either the dual mode subscriber device 130 or the soft switch 134 initiates a handoff to the cellular system.

In any case, in FIG. 20, we assume that, in block 918, the dual mode subscriber device 130 determines that a handoff to the cellular network is appropriate. In response, the dual mode subscriber device 130 sends a SIP registration in block 920. In FIG. 20, the signaling for block 920 is shown in dashed lines to indicate that the signaling is sent over the WLAN 132. However, the signaling could be sent over the data-bearing path of the cellular network 141 with the same effect.

In order to transition the audio stream from the WLAN 132 to the voice-bearing path of the cellular network 141, a PCM audio connection is established over the voice-bearing path of the cellular network 141. The cellular voice connection can be initialized and even fully established before the handoff of the voice bearing traffic occurs. The SIP messaging may occur before, after or at the same time as the initialization of the cellular voice connection.

The choice between these sequencing options may depend upon the architecture of the dual mode subscriber device 130. Referring again to FIG. 8, the WLAN front end 400 and the cellular front end 402 may share some common elements such as an antenna. If so, the two paths may be coupled together using a switch or a coupler. A switch connects the RF power to either one of the WLAN front end 400 or the cellular front end 402 but generally would not allow the simultaneous connection of both front-end elements to the antenna. If a coupler, diplexer, duplexer or other power-sharing mechanism is used, simultaneous operation is possible and the system designer has more freedom to order the blocks to the best advantage of voice performance. Generally use of a coupler increases the D.C. power requirement and decreases the sensitivity of the subscriber device and a switch may be favored for this reason. In FIG. 20, we assume that the subscriber device is fully capable of simultaneous operation.

In response to the SIP registration, in block 922, the soft switch 134 sends a SIP invite message (such as SIP re-INVITE) to the dual mode subscriber device 130. In FIG. 20, the signaling for blocks 922 and 924 are shown in dashed lines to indicate that the signaling is sent over the WLAN 132. However, the signaling could be sent over the data-bearing path of the cellular network 141 with the same effect. The soft switch 134 also sends an ISUP IAM to the PSTN 106 specifying the dual mode subscriber device 130 by its cellular telephone number in order to establish a voice connection over the voice-bearing path of the cellular network in block 926. In block 928, the PSTN 106, acting on behalf of the dual mode subscriber device 130, responds with an ACM. In response to the block 928, the PSTN 106 sends a cellular call initiation in block 930. In block 932, the dual mode subscriber device 130 automatically accepts the call. Also in block 932, the dual mode subscriber device 130 correlates the incoming cellular voice call with the on-going WLAN voice call. The dual mode subscriber device 130 responds with a cellular call accept in block 934. In block 936, the PSTN 106 responds to the cellular call accept with an ISUP ANM. As noted above, these PSTN blocks can occur before, after or in parallel with the SIP-related blocks.

In block 938, a standard voice channel is established from the soft switch 134 to the dual mode subscriber device 130 over the voice-bearing path of the cellular network 141. If they have not already done so, in blocks 940 and 942, the soft switch 134 and the dual mode subscriber device 130, respectively, begin transmitting and receiving voice signals over the cellular network 141. In one embodiment, blocks 940 and 942 occur when the soft switch 134 begins receiving PCM frames over the cellular network 141. The soft switch 134 can send a switch indication to the dual mode subscriber device 130 over the WLAN 132 or cellular network 141. Alternatively, the dual mode subscriber device 130 can also use the receipt of PCM frames or the cession of VoIP packets to trigger the switch.

Alternatively, the responsive subscriber origination strategy (discussed above) could be used to establish the call connection. In one embodiment, using a responsive subscriber origination strategy transmission of the SIP registration in block 920 is not necessary. In response to the handoff determination in block 918, the dual mode subscriber device 130 initiates a call to the soft switch 134 over the voice-bearing path of the cellular network 141. The soft switch 134 uses receipt of an incoming cellular call from a dual mode subscriber device 130 participating in an active voice call over the WLAN 132 as a trigger to initiate a handoff. The soft switch 134 can switch over the call connection with or without the use of parallel SIP signaling.

FIG. 21 is a call flow diagram illustrating handoff from the cellular network to the WLAN. Such a handoff could be used as a user enters his home campus covered by a WLAN while a voice call over the voice-bearing path of the cellular network is established. In FIG. 21, dashed arrows denote signaling transmitted over the WLAN. Solid arrows indicated signaling sent over the cellular network.

In FIG. 21, the far-end connection is not shown because, in one embodiment, no change is made to operation with respect to the far-end user. If the cellular coverage is sufficient within the coverage area of the WLAN, handoff from the cellular system to the WLAN is not strictly necessary.

In FIG. 21, a standard cellular voice channel has been established over the voice-bearing path of the cellular network in block 950. Subsequently, the dual mode subscriber device 130 has entered the coverage area of the WLAN 132. Once the dual mode subscriber device 130 acquires the WLAN signal, the dual mode subscriber device 130 can monitor one or more parameters (such as those described above with respect to FIG. 20) to determine when a handoff should occur. These parameters should be chosen to prevent rapid successive handoff between the cellular network and the WLAN. For example, if the dual mode subscriber device 130 uses transition to the coverage area of an exit-area access point to trigger a handoff to the cellular system, it may wait until it has acquired a non-exit-area access point before instigating a handoff to the WLAN. Alternatively, the dual mode subscriber device 130 or soft switch 134 may wait for the triggering parameter to exceed a hysteresis level, which level might be negotiated during registration. If the soft switch 134 makes the determination of appropriate time for a handoff, it sends a SIP re-INVITE or registration request message or the like to notify the dual mode subscriber device 130.

In this case, we assume in block 952 of FIG. 21, the dual mode subscriber device 130 determines that a handoff to the WLAN 132 is warranted. In block 954, the dual mode subscriber device 130 sends a SIP registration message to the soft switch 134. In response the soft switch 134 sends a SIP re-INVITE to the dual mode subscriber device 130 in block 956. In block 958, the dual mode subscriber device 130 responds with a SIP OK message. In response to the SIP OK message or some other negotiated or predefined trigger, both the soft switch 134 and dual mode subscriber device 130 begin sending audio over the WLAN 132 in block 960. In block 962, both the soft switch 134 and dual mode subscriber device 130 release the audio path over the voice-bearing path of the cellular network 141.

The SIP messaging described with respect to FIGS. 20 and 21, and indeed with respect to some of the other figures, may vary from or expand upon the SIP protocol standards. Modification to standard operation is possible because both the soft switch 134 and the dual mode subscriber device 130 are especially designed to provide operation according to the embodiments of the invention and can be design to handle custom messaging. Any nonstandard messages that are forwarded to a standard SIP system can be translated by the soft switch 134.

In particular, a standard SIP INVITE or re-INVITE message contains a Session Description Protocol (SDP). The SDP designates the format, timing, and authorship of the streamed media. SDP is the means by which the dialog to be established using the SIP messaging is described. Within SDP, a "c" field is used to establish the network type, connection type, and connection address. At present, only an Internet connection type, such as IP address, is supported. In one embodiment, a new set of values is established corresponding to a POTS system to designate cellular telephones.

Figure 22:
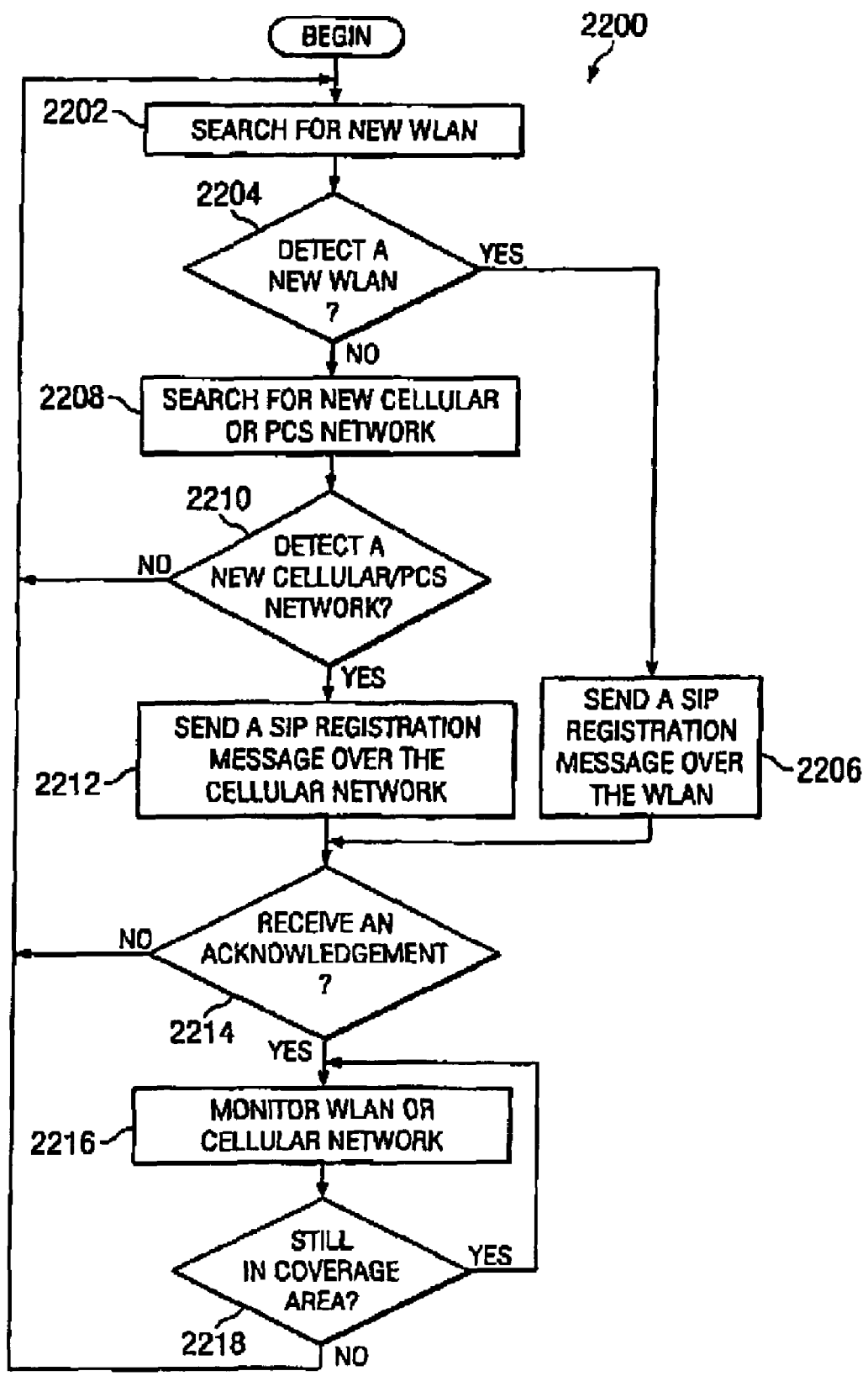
FIG. 22 is a flowchart illustrating a handoff process embodiment between the cellular network and the WLAN.

FIG. 22 is a flowchart of a handoff process 2200, a handoff mechanism embodiment to register a wireless dual mode subscriber device 130 to a wireless host device 10 in a wireless system 100, constructed and operative in accordance with an embodiment of the present invention. Handoff process 2200 is depicted favoring WLAN access over cellular or Personal Communication System (PCS) networks. It is understood, by those known in the art, that cellular and PCS systems may be used interchangeably in this example embodiment. At block 2202, dual mode subscriber device 130 searches for a WLAN. If a WLAN is detected at decision block 2204, SIP processor 424 sends a SIP registration message, such as SIP INVITE, over the WLAN to soft switch 134, block 2206, and flow continues at block 2214.

If a new WLAN is not found at decision block 2204, dual mode subscriber device 130 searches for a cellular or PCS network, block 2208. If a new cellular or PCS network is detected, there are a multitude of different ways for dual mode subscriber device 130 to register with the cellular network at block 2212. In one embodiment, cellular processor 426 initiates a call to soft switch 134, and sends a SIP registration message, such as SIP INVITE. The soft switch 134 receives the SIP registration message from the cellular network, and realizes a hand off has taken place, dropping the WLAN connection. In one embodiment, dual mode subscriber device 130 sends a SIP registration message, such as SIP INVITE, over an existing WLAN connection, telling soft switch 134 to initiate a call to dual mode subscriber device 130. Soft switch 134 then calls dual mode subscriber device 130, which answers the call and drops the previously existing WLAN connection. In this embodiment, soft switch 134 does not need to know a hand off has taken place, it just knows that a new call has been initiated. Flow continues at block 2214. If no networks are detected, flow returns to block 2202.

At block 2214, dual mode subscriber device 130 tries to determine whether soft switch 134 received the registration message by responding with an acknowledgement message, such as SIP 100 TRYING, indicating that the soft switch 134 is trying to set up the call. If an acknowledgement is not received, flow returns to block 2202. Otherwise, flow continues at block 2216, and dual mode subscriber device 130 continues to monitor the WLAN or cellular network. While the device 130 remains in the WLAN or cellular network coverage area, block 2218, it monitors the quality of the network, block 2216, as discussed previously; when the quality of the network diminishes (e.g., when device 130 is leaving the coverage area, or the signal quality is otherwise reduced), device 130 begins to search for a new WLAN at block 2202.

FIG. 23 is a flowchart of an alternate handoff process 2300, a handoff mechanism embodiment to register a wireless dual mode subscriber device 130 to a wireless host device 10 in a wireless system 100, constructed and operative in accordance with an embodiment of the present invention. Handoff process 2300 is depicted favoring cellular or Personal Communication System (PCS) networks rather than a WLAN. As mentioned above, it is understood, by those known in the art, that cellular and PCS systems may be used interchangeably in this example embodiment.

At block 2302, dual mode subscriber device 130 searches for a cellular or Personal Communication System (PCS) networks. If such a network is detected at decision block 2304, the cellular processor 426 registers with the cellular network, block 2306. There are a multitude of different ways for dual mode subscriber device 130 to register with the cellular network. In one embodiment, dual mode subscriber device 130 initiates a call to soft switch 134, via cellular processor 426, and sends a SIP registration message, such as SIP INVITE. The soft switch 134 receives the SIP registration message from the cellular network, and realizes a hand off has taken place, dropping the WLAN connection. In another embodiment, In one embodiment, SIP processor 424 sends a SIP registration message, such as SIP INVITE, over an existing WLAN connection, telling soft switch 134 to initiate a call to dual mode subscriber device 130. Soft switch 134 then calls dual mode subscriber device 130, which answers the call and drops the previously existing WLAN connection. In this embodiment, soft switch 134 does not need to know a hand off has taken place, it just knows that a new call has been initiated. Flow continues at block 2314.

If a new cellular network is not found at decision block 2304, dual mode subscriber device 130 searches for a WLAN, block 2308. If a WLAN is detected, dual mode subscriber device 130 establishes the connection to the WLAN. A SIP registration message, such as SIP INVITE, is sent over the WLAN to soft switch 134, block 2312, and flow continues at block 2314. If no networks are detected, flow returns to block 2302.

At block 2314, dual mode subscriber device 130 tries to determine whether soft switch 134 received the registration message by responding with an acknowledgement message, such as SIP 100 TRYING, indicating that the soft switch 134 is trying to set up the call. If an acknowledgement is not received, flow returns to block 2302. Otherwise, flow continues at block 2316, and dual mode subscriber device 130 continues to monitor the WLAN or cellular network. While the device 130 remains in the WLAN or cellular network coverage area, block 2318, it monitors the quality of the network, block 2316, as discussed above; when the quality of the network diminishes, device 130 begins to search for a new cellular network at block 2302.

FIG. 24 is call flow diagram illustrating call initiation from the dual mode subscriber device 130 operating within the cellular network in a system in which HTTP messaging is used.

Placing a call comprises dual mode subscriber device 130 calling itself coupled with sending a call initiation message specifying a telephone number as a called party. The voice call may be initiated through a over a voice-bearing path of a cellular network while concurrently sending an HTTP post message over a data-bearing path of the cellular network to the soft switch 134. The HTTP post message specifies an actual called party, VoIP phone 136. These two pieces of data are correlated, a call is placed to VoIP phone 136, and the two calls are joined.

In this embodiment, the connection session manager 172 acts as a basic features platform application. In block 2400, the dual mode subscriber device 130 creates a data message for transmission over of the cellular network that specifies the actual called party, located at VoIP phone 136. It is understood by those known in the art, that any phone known in the art may be substituted for VoIP phone 136 in these series of examples, and that the VoIP phone 136 is used for illustrative purposes only. The message transmitted in block 2400 acts as a vicarious call initiation message. In the embodiment shown in FIG. 24, the dual mode subscriber device 130 sends an HTTP post message over the data-bearing path of the cellular network but other standard or proprietary message types could be used which carry called party identification information. In one embodiment, the HTTP post message specifies the called party and may specify authentication information regarding the calling party.

The dual mode subscriber device 130 posts the message to the third party application gateway 178, which in this case is acting as a gateway to translate HTTP messaging to the protocol used by the connection session manager 172, the call control and signaling function 170 or both.

The third party application gateway 178 responds to the HTTP message in block 2400 by sending a message to the call control and signaling function 170, which in this case is acting as the wireless feature application module. For example, in its capacity as a wireless feature application module, the call control and signaling function 170 maintains the call state and creates and processes the SIP messages that can be directly received and output by the media gateway controller 164 to and from the IP backbone 108, block 2402. This may be accomplished through a message from the third party application gateway 178 and the call control and signaling function 170 In one embodiment, the message transferred in block 2402 is a SIP MESSAGE.

In block 2404, the call control and signaling function 170 sends a responsive message requesting authentication, such as a SIP UNAUTHORIZED message to the third party application gateway 178. The third party application gateway 178 responds in turn in block 2406 with authentication information, such as a SIP MESSAGE(auth) message. The SIP MESSAGE(auth) indicates a SIP MESSAGE request containing an authorization SIP HEADER (a response to the WWW-Autyhenticate header in the 401 Unauthorized response) has been received by the call control and signaling function 170. Assuming that the calling party is authenticated and therefore authorized to use the network, in block 2408, the call control and signaling function 170 responds with a call accept message (such as SIP 200 OK.) Through blocks 2402-2408, the call control and signaling function 170 has authenticated the calling party.

Authentication of the calling party prevents unauthorized calls from taking place on the wireless network.

In response to the successful authentication process, the third party application gateway 178 responds to the dual mode subscriber device 130 with a acknowledgement, such as an HTTP 200 OK( ) message to indicating that the calling party has been authenticated, in block 2412.

In block 2410, modules within the call control and signaling function 170 execute logical functions which will be used to correlate a recently, concurrently or later-received voice call and call initiation to VoIP phone 136 indicted in block 2400. For example, in one embodiment, the call control and signaling function 170 sets a timer; if an incoming call from the dual mode subscriber device 130 is received before the timer expires then the call control and signaling function 170 correlates that call to previously initiated call to VoIP phone 136. As with many of the blocks in FIG. 24, the specific order of these blocks can be varied while still achieving a similar result.

In block 2414, the dual mode subscriber device 130 creates a standard cellular call initiation message. In some embodiments, the message specifies a surrogate telephone number rather than the actual called VoIP phone 136. In this case, we assume the surrogate called party number is the initiating subscriber device PBX assigned number. In other words, the dual mode subscriber device 130 calls itself.

At block 2416 connection session manager 172 receives a call originating from a wireless system user. In a PSTN implementation, an ISUP initial address message (IAM) reserves an idle trunk circuit from the originating switch to the destination switch and identifies the dual mode subscriber device 130 such as by its cellular telephone number. The ACM indicates that all address signals have been received and that call set-up is progressing. Alternatively, in a SIP implementation, an INVITE and 100 TRYING messages may be received and sent, respectively, by connection session manager 172, blocks 2416-2418.

In block 2420, the connection session manager 172 has identified the call as originating from a wireless system user and responds by initiating a call through the call control and signaling function 170 such as by sending a SIP INVITE message. In block 2422, the call control and signaling function 170 correlates the incoming call with the call initiation process indicated by block 2400. For example, in one embodiment, a timer set in block 2410 has not yet expired and the arrival of a call initiation message from the subscriber calling itself triggers the correlation by the call control and signaling function 170.

In block 2424, the call control and signaling function 170 sends a responsive message such as a 100 TRYING message. In block 2426, the call control and signaling function 170 initiates a call to the previously indicated VoIP phone 136, such as by sending a SIP INVITE specifying VoIP phone 136 to the connection session manager 172.

The connection session manager 172 responds to the invite by a responsive message, such as a 100 TRYING message, block 2428, and sends an invite to VoIP phone 136 (VoIP phone 136), block 2430.

VoIP phone 136 acknowledges the invite, through a responsive message, depicted as a 100 TRYING message, block 2432 and informs the connection session manager that the VoIP phone 136 phone is ringing, through message 180 RINGING, block 2434.

The ringing message is passed to the call control and signaling function 170, block 2436, which responds by informing the connection session manager 172 that a voice path between the call control and signaling function 170 and VoIP phone 136 has been established.

To complete the call between dual mode subscriber device 130 and VoIP phone 136, the voice path between the call control and signaling function 170 and dual mode subscriber device 130 must be joined with the other voice path.

A ringing message is sent from connection session manager 172 and the PSTN 108, block 2440.

Acknowledgements, such as 200 OK are sent between VoIP phone 136 and session manager, block 2442, the connection session manager 172 and call control and signaling function 170, block 2444, and vice versa, block 2446, and session manager 172 and the PSTN 108, block 2448.

At this point the call is connected, block 2450, and the voice path between the dual mode subscriber device 130 is established with VoIP phone 136, block 2460.

The voice path is acknowledged through acknowledgement message, such as ACK, sent between the PSTN and the session manager, block 2452, the connection session manager 172 and call control and signaling function 170, block 2454, and vice versa, block 2456, and session manager 172 and VoIP phone 136, block 2458.

Figure 33:
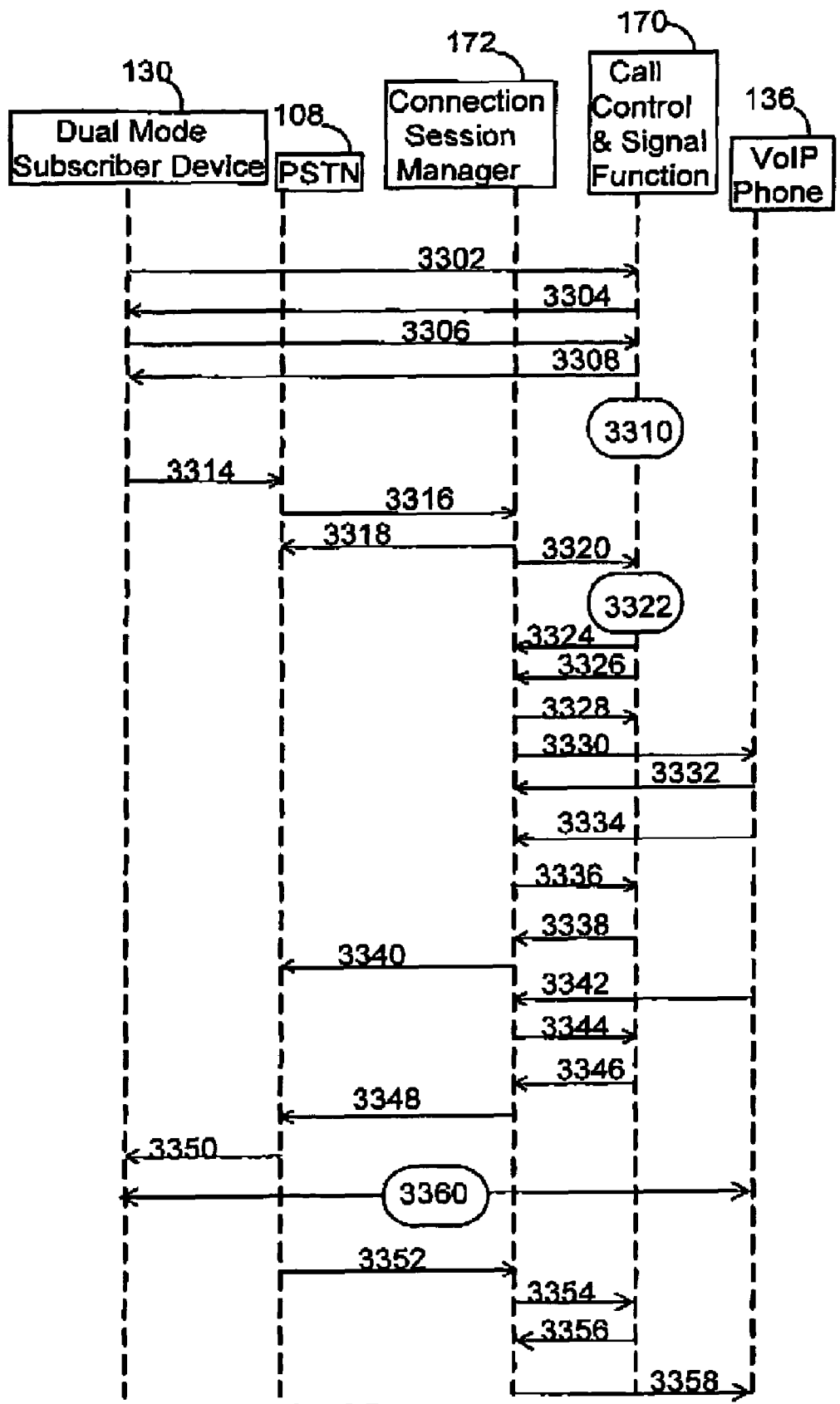
FIG. 33 is a call flow diagram illustrating an alternate embodiment of call initiation from a remote unit operating in the cellular system.

FIG. 33 is call flow diagram illustrating an alternate embodiment of call initiation 3300 from the dual mode subscriber device 130 operating within the cellular network in a system without a third party application gateway 178. For illustrative purposes only, the following embodiment is described using the SIP protocol. However, those familiar with the art understand that other protocols may be used with embodiments of the present invention, without departing from the scope of the claims.

As with FIG. 24, in FIG. 33, placing a call comprises dual mode subscriber device 130 calling itself coupled with sending a call initiation message specifying a telephone number as a called party. The voice call may be initiated through a over a voice-bearing path of a cellular network while concurrently sending a post message over a data-bearing path of the cellular network to the soft switch 134. The post message specifies an actual called party, VoIP phone 136. These two pieces of data are correlated, a call is placed to VoIP phone 136, and the two calls are joined.

Again, the connection session manager 172 acts as basic features platform application. In block 3302, the dual mode subscriber device 130 creates a data message for transmission over of the cellular network that specifies the actual called party, located at VoIP phone 136. The data message is sent to the call control and signalling function 170. It is understood by those known in the art, that any phone known in the art may be substituted for VoIP phone 136 in these series of examples, and that the VoIP phone 136 is used for illustrative purposes only. The message transmitted in block 3302 acts as a vicarious call initiation message. In the embodiment shown in FIG. 33, the dual mode subscriber device 130 sends a message over the data-bearing path of the cellular network but other standard or proprietary message types could be used which carry called party identification information. In one embodiment, the message specifies the called party and may specify authentication information regarding the calling party. In one embodiment, the message transferred in block 3302 is a SIP MESSAGE.

In block 3304, the call control and signaling function 170 sends a responsive message requesting authentication, such as a SIP UNAUTHORIZED message to the dual mode subscriber device 130. The call control and signaling function 170 responds in turn in block 3306 with authentication information, such as a SIP MESSAGE(auth) message. The SIP MESSAGE(auth) indicates a SIP MESSAGE request containing an authorization SIP HEADER (a response to the WWW-Authenticate header in the 401 Unauthorized response) has been received by the call control and signaling function 170. Assuming that the calling party is authenticated and therefore authorized to use the network, in block 3308, the call control and signaling function 170 responds with a call accept message (such as SIP 200 OK.) Through blocks 3302-3308, the call control and signaling function 170 has authenticated the calling party.

Authentication of the calling party prevents unauthorized calls from taking place on the wireless network.

In block 3310, modules within the call control and signaling function 170 execute logical functions which will be used to correlate a recently, concurrently or later-received voice call and call initiation to VoIP phone 136 indicted in block 3302. For example, in one embodiment, the call control and signaling function 170 sets a timer; if an incoming call from the dual mode subscriber device 130 is received before the timer expires then the call control and signaling function 170 correlates that call to previously initiated call to VoIP phone 136. As with many of the blocks in FIG. 33, the specific order of these blocks can be varied while still achieving a similar result.

In block 3314, the dual mode subscriber device 130 creates a standard cellular call initiation message. In some embodiments, the message specifies a surrogate telephone number rather than the actual called VoIP phone 136. In this case, we assume the surrogate called party number is the initiating subscriber device PBX assigned number. In other words, the dual mode subscriber device 130 calls itself.

At block 3316 connection session manager 172 receives a call originating from a wireless system user. In a PSTN implementation, an ISUP initial address message (IAM) reserves an idle trunk circuit from the originating switch to the destination switch and identifies the dual mode subscriber device 130 such as by its cellular telephone number. The ACM indicates that all address signals have been received and that call set-up is progressing. Alternatively, in a SIP implementation, an INVITE and 100 TRYING messages may be received and sent, respectively, by connection session manager 172, blocks 3316-3318.

In block 3320, the connection session manager 172 has identified the call as originating from a wireless system user and responds by initiating a call through the call control and signaling function 170 such as by sending a SIP INVITE message. In block 3322, the call control and signaling function 170 correlates the incoming call with the call initiation process indicated by block 3300. For example, in one embodiment, a timer set in block 3310 has not yet expired and the arrival of a call initiation message from the subscriber calling itself triggers the correlation by the call control and signaling function 170.

In block 3333, the call control and signaling function 170 sends a responsive message such as a 100 TRYING message. In block 3326, the call control and signaling function 170 initiates a call to the previously indicated VoIP phone 136, such as by sending a SIP INVITE specifying VoIP phone 136 to the connection session manager 172.

The connection session manager 172 responds to the invite by a responsive message, such as a 100 TRYING message, block 3328, and sends an invite to VoIP phone 136 (VoIP phone 136), block 3330.

VoIP phone 136 acknowledges the invite, through a responsive message, depicted as a 100 TRYING message, block 3332 and informs the connection session manager that the VoIP phone 136 phone is ringing, through message 180 RINGING, block 3334.

The ringing message is passed to the call control and signaling function 170, block 3336, which responds by informing the connection session manager 172 that a voice path between the call control and signaling function 170 and VoIP phone 136 has been established.

To complete the call between dual mode subscriber device 130 and VoIP phone 136, the voice path between the call control and signaling function 170 and dual mode subscriber device 130 must be joined with the other voice path.

A ringing message is sent from connection session manager 172 and the PSTN 108, block 3340.

Acknowledgements, such as 200 OK are sent between VoIP phone 136 and session manager, block 3342, the connection session manager 172 and call control and signaling function 170, block 3344, and vice versa, block 3346, and session manager 172 and the PSTN 108, block 3348.

At this point the call is connected, block 3350, and the voice path between the dual mode subscriber device 130 is established with VoIP phone 136, block 3360.

The voice path is acknowledged through acknowledgement message, such as ACK, sent between the PSTN and the session manager, block 3352, the connection session manager 172 and call control and signaling function 170, block 3354, and vice versa, block 3356, and session manager 172 and VoIP phone 136, block 3358.

In FIGS. 24 and 33, the interactions of the various modules are shown as specific embodiments. It is understood, by those known in the art, that many different implementations and module configurations of the soft switch 134 may be used to execute the general functionality described in FIG. 24. In FIG. 25, the soft switch 134 is shown as a single entity.

FIG. 25 is a flowchart illustrating process 2500, one embodiment of the operation of the soft switch 134 processing a call initiation from a remote unit 130 operating in the cellular system. The remote unit may be the dual mode subscriber device 130. Again, for consistency, we shall refer to the called party as "VoIP phone 136."

Initially, at block 2502, the soft switch 134 receives a vicarious call initiation from the remote unit 130. As described above, the vicarious call initiation may be an HTTP message, an HTTP message sent over a secure socket layer, any message indicting called party over the data-bearing path of the cellular system, any data message over the voice-bearing path, a timer, a call to self as correlation trigger, a last block means voice bearing path connecting dual mode subscriber device 130 and VoIP PHONE 136, a message over a virtual private network, an Internet Protocol Security Protocol encoded message, SMS communication, or any combination or variation thereof, or any other data initiation message as is known in the art. For the sake of an example, let us suppose that the vicarious call initiation is received as an HTTP post message over the data-bearing path of the cellular. In such an embodiment, the HTTP post message specifies the called party and may include information to authenticate the remote unit 130.

At block 2504, process 2500 attempts to authenticate the remote unit 130. This authentication sub-process may be any authentication method known in the art. Authentication of the calling party prevents unauthorized calls taking place on the wireless network. Although discussed above in the context of a call initiation placed from the cellular network, authentication over the WLAN prevents unauthorized users from using the wireless local area network. If the remote unit 130 cannot be authenticated, the call is rejected at block 2506, and the process flow ends.

Alternatively, if the remote unit 130 is authenticated the process flow continues at block 2508.

At block 2508, soft switch 134 correlates the HTTP post with an anticipated incoming voice call. In one embodiment, a timer is set and the arrival of a call initiation message from the subscriber calling itself triggers the correlation by the soft switch 134.

As described above, remote unit 130 calls itself via soft switch 134. Soft switch 134 receives this incoming call over the voice-bearing path of the cellular network from remote unit 130, at block 2510.

The incoming voice call is correlated with the vicarious call initiation specifying VoIP phone 136, block 2512. If any call additional features are specified by the HTTP post, these features may be invoked, if applicable.

Soft switch 134 places a call to VoIP phone 136 on behalf of remote unit 130, block 2514.

The call from the remote unit 130 and the call to VoIP phone 136 are joined, block 2516. The joining may be accomplished through switching the calling party to VoIP phone 136.

Figure 26:
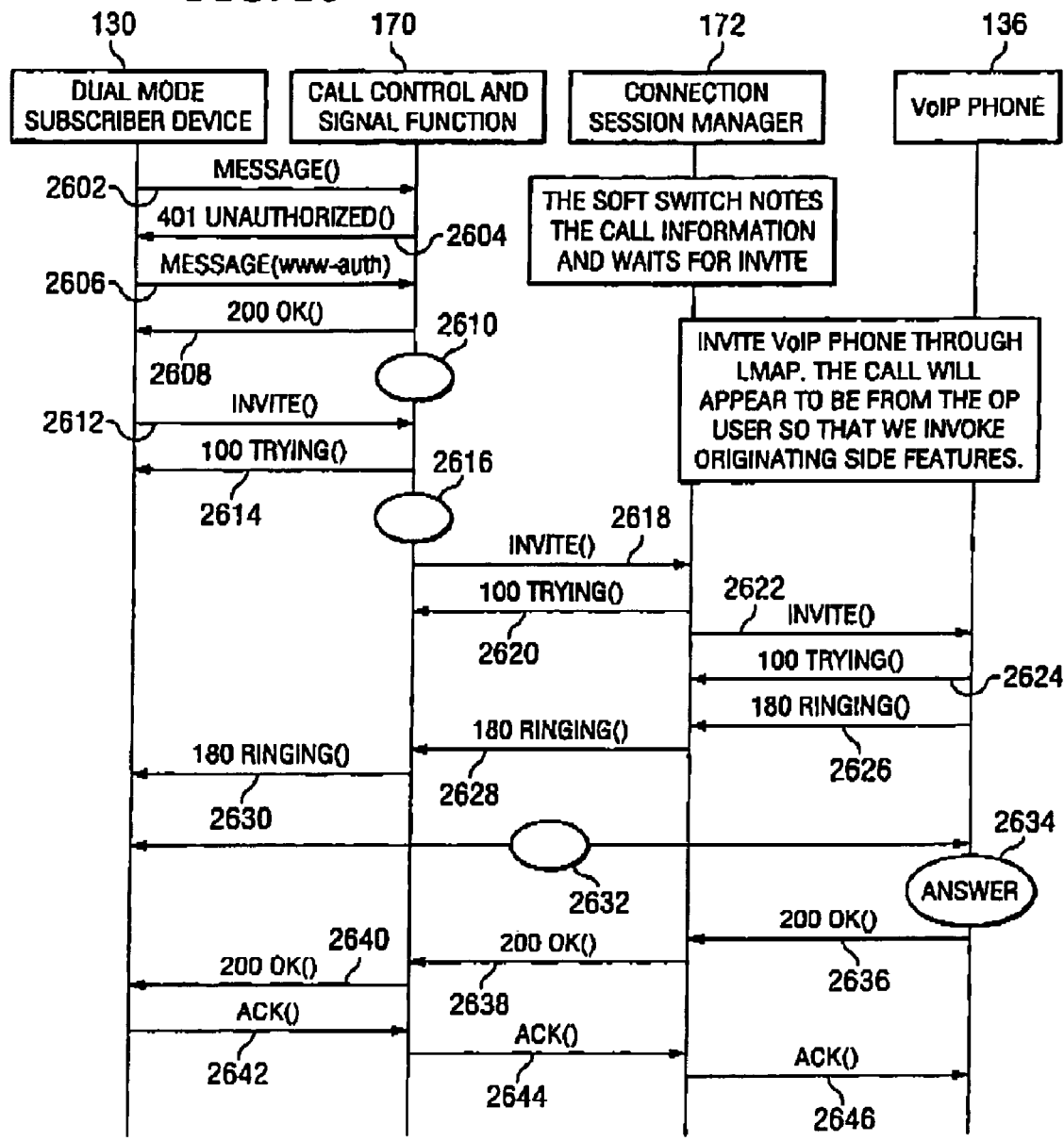
FIG. 26 is a call flow diagram illustrating a call initiation by a remote unit operating within wireless local area network, including authentication.

FIG. 26 is a call flow diagram illustrating a call initiation by a remote unit operating within wireless local area network, including authentication. Placing a call comprises sending a call initiation message specifying a telephone number associated with a soft switch 134 as a called party. The call initiation message and sending an invite message over a wireless local area network the soft switch 134, the invite message specifying an actual called party, VoIP phone 136. These two pieces of data are correlated, a call is placed to VoIP phone 136, and the two calls are joined.

One of the features of the exemplary embodiment shown in FIG. 26 is that the logic modules within the call control and signaling function 170 can perform a similar authentication function regardless of whether the call is initiated within the cellular network or within the WLAN. For example, the authentication sequence represented by blocks 2602-2608 is similar to the sequence illustrated in blocks 2400-2408 of FIG. 24.

A message transmitted by dual mode subscriber device 130 in block 2602 acts as a vicarious call initiation message to the call control and signaling function 170, which is acting as the wireless feature application module. Acting as a wireless feature application module, the call control and signaling function 170 maintains the call state and creates and processes the SIP messages that can be directly received and output by the media gateway controller 164 to and from the IP backbone 108, block 2602. In one embodiment, the message transferred in block 2402 is a SIP MESSAGE.

In block 2604, the call control and signaling function 170 sends a responsive message requesting authentication, such as a 401 UNAUTHORIZED message to the dual mode subscriber device 130. The dual mode subscriber device 130 responds in turn in block 2606 with authentication information, such as a MESSAGE(www-auth) message, to the call control and signaling function 170 indicting caller authentication information. Assuming that the calling party is authenticated and therefore authorized to use the network, in block 2608, the call control and signaling function 170 responds with a call accept message (such as SIP 200 OK.) Through blocks 2602-2608, the call control and signaling function 170 has authenticated the calling party.

Authentication of the calling party prevents fraudulent and other unauthorized calls taking place on the wireless local area network.

In block 2610, modules within the call control and signaling function 170 execute logical functions which will be used to correlate a recently, concurrently or later-received voice call and call initiation to VoIP phone 136 indicted in block 2602. As with many of the blocks in FIG. 26, the specific order of these blocks can be varied while still achieving a similar result.

Dual mode subscriber device 130 sends an invite message to call control and signaling function 170, inviting a voice call, block 2612. Call control and signaling function 170 responds by attempting the call, 100 TRYING, block 2614, and initiates the call, block 2616. At this point, call control and signaling function 170 may also invoke any call features, if applicable, sending an invitation to connection session manager 172 to initiate the call to VoIP phone 136, block 2618.

The connection session manager 172 responds to the invitation with an acknowledgement with 100 TRYING, block 2620, and sends an invitation message to VoIP phone 136, block 2622.

VoIP phone 136 responds by returning a 100 TRYING message, and a 180 RINGING message, to indicate that VoIP phone 136 has been reached. The ringing message is passed on from the connection session manager 172, block 2626, to the call control and signaling function 170 180, block 2628, to the dual mode subscriber device 130, block 2630.

At this point, the two calls are joined, at block 2632. The joining may be accomplished through switching the dual mode subscriber device 130 to VoIP phone 136.

Assuming VoIP phone 136 answers, at block 2634, the acknowledgement for the answer is sent from VoIP phone 136 to the connection session manager 172, block 2636, to the call control and signaling function 170, block 2638, to the dual mode subscriber device 130, block 2640. The acknowledgement for the connection is sent from the dual mode subscriber device 130 to the call control and signaling function 170, block 2642, to the connection session manager 172, block 2644, to VoIP phone 136, block 2646.

Figure 34:
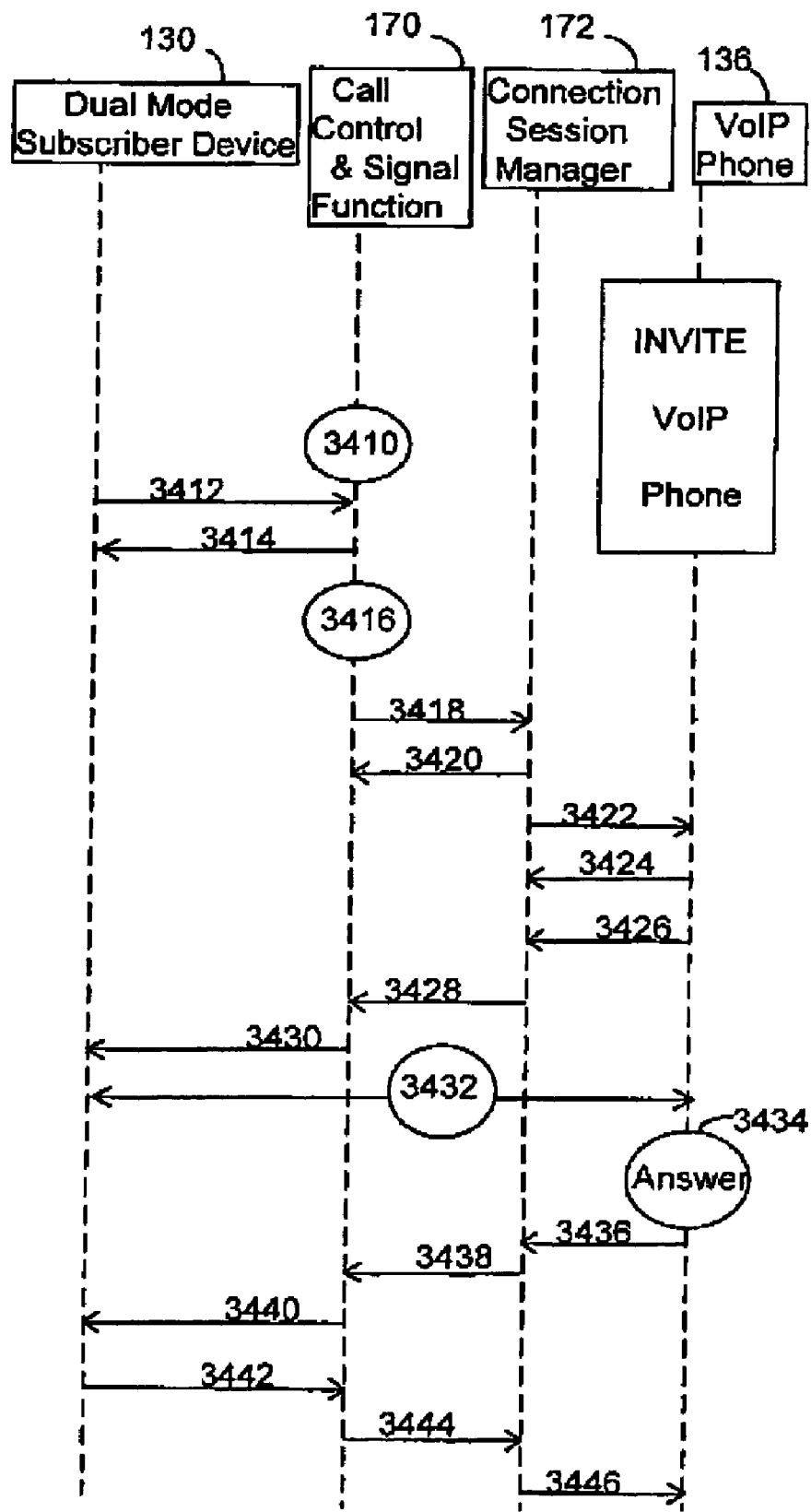
FIG. 34 is a call flow diagram illustrating an alternate embodiment of call initiation by a remote unit operating within wireless local area network, including authentication.

FIG. 34 is a call flow diagram illustrating a call initiation by a remote unit operating within wireless local area network, including authentication, but without a third party application gateway 178. Placing a call comprises sending a call initiation message specifying a telephone number associated with a soft switch 134 as a called party. The call initiation message and sending an invite message over a wireless local area network the soft switch 134, the invite message specifying an actual called party, VoIP phone 136. These two pieces of data are correlated, a call is placed to VoIP phone 136, and the two calls are joined.

Although not depicted in this embodiment, it is understood by those known in the art, that an authentication sequence, such as the ones illustrated in blocks 2400-2408 of FIG. 24 or blocks 3302-3308 of FIG. 33 may be used, and that the logic modules within the call control and signaling function 170 may perform a similar authentication function regardless of whether the call is initiated within the cellular network or within the WLAN.

In block 3410, the dual mode subscriber device 130 sends an invite message to the call control and signaling function 170, inviting execute logical functions which will be used to correlate a recently, concurrently or later-received voice call and call initiation to VoIP phone 136 indicted in block 3402.

As with many of the blocks in FIG. 34, the specific order of these blocks can be varied while still achieving a similar result.

Dual mode subscriber device 130 sends an invite message to call control and signaling function 170, inviting a voice call, block 3412. Call control and signaling function 170 responds by attempting the call, 100 TRYING, block 3414, and initiates the call, block 3416. At this point, call control and signaling function 170 may also invoke any call features, if applicable, sending an invitation to connection session manager 172 to initiate the call to VoIP phone 136, block 3418.

The connection session manager 172 responds to the invitation with an acknowledgement with 100 TRYING, block 3420, and sends an invitation message to VoIP phone 136, block 3422.

VoIP phone 136 responds by returning a 100 TRYING message, and a 180 RINGING message, to indicate that VoIP phone 136 has been reached. The ringing message is passed on from the connection session manager 172, block 3426, to the call control and signaling function 170 180, block 3428, to the dual mode subscriber device 130, block 3430.

At this point, the two calls are joined, at block 3432. The joining may be accomplished through switching the dual mode subscriber device 130 to VoIP phone 136.

Assuming VoIP phone 136 answers, at block 3434, the acknowledgement for the answer is sent from VoIP phone 136 to the connection session manager 172, block 3436, to the call control and signaling function 170, block 3438, to the dual mode subscriber device 130, block 3440. The acknowledgement for the connection is sent from the dual mode subscriber device 130 to the call control and signaling function 170, block 3442, to the connection session manager 172, block 3444, to VoIP phone 136, block 3446.

Figure 27:
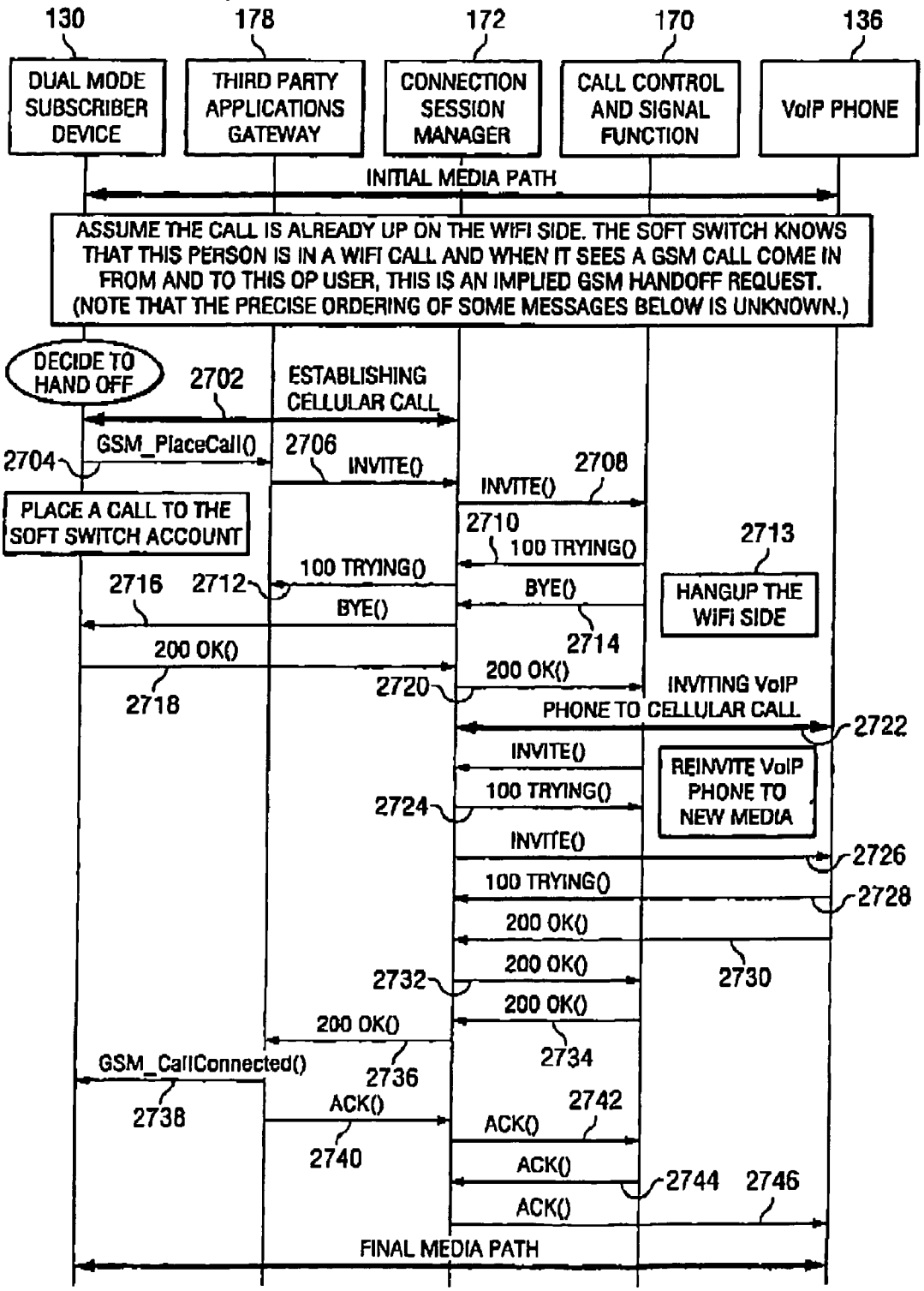
FIG. 27 is a call flow diagram illustrating handoff from the WLAN operation to cellular operation using the responsive subscriber origination strategy

FIG. 27 is a call flow diagram illustrating handoff from the WLAN operation to cellular operation using the responsive subscriber origination strategy discussed above. The responsive subscriber could be used to facilitate hand-off. As such, using a responsive subscriber origination strategy, transmission of a message over the data-bearing path of the cellular network is not necessary. In response to the handoff determination, the dual mode subscriber device 130 initiates a call over the voice-bearing path of the cellular network. The soft switch 134 uses receipt of an incoming cellular call from a dual mode subscriber device 130 as a trigger to initiate a handoff.

The call flow depicted in FIG. 27 makes several assumptions. As the call flow begins, a call has been set up from the dual mode subscriber device 130 to VoIP phone 136. Dual mode subscriber device 130 is communicating over a wireless local area network and a handoff has been triggered from the wireless local area network to a cellular/PCS network. It is also understood that the ordering of the messages, depicted in FIG. 27, is not determanistic.

At block 2702, a decision is made to handoff from a wireless local area network to a cellular network. As described above, this determination may be made in one of several ways. In one embodiment, the dual mode subscriber device 130 monitors a WLAN signal strength parameter such as an automatic gain control (AGC) value or receive signal strength indication (RSSI). In another embodiment, the dual mode subscriber device 130 may monitor a packet error rate, signal to noise ratio or other link quality indication. In yet another embodiment, the dual mode subscriber device 130 may monitor the maximum allowable data rate, current data transfer rate or other link-operation parameter. In yet a further embodiment, the dual mode subscriber device 130 uses several of these parameters to determine an appropriate handoff trigger.

Dual mode subscriber device 130 places a call to itself via the cellular network. This call is routed through the PSTN 108, block 2704. The third party applications gateway 178 informs the connection session manager 172 of the call through an INVITE message, block 2706, and forwarded to the call control and signaling function 170, block 2708.

The control and signaling function 170 processes the request and informs the connection session manager 172 that the INVITE request is being processed. This can be accomplished through a SIP 100 TRYING message. Such a message may also be sent from the connection session manager 172 to the third party gateway 178, block 2712.

Once the cellular network connection has been received, the wireless local area network connection is terminated, block, 2713, generating a BYE message from the call control and signaling function 170 to the connection session manager 172, block 2714. This message may also be sent from the connection session manager 172 to the dual mode subscriber device 130, block 2716, which then acknowledges the termination, blocks 2718 and 2720.

As the wireless local area network connection is being dropped, an invitation may be sent to establish the handoff to VoIP phone 136 via the cellular network. Call control and signaling function 170 requests that the connection session manager 172 sets up the connection, block 2722. Connection session manager 172 tells the call control and signaling function 170 that it is attempting to set up the connection to VoIP phone 136, block 2724, and invites a connection with VoIP phone 136, block 2726.

The Connection Session manager 172 receives a message from VoIP phone 136 that the invite is being processed, block 2728, and then the connection is established with VoIP phone 136, block 2730. The connection is verified by receipt of an OK message to/from the connection session manager call control and signaling function 170 with the third party gateway, block 2732-2736.

The two calls are coupled, block 2738, and acknowledged by connection session manager 172, call control and signaling function 170, and VoIP phone 136, blocks 2740-2746.

Figure 28:
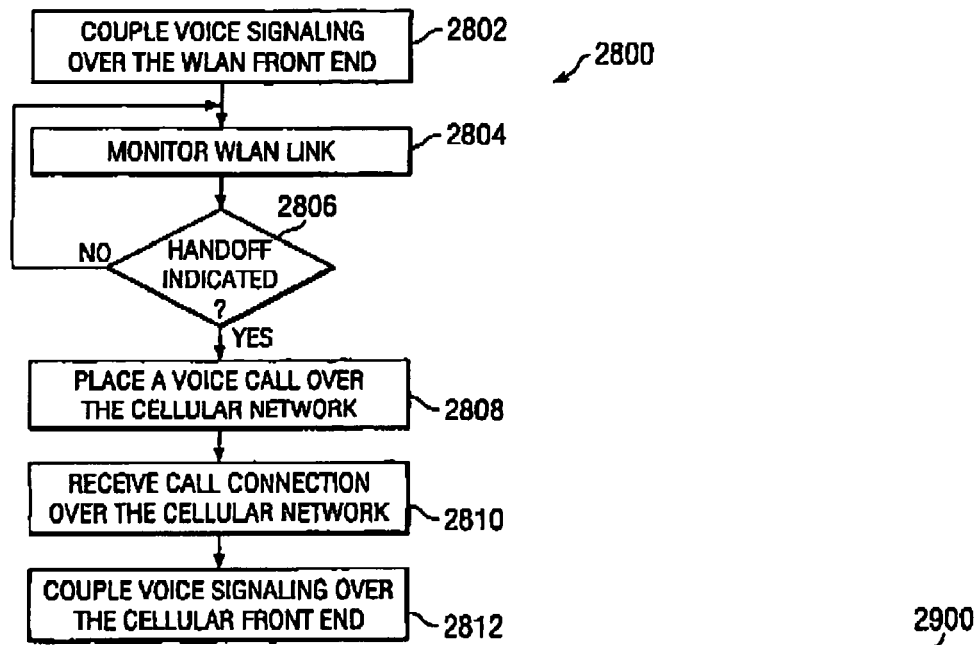
FIG. 28 is a flow chart of illustrating handoff from the WLAN operation to cellular operation using a responsive subscriber origination strategy from the subscriber's viewpoint.

FIG. 28 is a flow chart of process 2800, handoff from the WLAN operation to cellular operation using the responsive subscriber origination strategy from the subscribers view point.

Initially, dual mode subscriber device 130 and VoIP phone 136 communicate via a wireless local area network front-end, block 2802. Dual mode subscriber device 130 continuously monitors its WLAN link, block 2804, until a handoff is indicated, block 2806. An handoff may be indicated by any reason known in the art, as described above.

When a handoff is indicated, dual mode subscriber device 130 places a phone call to itself over the cellular/PCS network, block 2808.

When the dual mode subscriber device 130 receives a call connection (from itself) over the cellular/PCS network, block 2810, it drops its WLAN call, handing off the call to the cellular call, coupling the voice signal over the cellular front end, block 2812.

Figure 29:
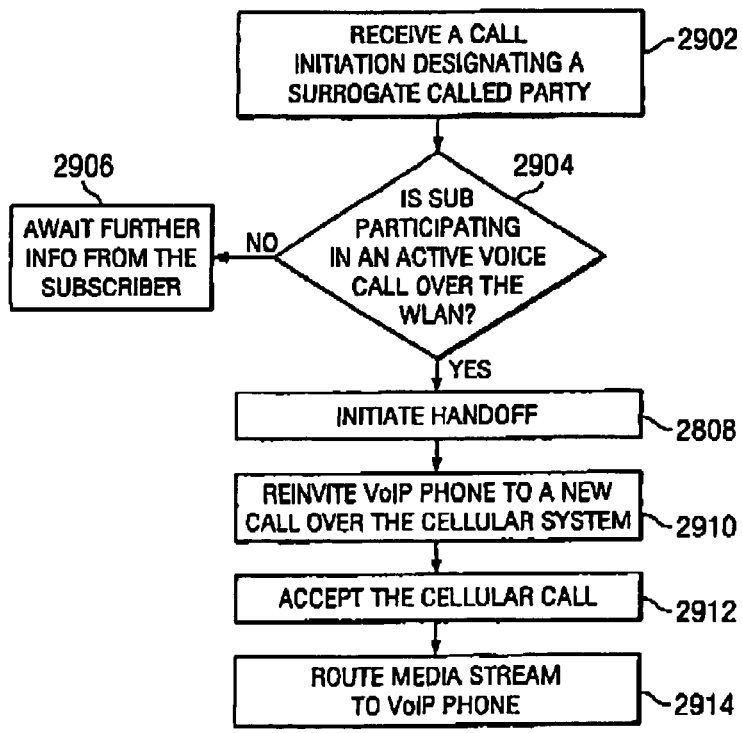
FIG. 29 is a flow chart of illustrating handoff from the WLAN operation to cellular operation using a responsive subscriber origination strategy from the soft switch 134 viewpoint.

FIG. 29 is a flow chart of process 2900, handoff from the WLAN operation to cellular operation using the responsive subscriber origination strategy from the soft switch 134 view point.

Soft switch 134 receives a call initiation (from dual mode subscriber device 130) designating a surrogate called party (the dual mode subscriber device 130), block 2902. At decision block 2904, soft switch 134 determines whether the dual mode subscriber device 130 is already participating in an active voice call over the WLAN. If it is not, the soft switch 134 waits for further information (such as an HTTP message or other notification) from the dual mode subscriber device 130, as a call initiation may be taking place. In some embodiments, if a call is received from the dual mode subscriber device 130 without there being an active WiFi call, the incoming call is rejected. In such an embodiment, a MESSAGE dialogue is required for the call, and a MESSAGE request is not waited for.

If the dual mode subscriber device 130 is already participating in an active voice call over the WLAN, a hand off is initiated, block 2908. VoIP phone 136 is reinvited to a new call over the cellular system, block 2910. The cellular call from dual mode subscriber device 130 is accepted, block 2912, and the cellular media stream/voice call is routed to VoIP phone 136, block 2914. And thus a WLAN to cellular handoff is completed.

Figure 30:
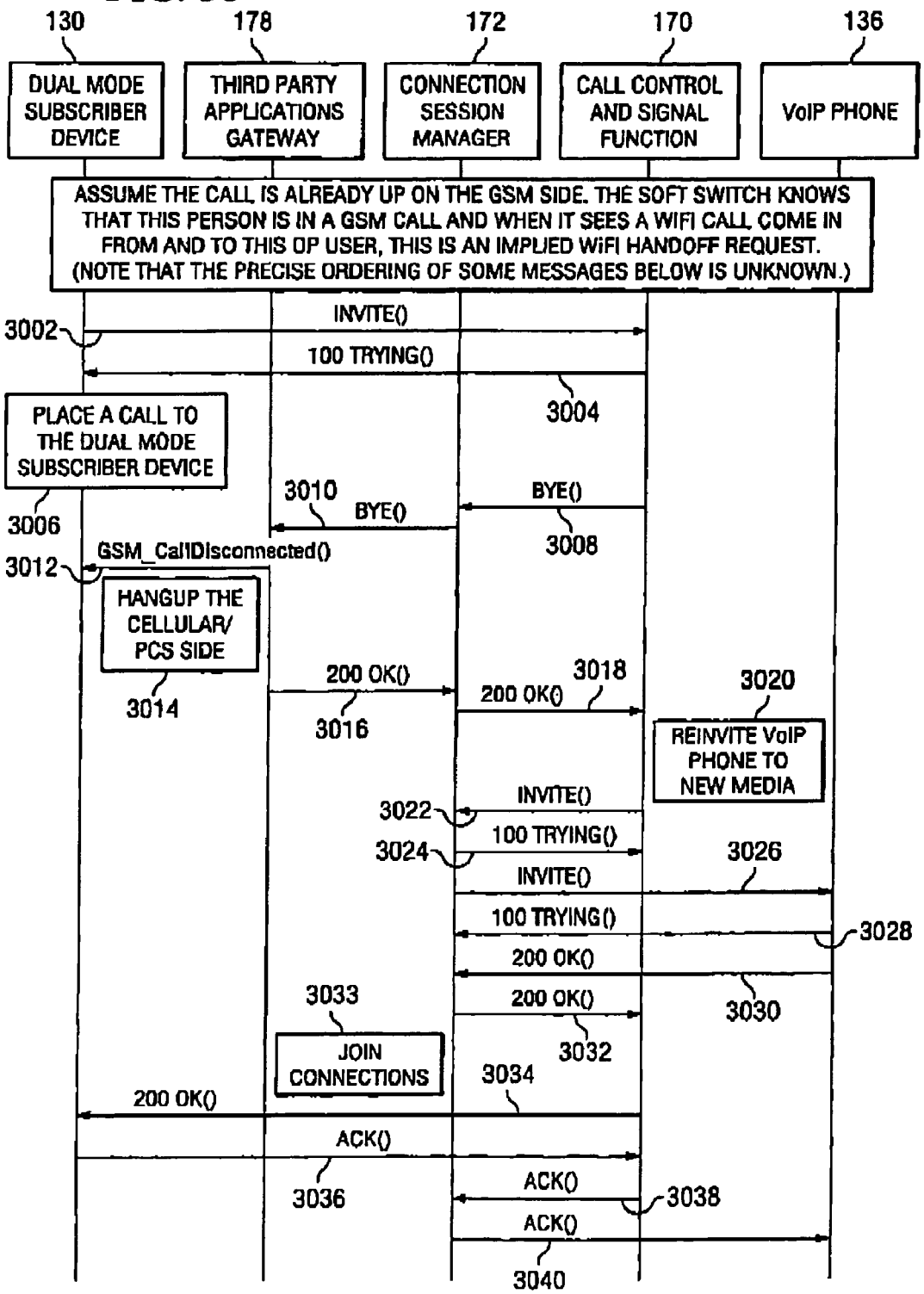
FIG. 30 is a call flow diagram illustrating handoff from the cellular operation to WLAN operation using the responsive subscriber origination strategy.

FIG. 30 is a call flow diagram illustrating handoff from the cellular operation to WLAN operation using the responsive subscriber origination strategy. The responsive subscriber could be used to facilitate hand-off. As such, using a responsive subscriber origination strategy, transmission of a message over the data-bearing path of the cellular network is not necessary. In response to the handoff determination, the dual mode subscriber device 130 initiates a call over the WLAN. The soft switch 134 uses receipt of an incoming WLAN call from a dual mode subscriber device 130 as a trigger to initiate a handoff.

A decision is made to handoff from a cellular network to a wireless local area network. As described above, this determination may be made in one of several ways. In one embodiment, the dual mode subscriber device 130 monitors a WLAN signal strength parameter such as an automatic gain control (AGC) value or receive signal strength indication (RSSI). In another embodiment, the dual mode subscriber device 130 may monitor a packet error rate, signal to noise ratio or other link quality indication. In yet another embodiment, the dual mode subscriber device 130 may monitor the maximum allowable data rate, current data transfer rate or other link-operation parameter. In yet a further embodiment, the dual mode subscriber device 130 uses several of these parameters to determine an appropriate handoff trigger. In some embodiments, the mere presence of a dual mode subscriber device 130 accessible WLAN may trigger the handoff.

Dual mode subscriber device 130 places a call to itself via an invite to call control and signaling function 170, block 3202. The control and signaling function 170 processes the request and informs the dual mode subscriber device 130 that the invite request is being processed, block 3004. This can be accomplished through a SIP 100 TRYING message.

The call control and signaling function 170 places a WLAN call to the dual mode subscriber device 130 3006. Once the WLAN connection has been received, the call control and signaling function 170 generates a BYE message to the connection session manager 172, block 3008, the connection session manager 172 generates a BYE message to the third party gateway 178, and third party gateway 178 disconnects the cellular/PCS connection, block 3012. The cellular portion of the call is thus terminated, block, 3014.

The third party gateway 178 sends an acknowledgement message to connection session manager 172, block 3016, which in turns sends the acknowledgement to the call control and signaling function 170, block 3018. In SIP embodiments, these acknowledgements may be messages such as 200 OK.

VoIP phone 136 is invited to communicate over the WLAN, block 3020. An invite sent from the call control and signaling function 170 to the connection session manager 172, block 3022, and forwarded to VoIP phone 136, block 3026. As the invite requests are processed, messages may be sent saying that the request is being processed, blocks 3024 and 3028. When the WLAN connection with VoIP phone 136 is established block 3029, VoIP phone 136 sends an acknowledgement to the connection session manager 172, block 3030, which is forwarded to the call control and signal function 170, block 3032.

The two calls are coupled, block 3033, and the call control and signal function 170 informs the dual mode subscriber device 130 that the handoff is completed, block 3034.

Dual mode subscriber device 130 the connection to call control and signaling function 170, connection session manager 172, and VoIP phone 136, blocks 3036-3040.

Figure 31:
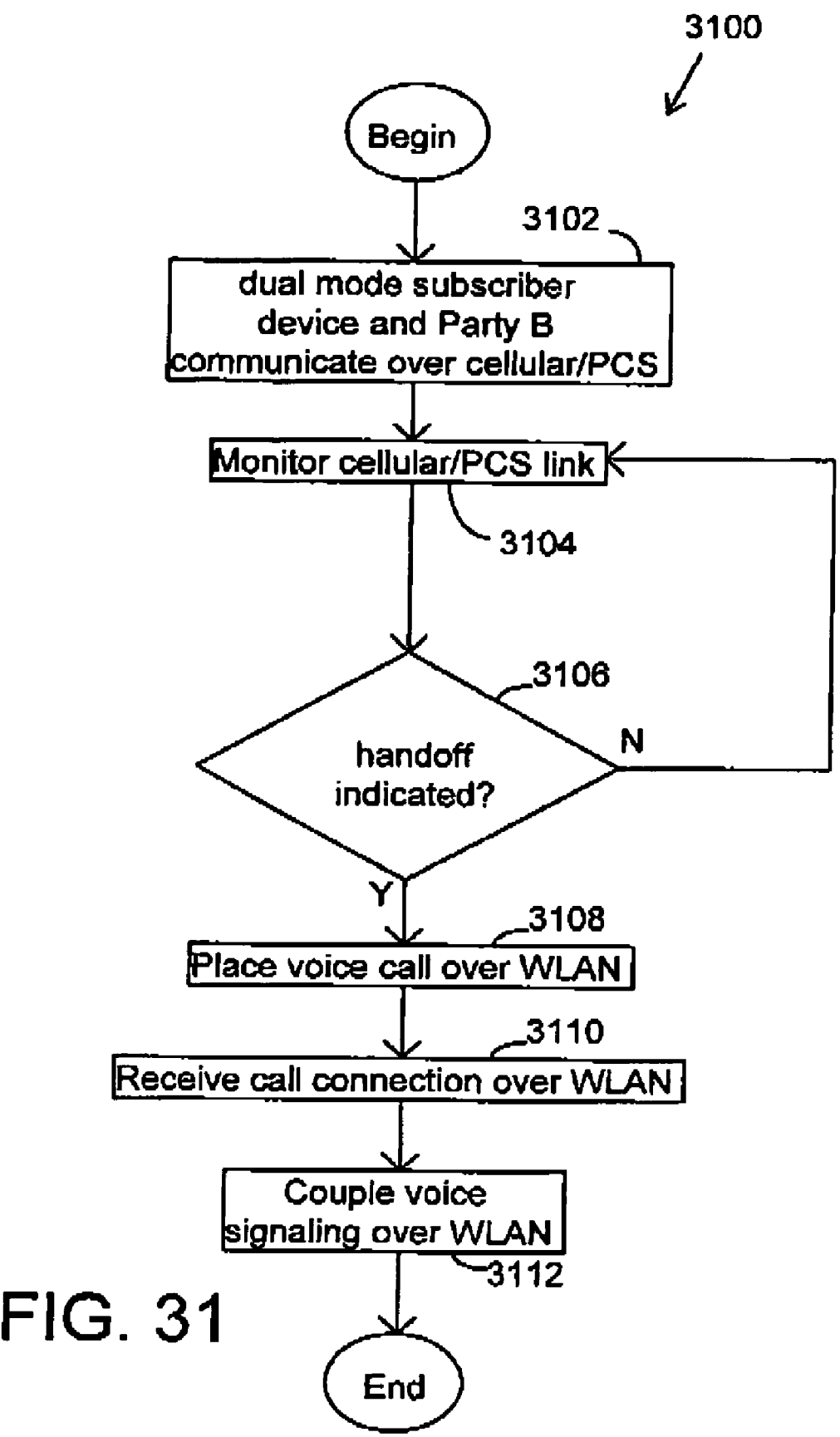
FIG. 31 is a flow chart of illustrating handoff from the cellular operation to WLAN operation using a responsive subscriber origination strategy from the subscriber's viewpoint.

FIG. 31 illustrates process 3100, a cellular to wireless local area network handoff embodied may be accomplished in a similar manner to process 2800. In such an embodiment, a dual mode subscriber device 130 and VoIP phone 136 communicate via a cellular/PCS network front-end, 3102. Dual mode subscriber device 130 continuously monitors its cellular link (block 3104) until a handoff is indicated (block 3106). In some embodiments that favor a WLAN network, a handoff may occur because dual mode subscriber device 130 detects the presence of the WLAN. Regardless, when a handoff is indicated, dual mode subscriber device 130 places a phone call to itself over the WLAN, block 3108. When the dual mode subscriber device 130 receives a call connection (from itself) over the WLAN, block 3110, it drops its cellular/PCS call, handing off the call to the WLAN call, coupling the voice signal over the WLAN front end, block 3112.

Figure 32:
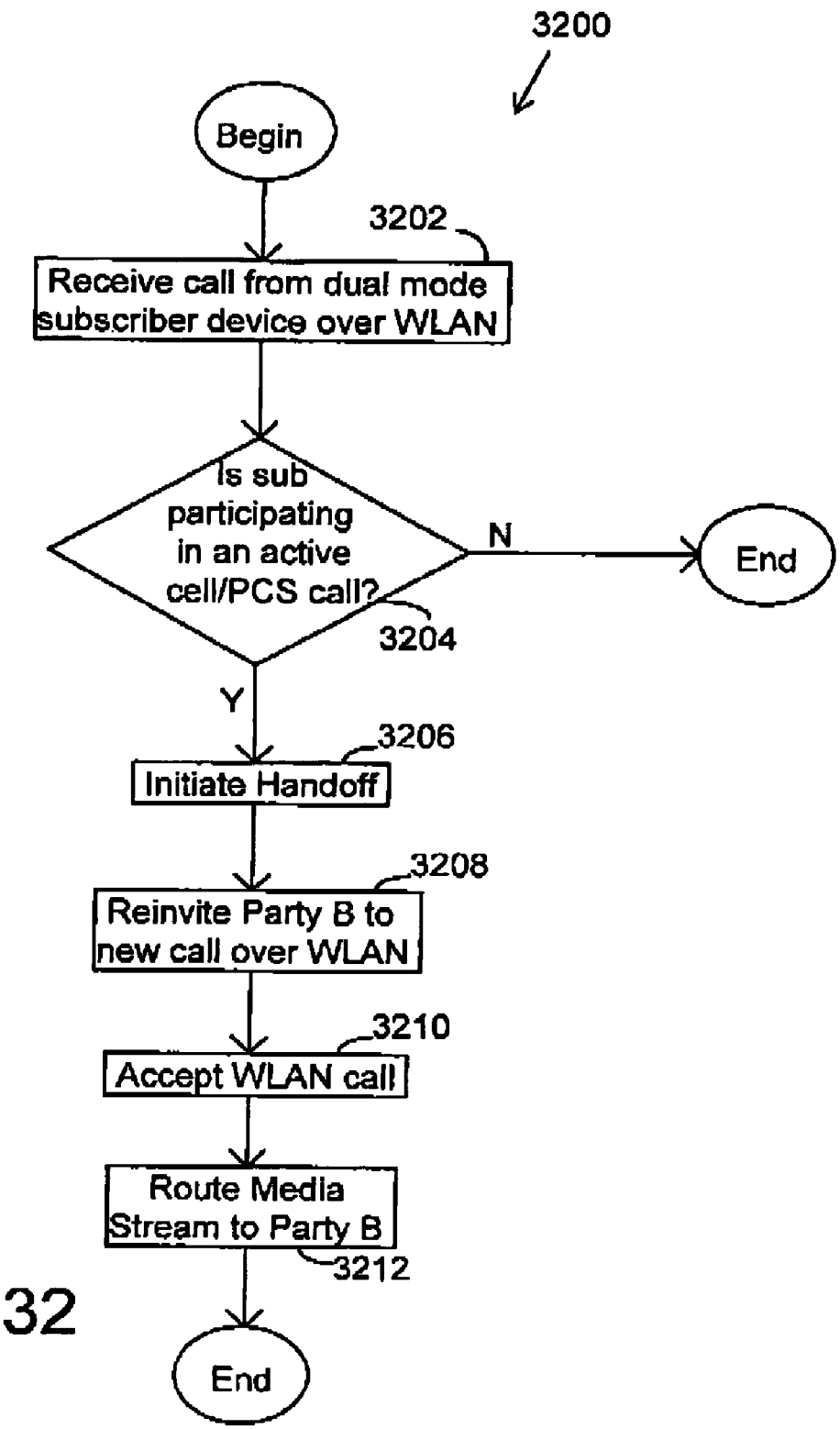
FIG. 32 is a flow chart of illustrating handoff from the cellular operation to WLAN operation using a responsive subscriber origination strategy from the soft switch 134 viewpoint.

FIG. 32 illustrates process 3200, a cellular to wireless local area network handoff embodiment. In such an embodiment, soft switch 134 receives a call initiation from the subscriber via a WLAN, block 3202. If the subscriber is participating in an active voice call over a cellular network, as determined at block 3204, a handoff is initiated to the WLAN, block 3206. VoIP phone 136 is reinvited to the new call over the WLAN, block 3208, and the dual mode subscriber device 130 WLAN call is accepted, block 3210. The WLAN-based voice call is rerouted to VoIP phone 136, and the original cellular call is dropped, block 3212.

The above description of the disclosed embodiments is provided to enable any person skilled in the art to make or use the invention. Various modifications to these embodiments will be readily apparent to those skilled in the art, and the principles defined herein can be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. An apparatus in a cellular communication system comprising:
 a call controller configured to receive a vicarious call initiation from a wireless phone over a data-bearing path of the cellular communication system, wherein the vicarious call initiation includes an identifier to identify a remote party in which a connection over a voice-bearing path of the communication system is to be established, wherein the voice-bearing path is different than the data-bearing path;
 a connection session manager configured to receive a first voice call from the wireless phone over a voice-bearing path of the cellular communication system, wherein the first voice call is directed to a surrogate party, the surrogate party being different than the remote party; and
 wherein the call controller is further configured to correlate the vicarious call initiation with the first voice call to establish the connection over the voice-bearing path.

2. The apparatus of claim 1, wherein the connection session manager is further configured to place a second voice call to the remote party based at least in part on the identifier included in the vicarious call initiation.

3. The apparatus of claim 2, wherein the call controller is further configured to join the first voice call to the second voice call to establish the connection over the voice-bearing path.

4. The apparatus of claim 1, wherein the identifier included in the vicarious call initiation includes a telephone number of the remote party, and wherein the first voice call is directed to a telephone number of the wireless phone.

5. The apparatus of claim 4, wherein the vicarious call initiation is a Short Message Services communication.

6. The apparatus of claim 4, wherein the vicarious call initiation is an Session Initiation Protocol (SIP) encoded message.

7. The apparatus of claim 4, wherein the vicarious call initiation is communicated over a virtual private network.

8. A method of initiating a call in a cellular communication system from a wireless phone to a remote party comprising:
 receiving a vicarious call initiation from the wireless phone over a data-bearing path of the cellular communication system, the vicarious call initiation containing an identifier indicating the remote party to be called over a voice-bearing path of the cellular communication system;
 receiving a first voice call from the wireless phone over the voice-bearing path of the cellular communication system, wherein the first voice call is directed to the wireless phone;
 correlating the vicarious call initiation with the first voice call;
 placing a second voice call to the remote party based at least in part on the vicarious call initiation; and
 connecting the first voice call to the second voice call to establish a connection from the wireless phone to the remote party over the voice-bearing path of the cellular communication system.

9. The method of claim 8, wherein the receiving the vicarious call initiation includes receiving an HTTP post message over the data-bearing path of the cellular communication system, wherein the HTTP post message specifies a phone number of the remote party.

10. The method of claim 8, wherein the receiving the vicarious call initiation comprises receiving a Short Message Services (SMS) communication, wherein the SMS communication specifies a phone number of the remote party.

11. The method of claim 8, wherein the receiving the vicarious call initiation comprises receiving a Session Initiation Protocol (SIP) encoded message.

12. The method of claim 8, wherein the receiving the vicarious call initiation comprises receiving the vicarious call initiation over a virtual private network.

13. The method of claim 9, further comprising:
 authenticating the wireless phone as an authenticated caller via a wireless phone identifier contained in the vicarious call initiation, and wherein the connecting is in response to a successful authentication.

14. An article of manufacture comprising:
a computer readable medium having a plurality of instructions stored thereon which are configured to be executed by an apparatus of a cellular communication system to enable the apparatus to perform operations comprising:
receive a vicarious call initiation from a wireless phone over a data-bearing path of the cellular communication system, the vicarious call initiation containing an identifier to indicate a remote party to be called over a voice-bearing path of the cellular communication system;
correlate the vicarious call initiation with a first voice call from the wireless phone received over the voice-bearing path of the cellular communication system, wherein the first voice call is directed to the wireless phone;
place a second voice call to the remote party based at least in part on the vicarious call initiation; and
connect the first voice call to the second voice call to establish a connection from the wireless phone to the remote party over the voice-bearing path of the cellular communication system.

15. The article of manufacture of claim 14, wherein the vicarious call initiation comprises an HTTP post message configured to specify a phone number of the remote party.

16. The article of manufacture of claim 14, wherein the vicarious call initiation comprises a Short Message Services (SMS) message configured to specify a phone number of the remote party.

17. The article of manufacture of claim 14, wherein the plurality of instructions are further configured to enable the apparatus to receive the vicarious call initiation over a virtual private network.

18. The article of manufacture of claim 14, wherein the plurality of instructions are further configured to enable the apparatus to:
authenticate the wireless phone as an authenticated caller via a wireless phone identifier contained in the vicarious call initiation, and connect the first voice call to the second voice call in response to a successful authentication.

19. The apparatus of claim 1, wherein the call controller is configured to set a timer and to correlate the vicarious call initiation with the first voice call to establish the connection over the voice-bearing path based on the receipt of the first voice call prior to expiration of the timer.

20. The method of claim 8, further comprising setting a timer upon receipt of the vicarious call initiation, and wherein said correlating is in response to receipt of the first voice call prior to expiration of the timer.

21. The article of manufacture 14, wherein the plurality of instructions are further configured to enable the apparatus to:
set a timer upon receipt of the vicarious call initiation, and correlate the vicarious call initiation with the first voice call in response to receipt of the first voice call prior to expiration of the timer.

22. An apparatus, comprising:
means for receiving a vicarious call initiation from a wireless phone over a data-bearing path of a cellular communication system, the vicarious call initiation containing an identifier indicating the remote party to be called over a voice-bearing path of the cellular communication system;
means for receiving a first voice call from the wireless phone over the voice-bearing path of the cellular communication system, wherein the first voice call is directed to the wireless phone;
means for correlating the vicarious call initiation with the first voice call;
means for placing a second voice call to the remote party based at least in part on the vicarious call initiation; and
means for connecting the first voice call to the second voice call to establish a connection from the wireless phone to the remote party over the voice-bearing path of the cellular communication system.

23. The apparatus of claim 22, wherein the means for receiving the vicarious call initiation comprises means for receiving an HTTP post message that specifies a phone number of the remote party.

24. The apparatus of claim 22, wherein the means for receiving the vicarious call initiation comprises means for receiving a Short Message Services (SMS) communication that specifies a phone number of the remote party.

25. The apparatus of claim 22, wherein the means for receiving the vicarious call initiation comprises means for receiving a Session Initiation Protocol (SIP) encoded message.

* * * * *